(12) United States Patent
Teyeb et al.

(10) Patent No.: US 12,273,834 B2
(45) Date of Patent: Apr. 8, 2025

(54) NEIGHBOR CELL SYNCHRONIZATION UPON STATE TRANSITION

(71) Applicant: Telefonaktiebolaget LM Ericsson (publ), Stockholm (SE)

(72) Inventors: Oumer Teyeb, Montréal (CA); Sebastian Lindqvist, Norrköping (SE); Sangwook Han, Kyeonggi (KR); Patrik Rugeland, Stockholm (SE); Icaro L. J. Da Silva, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 518 days.

(21) Appl. No.: 17/618,288

(22) PCT Filed: Jun. 12, 2020

(86) PCT No.: PCT/SE2020/050609
§ 371 (c)(1),
(2) Date: Dec. 10, 2021

(87) PCT Pub. No.: WO2020/251466
PCT Pub. Date: Dec. 17, 2020

(65) Prior Publication Data
US 2022/0312354 A1 Sep. 29, 2022

Related U.S. Application Data

(60) Provisional application No. 62/861,996, filed on Jun. 14, 2019.

(51) Int. Cl.
*H04W 76/27* (2018.01)
*H04W 56/00* (2009.01)
*H04W 52/02* (2009.01)

(52) U.S. Cl.
CPC ......... *H04W 56/002* (2013.01); *H04W 76/27* (2018.02); *H04W 52/0209* (2013.01)

(58) Field of Classification Search
CPC ............... H04W 56/002; H04W 76/27; H04W 52/0209
See application file for complete search history.

(56) References Cited

U.S. PATENT DOCUMENTS

2013/0010711 A1* 1/2013 Larsson .............. H04W 74/006
370/329
2014/0192775 A1 7/2014 Li et al.
(Continued)

FOREIGN PATENT DOCUMENTS

WO 2013006111 A1 1/2013
WO WO-2016206733 A1 * 12/2016 ............ H04W 76/15
(Continued)

OTHER PUBLICATIONS

Qualcomm Inc: "Supporting early measurement reporting in NR", 3GPP Draft; R2-1900104—Supporting Early Measurement Reporting in NR, 3rd Gen Partnership Project (3GPP). vol. RAN WG2, No. Athens, Greece; Feb. 25, 2019-Mar. 1, 2019, (Year: 2019).*
(Continued)

*Primary Examiner* — Derrick W Ferris
*Assistant Examiner* — Won Jun Choi
(74) *Attorney, Agent, or Firm* — Sage Patent Group

(57) ABSTRACT

The present disclosure provides procedures for early synchronization based on Idle mode measurements to enable fast connection establishment and resumption on transition to a Connected mode. When transitioning (120) to a Connected state, the UE selects one or more cells/frequencies for which in addition to the target cell configured/activated by the network to initiate early synchronization (140) prior to transition to the Connected state. When the UE receives (150) a message from the network requiring the UE to
(Continued)

synchronize with a target cell in a target frequency, the UE determines (160) if the message from the network indicates that the UE shall configure or add a target cell, that is not the PCell, for which the UE has synchronized and, if so, uses the synchronization information to initiate (170) a random access procedure towards the target cell configured/activated by the network.

21 Claims, 38 Drawing Sheets

(56) References Cited

U.S. PATENT DOCUMENTS

| | | | |
|---|---|---|---|
| 2016/0044744 A1* | 2/2016 | Lee | H04W 76/38 370/329 |
| 2018/0049083 A1* | 2/2018 | Kubota | H04W 72/1268 |
| 2018/0368018 A1* | 12/2018 | Kim | H04L 69/08 |
| 2019/0037634 A1 | 1/2019 | Kadiri et al. | |
| 2019/0124572 A1* | 4/2019 | Park | H04W 36/0033 |
| 2019/0387569 A1* | 12/2019 | Martinez Tarradell | H04W 68/02 |
| 2021/0409171 A1* | 12/2021 | Henttonen | H04L 5/0032 |

FOREIGN PATENT DOCUMENTS

| | | |
|---|---|---|
| WO | 2017022902 A1 | 2/2017 |
| WO | 2020098922 A1 | 5/2020 |

OTHER PUBLICATIONS

3rd Generation Partnership Project, "3rd Generation Partnership Project; Technical Specification Group Radio Access Network; NR; Radio Resource Control (RRC) protocol specification (Release 15)", 3GPP TS 38.331 V15.5.0 , Mar. 2019, pp. 1-491.
3rd Generation Partnership Project, "Technical Specification Group Radio Access Network; NR; Medium Access Control (MAC) protocol specification (Release 15)", 3GPP TS 38.321 V15.5.0, Mar. 2019, pp. 1-78.
3rd Generation Partnership Project, "Technical Specification Group Radio Access Network; NR; Packet Data Convergence Protocol (PDCP) specification (Release 15)", 3GPP TS 38.323 V15.5.0, Mar. 2019, pp. 1-26.
3rd Generation Partnership Project, "Technical Specification Group Radio Access Network; NR; Physical layer procedures for control (Release 15)", 3GPP TS 38.213 V15.5.0, Mar. 2019, pp. 1-104.
3rd Generation Partnership Project, "Technical Specification Group Radio Access Network; Evolved Universal Terrestrial Radio Access (E-UTRA); Medium Access Control (MAC) protocol specification (Release 15)", 3GPP TS 36.321 V15.0.0, Dec. 2017, pp. 1-109.
3rd Generation Partnership Project, "Technical Specification Group Radio Access Network; Evolved Universal Terrestrial Radio Access (E-UTRA) and NR; Multi-connectivity; Stage 2 (Release 15)", 3GPP TS 37.340 V15.5.0, Mar. 2019, pp. 1-68.
Qualcomm Incorporated, "Summary of email discussion [105#54] [NR/eCA-DC]: measurement configuration", 3GPP TSG-RAN WG2 Meeting#105bis, Apr. 8-12, 2019, pp. 1-38, Xi'an, China, R2-1903237.
3rd Generation Partnership Project, "Technical Specification Group Radio Access Network; Evolved Universal Terrestrial Radio Access (E-UTRA); Packet Data Convergence Protocol (PDCP) specification (Release 15)", 3GPP TS 36.323 V15.3.0, Mar. 2019, pp. 1-52.
3rd Generation Partnership Project, "Technical Specification Group Radio Access Network; NR; Physical channels and modulation (Release 15)", 3GPP TS 38.211 V15.5.0. Mar. 2019, pp. 1-96.
3rd Generation Partnership Project, "Technical Specification Group Radio Access Network; Evolved Universal Terrestrial Radio Access (E-UTRA); Radio Resource Control (RRC); Protocol specification (Release 15)", 3GPP TS 36.331, V15.5.0, Mar. 2019, pp. 1-948.
3rd Generation Partnership Project, "Technical Specification Group Radio Access Network; Evolved Universal Terrestrial Radio Access (E-UTRA); Requirements for support of radio resource management (Release 15)", 3GPP TS 36.133 V15.5.0, Dec. 2018, pp. 1-85.
3rd Generation Partnership Project, "Technical Specification Group Radio Access Network; Evolved Universal Terrestrial Radio Access (E-UTRA); Requirements for support of radio resource management (Release 15)", 3GPP TS 36.133 V15.5.0, Dec. 2018, pp. 86-723.
3rd Generation Partnership Project, "Technical Specification Group Radio Access Network; Evolved Universal Terrestrial Radio Access (E-UTRA); Requirements for support of radio resource management (Release 15)", 3GPP TS 36.133 V15.5.0, Dec. 2018, pp. 724-1246.
3rd Generation Partnership Project, "Technical Specification Group Radio Access Network; Evolved Universal Terrestrial Radio Access (E-UTRA); Requirements for support of radio resource management (Release 15)", 3GPP TS 36.133 V15.5.0, Dec. 2018, pp. 1247-2721.
3rd Generation Partnership Project, "Technical Specification Group Radio Access Network; Evolved Universal Terrestrial Radio Access (E-UTRA); Requirements for support of radio resource management (Release 15)", 3GPP TS 36.133 V15.5.0, Dec. 2018, pp. 2722-3121.
3rd Generation Partnership Project, "Technical Specification Group Radio Access Network; Evolved Universal Terrestrial Radio Access (E-UTRA); Radio Resource Control (RRC); Protocol specification (Release 15)", 3GPP TS 36.331 V15.5.1, Apr. 2019, pp. 1-948.
Qualcomm Incorporated, "Supporting early measurement reporting in NR", 3GPPTSG RAN WG2 Meeting #105, Feb. 25-Mar. 1, 2019, pp. 1-6, Athens, Greece, R2-1900104.
Ericsson, "Signalling of early measurements for CA DC setup", 3GPP TSG-RAN WG2 #105, Feb. 25-Mar. 1, 2019, pp. 1-9, Athens, Greece, R2-1900693.
Mediatek Inc., "Early measurement reporting from Idle Inactive to Connected", 3GPP TSG-RAN WG2 #105, Feb. 25-Mar. 1, 2019, pp. 1-5, Athens, Greece, R2-1900437.

* cited by examiner

NEIGHBOR CELL SYNCHRONIZATION UPON STATE TRANSITION

RELATED APPLICATIONS

This application claims the benefit of U.S. Provisional Application No. 62/861,996 filed 14 Jun. 2019, the entire disclosure of which is being hereby incorporated by reference herein.

TECHNICAL FIELD

The present disclosure relates generally to Idle mode measurements for user equipment (UEs) in a power saving mode and, more particularly, to early synchronization based on Idle mode measurements to enable fast connection establishment and resumption on transition to a Connected mode.

BACKGROUND

In order to conserve power, a UE configured for carrier aggregation (CA) may release or suspend a connection with a secondary cell (SCell). When the UE receives a Radio Resource Control (RRC) message requiring it to reestablish or resume the connection with a SCell, the UE may need to perform a random access procedure, which requires that the UE be synchronized with the target SCell. Currently, the UE transitions to the Connected state, synchronizes with the target cell and initiates the random access procedure once it is synchronized with the target cell. The need to synchronize with the target cell increases the delay from the time the UE receives the RRC message until the time the UE is capable of transmitting and/or receiving data.

SUMMARY

The disclosure comprises a method executed by a UE for fast setup/activation of a candidate target cell during a transition from a power saving state to Connected state. The method comprises determining that a connection needs to be resumed or established/setup while the UE is in a power saving state (e.g. Idle or Inactive), initiating a connection establishment/resumption procedure, and selecting one or more cells/frequencies for which to start (or re-start) synchronization procedure(s) in addition to the target cell configured/activated by the network. The method may further comprise receiving a message from the network requiring the UE to synchronize with a target cell in a target frequency, determining if the message from the network indicates that the UE shall configure or add a target cell (that is not the PCell) for which the UE has synchronized (according in the previous step) and, if so, using the synchronization information to initiate a random access procedure towards the target cell(s) configured/activated by the network. The method may further comprise starting to communicate with the configured SCell(s) that the UE has synchronized (re-synchronized) as des17cribe in the previous steps (e.g. receive downlink (DL) data, send uplink (UL) data, etc.).

One aspect of the disclosure comprises methods implemented by a UE configured to perform early synchronization prior to establishing or resuming a connection. In one embodiment, the method comprises initiating, while in a power saving state, a connection procedure to establish or resume the connection in a primary cell and synchronizing with one or more candidate cells selected by the UE in addition to the primary cell to obtain early synchronization information. The method further comprises receiving, from the network, a message requiring synchronization with a target cell other than the primary cell and determining that the target cell is among the candidate cells for which early synchronization information is available. The method further comprises, responsive to determining that the target cell is one of the candidate cells for which synchronization is established, transmitting a random access preamble to the target cell using the early synchronization information.

A second aspect of the disclosure comprises a UE configured to perform early synchronization prior to establishing or resuming a connection. In one embodiment, the UE is configured to initiate, while in a power saving state, a connection procedure to establish or resume the connection in a primary cell and synchronize with one or more candidate cells selected by the UE in addition to the primary cell to obtain early synchronization information. The UE is further configured to receive, from the network, a message requiring synchronization with a target cell other than the primary cell and determining that the target cell is among the candidate cells for which early synchronization information is available. The UE is further configured to, responsive to determining that the target cell is one of the candidate cells for which synchronization is established, transmitting a random access preamble to the target cell using the early synchronization information.

A third aspect of the disclosure comprises a UE configured to perform early synchronization prior to establishing or resuming a connection. The UE comprises communication circuitry for communicating with a network and processing circuitry. The processing circuitry is configured to initiate, while in a power saving state, a connection procedure to establish or resume the connection in a primary cell and synchronize with one or more candidate cells selected by the UE in addition to the primary cell to obtain early synchronization information. The processing circuitry is further configured to receive, from the network, a message requiring synchronization with a target cell other than the primary cell and determining that the target cell is among the candidate cells for which early synchronization information is available. The processing circuitry is further configured to, responsive to determining that the target cell is one of the candidate cells for which synchronization is established, transmitting a random access preamble to the target cell using the early synchronization information.

A fourth aspect of the disclosure comprises a computer program for a UE configured to perform early synchronization prior to establishing or resuming a connection. The computer program comprises executable instructions that, when executed by processing circuitry in the interface controller causes the interface controller to perform the method according to the first aspect.

A fifth aspect of the disclosure comprises a carrier containing a computer program according to the fourth aspect. The carrier is one of an electronic signal, optical signal, radio signal, or a non-transitory computer readable storage medium.

DETAILED DESCRIPTION

Figure 1:
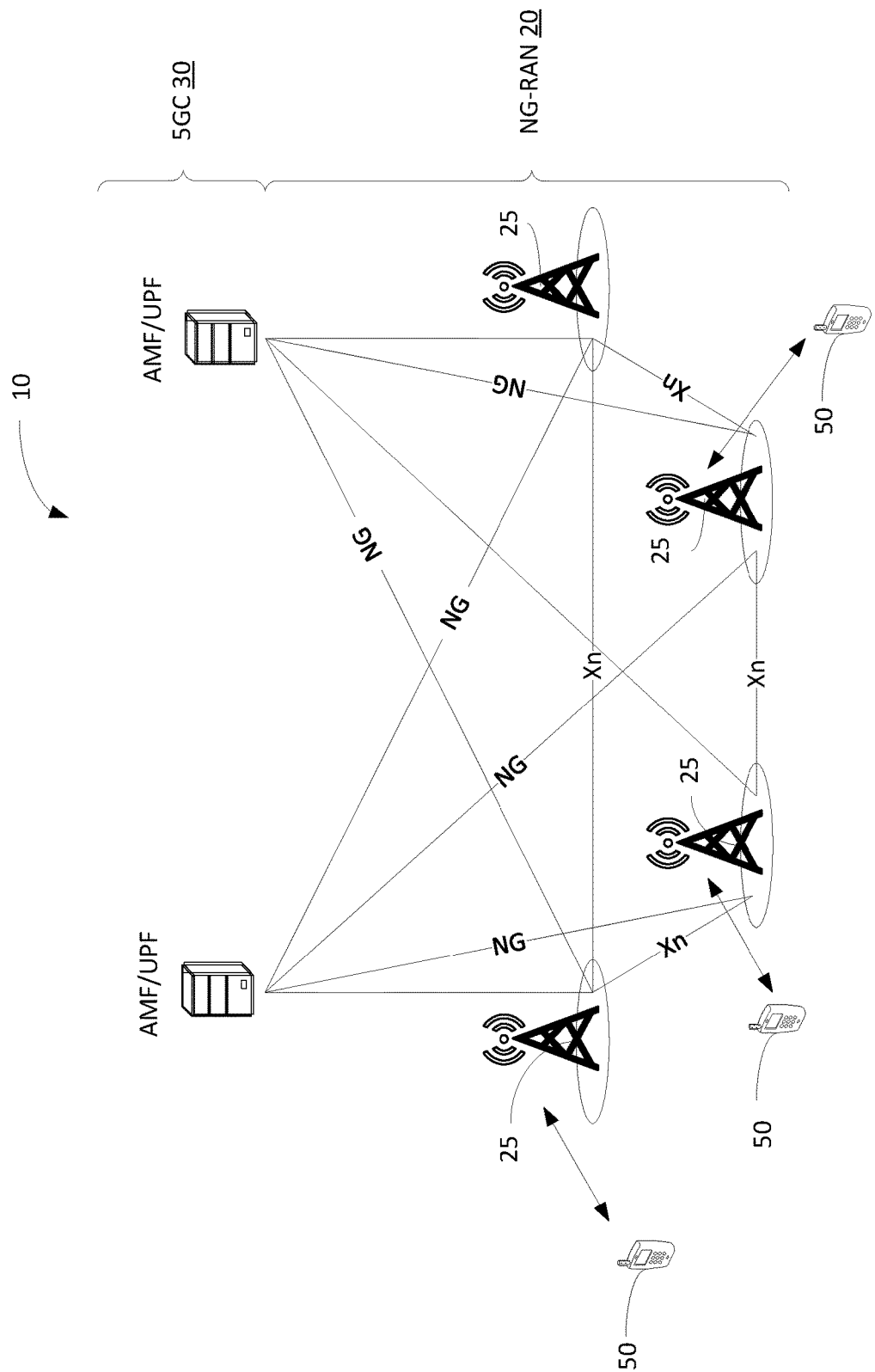
FIG. 1 illustrates the high-level architecture for a Fifth Generation (5G) network.

Referring now to the drawings, an exemplary embodiment of the disclosure will be described in the context of a wireless communication network according to the Long Term Evolution (LTE) or Fifth Generation (5G) standards developed by Third Generation Partnership Project (3GPP). Those skilled in the art will appreciate that the methods and apparatus herein described are not limited to use in LTE or 5G networks but may also be used in wireless communication networks operating according to other standards.

FIG. 1 illustrates a wireless communication network 10 configured according to the 5G standard. Wireless communication network 10 comprises a 5G Radio Access Network (RAN) 20 and a 5G Core (5GC) 30. The 5G RAN 20 comprises one or more base stations 25 providing service to UEs 50 in respective cells of the wireless communication network 10. The base stations 25 may comprises 5G NodeBs (gNBs) that implement the New Radio (NR) standard over the air interface, or Next Generation Evolved NodeBs (ng-eNBs) that implement the LTE standard, also known as Evolved Universal Terrestrial Radio Access (E-UTRA), over the air interface. Although only one cell and one base station 25 are shown in FIG. 1, those skilled in the art will appreciate that a typical wireless communication network 10 comprises many cells 20 served by many base stations 25. The 5GC provides the UEs 50 with a connection to external packet data networks.

The UEs 50 may comprise any type of equipment capable of communicating with the base station 25 over a wireless communication channel. For example, the UEs 50 may comprise cellular telephones, smart phones, laptop computers, notebook computers, tablets, machine-to-machine (M2M) devices (also known as machine type communication (MTC) devices), embedded devices, wireless sensors, or other types of wireless end user devices capable of communicating over wireless communication networks 10.

Interworking with LTE

Figure 2:
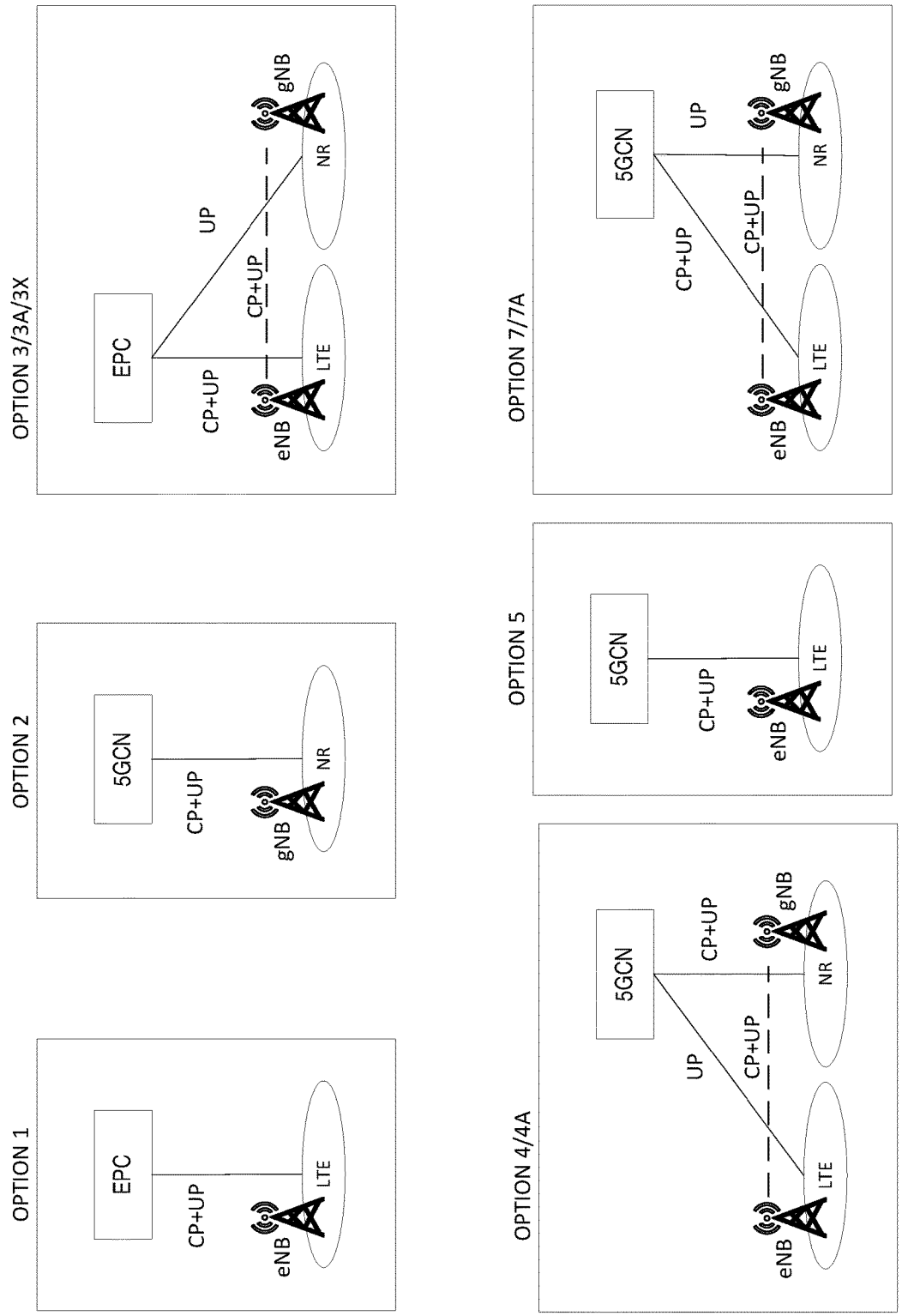
FIG. 2 illustrates deployment options for interworking between 5G and LTE networks.

A 5G network can be deployed with or without interworking with LTE as depicted in FIG. 2. In LTE, the base stations 25, referred to as Evolved NodesBs (eNBs) in a Evolved Universal Terrestrial Radio Access Network (E-UTRAN) connect to the Evolved Packet Core (EPC). In a stand-alone (SA) deployment, the NR and LTE networks are deployed without any interworking. In this case, the gNBs in the 5G-RAN 20 connect to the 5GC 30 and the eNBs in the E-UTRAN connect to EPC with no interconnection between the two. Options 1 and 2 in FIG. 2 illustrate SA deployments. Option 3 in FIG. 2 illustrates a deployment option called E-UTRAN-NR Dual Connectivity (EN-DC). In the EN-DC deployment, dual connectivity (DC) between NR and LTE is applied with LTE as the master and NR as the secondary node. The RAN node (gNB) supporting NR does not have a control plane connection to the EPC. Instead, the gNB relies on the LTE as master node (MeNB). This deployment is also called "Non-standalone NR." Notice that in this case the functionality of an NR cell is limited and would be used for Connected mode 50 s as a booster and/or diversity leg, but a UE 50 in RRC_IDLE mode cannot camp on the NR cells.

With introduction of 5GC, other options may be also valid. As mentioned above, Option 2 supports stand-alone NR deployment where gNB is connected to 5GC. Similarly, a ng-eNB base station 25 can also be connected to 5GC using Option 5 (also known as el TE, E-UTRA/5GC, or LTE/5GC). In these cases, both NR and LTE are seen as part of the NG-RAN (and both the ng-eNB and the gNB can be referred to as NG-RAN nodes). It is worth noting that, Options 4 and 7 are variants of dual connectivity between LTE and NR which will be standardized as part of NG-RAN connected to 5GC, denoted as Multi-Radio Dual Connectivity (MR-DC). Under the MR-DC umbrella, the following options are available:

Option 3 (EN-DC): LTE is the master node and NR is the secondary (EPC employed)
Option 4 (NE-DC): NR is the master node and LTE is the secondary (5GC employed)
Option 7 (NGEN-DC): LTE is the master node and NR is the secondary (5GCN employed)
Option 2 variant (NR-DC): Dual connectivity where both the master and secondary are NR (5GC employed).

Figure 3:
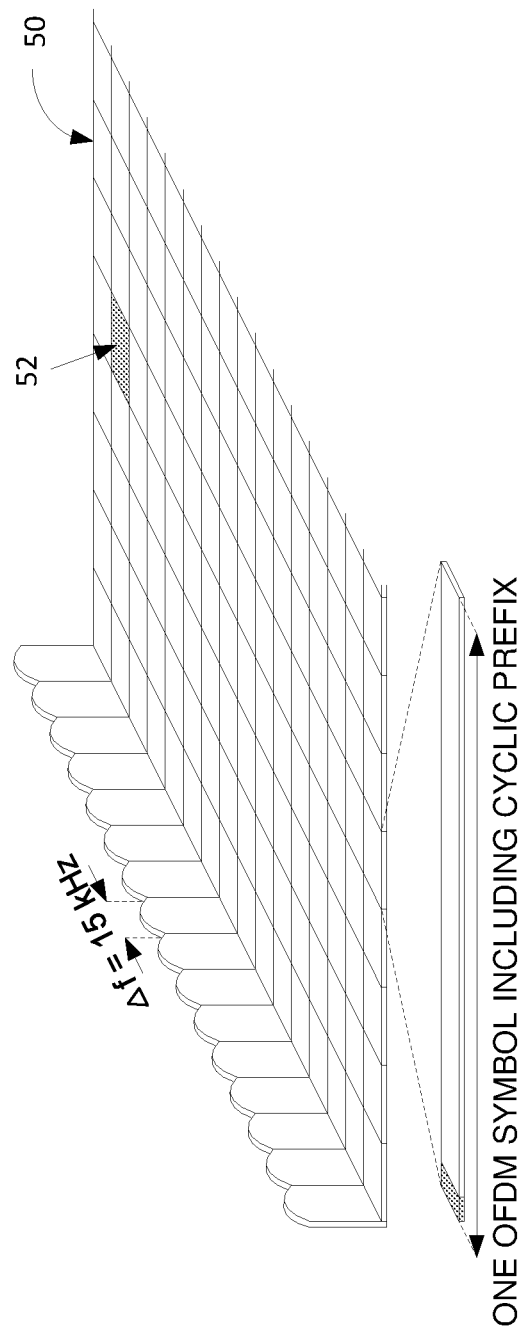
FIG. 3 illustrates time-frequency resources used in New Radio (NR) and Long Term Evolution (LTE).

The radio resources used for transmitting and receiving data in LTE and 5G systems can be viewed as a time-frequency grid 50 as shown in the FIG. 3. In the time domain, the physical resources are divided into slots. Each slot includes a number of symbols. In one embodiment, a slot comprises 7 or 14 orthogonal frequency division multiplexing (OFDM) symbols for subcarrier spacing (SCS) less than or equal to 60 kHz, and 14 OFDM symbols for SCS greater than 60 kHz. In the frequency domain, the physical resources are divided into subcarriers. The number of subcarriers varies according to the allocated system bandwidth. In NR, a slot can be subdivided into mini-slots. A mini-slot comprises one or more symbol periods in a time slot. The smallest element of the time-frequency grid 50 is a resource element (RE) 52, which comprises the intersection of one subcarrier and one symbol.

In LTE networks, a subframe typically comprises fourteen symbols and a normal Cyclic Prefix (CP) length. Such a subframe is generally suitable for use in situations where multipath dispersion is not expected to be severe. Under more severe multipath dispersion scenarios, an extended CP may be used, in which case the subframe typically comprises twelve symbols instead.

NR systems use beam forming to improve coverage and reduce interference. Beam forming is a multiple antenna technology that enables the base station 25 and UE 50 to transmit and receive narrowly focused beams. Thus, beam forming enables the base station 25 to re-use radio resources by transmitting signals to different UEs in different directions. By utilizing a large number of antenna elements at both the base station 25 and the UE 50, along with intelligent beam forming and beam tracking algorithms, the network is able to provide greater coverage and reduce interference, which in turn increases spectral efficiency. One feature of NR networks is the ability of the base stations 25 to transmit and/or receive on multiple beams 30 in the same cell 20.

When beam forming is used, the UEs typically monitor the beam quality of the downlink beams and send measurement reports to the base station 25 indicating the beam link quality of the serving downlink beams and non-serving downlink beams. When the beam quality of a serving downlink deteriorates, the base station 25 can instruct the UE 50 to switch to a different downlink beam.

Carrier Aggregation (CA) and Dual Connectivity (DC)

Figure 4A:
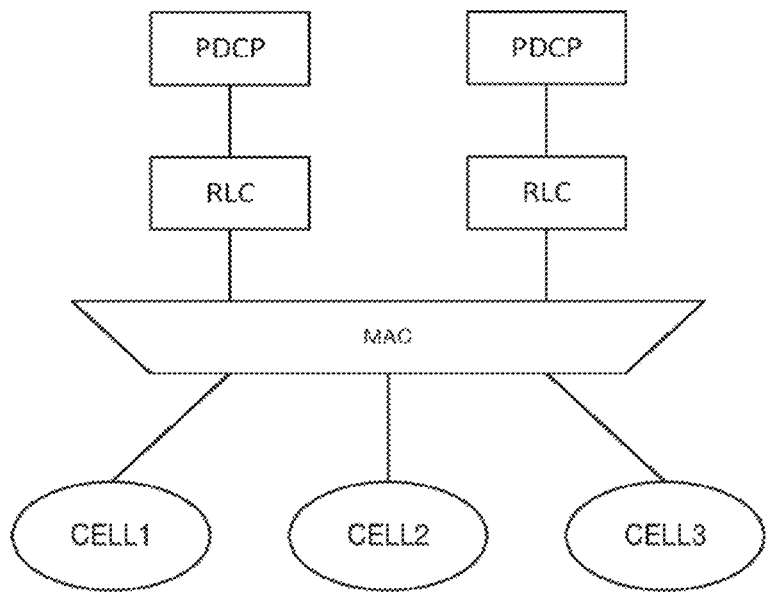
FIG. 4A illustrates carrier aggregation by the Medium Access Control (MAC) layer.

Carrier aggregation was introduced in LTE networks and is used in 5G networks to support high data rate transmissions. In carrier aggregation, multiple component carriers are aggregated to increase the bandwidth for transmission to or from a user equipment (UE 50). For NR systems, up to 32 component carriers can be aggregated to provide wider bandwidths for higher data rate transmissions. The component carriers do not have to be contiguous in frequency. As shown in FIG. 4A, cells are aggregated on Medium Access Control (MAC) level. MAC gets grants for a certain cell and multiplexes data from different bearers into one transport block (TB) transmitted on that cell. Also, MAC controls how that process is done.

With carrier aggregation, a UE 50 is assigned one primary downlink component carrier and one primary uplink component carrier. The primary component carriers are referred to as primary cells (PCells). The PCell is the cell with which the UE 50 establishes a Radio Resource Control (RRC) connection during connection establishment or during handover. In addition to the PCells, a UE 50 may be assigned one or more secondary component carriers for the downlink, and/or one or more secondary component carriers for the uplink. The secondary component carriers are referred to as secondary cells (SCells). SCells can be configured, i.e., added, to a cell group for a UE 50 using RRC signaling (e.g., via a RRCConnectionReconfiguration message), which takes in the order of hundreds of milliseconds. A cell which is configured for the UE 50 becomes a "serving cell" for the UE 50.

Generally, downlink control information (DCI) is transmitted to the UE 50 on the Physical Downlink Control Channel (PDCCH) in the PCell. Uplink control information (UCI) is transmitted from the UE 50 to the network on the physical uplink control channel (PUCCH) associated with the uplink PCell. When beamforming is employed, a PCell may be carried by one beam within a cell and the SCell may be carried by a different beam in the same cell or a different cell.

Figure 4B:
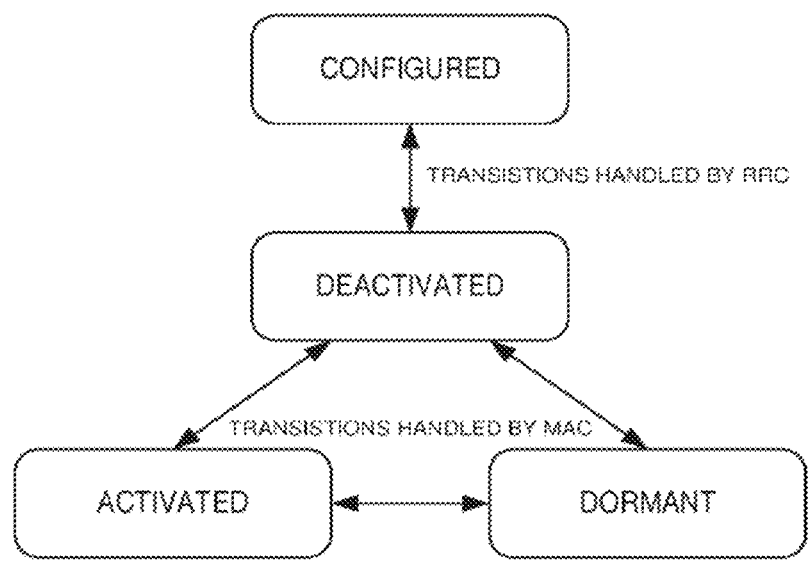
FIG. 4B is a state diagram illustrating states of a SCell.

An SCell may also be associated with an SCell state as shown in FIG. 4B. When configured/added via RRC, a SCell starts in a deactivated state. In LTE Release 15 (Rel-15), the base station 25, known as an Evolved NodeB (eNB) can configure the UE 50 to activate the SCell upon configuration or change the state via a RRCConnectionReconfiguration message. For example, for each SCell configured for the UE 50 other than the PSCell, if the received RRCConnectionReconfiguration message includes sCellState for the SCell and indicates activated, the eNB configures lower layers to consider the SCell to be in activated state. If the received RRCConnectionReconfiguration message includes sCellState for the SCell and indicates dormant, the eNB configures lower layers to consider the SCell to be in dormant state. Otherwise, the eNB configures lower layers to consider the SCell to be in deactivated state.

In LTE Rel-15, a new intermediate state (called dormant state) between the deactivated and active state has been introduced for enhanced uplink operation. The act of moving to this dormant state is called hibernation.

A MAC Control Element (MAC CE) can be used to change the SCell state between the deactivated, activated and dormant states as shown below. A number of timers are defined in MAC for transitioning a cell between deactivated, activated, and dormant states. These timers are called the sCellHibernationTimer, sCellDeactivationTimer, and dormantSCellDeactivationTimer. The sCellHibernationTimer moves the SCell from activated state to dormant state. The sCellDeactivationTimer moves the SCell from activated state to deactivated state. The dormantSCellDeactivationTimer moves the SCell from dormant state to deactivated state. The MAC level SCell activation takes in the order of 20-30 ms.

Cell Group (SCG) configuration to the UE 50. The SCG allows the UE 50 to add a cell from another eNB, which requires different MAC entities, one for each cell group. In this case, the UE 50 will have one cell associated with the PCell of the Master Node (MN) and another cell associated with a Primary Secondary cell (PScell) of the secondary eNB and each group may possibly have their own associated SCells.

When it comes to adding SCells, when the UE 50 is in single connectivity, just to exemplify, the RRCConnectionReconfiguration message may carry a cell index (so MAC identifiers are optimized, i.e., shorter), cell identifier and carrier frequency, common parameters, and, state information, later introduced in Rel-15 (activated or dormant). An exemplary RRCConnectionReconfiguration adding a SCell is shown below.

```
SCellToAddModList-r10 ::=            SEQUENCE (SIZE (1..maxSCell-r10) ) OF SCellToAddMod-r10
SCellToAddMod-r10 ::=                SEQUENCE {
   sCellIndex-r10                       SCellIndex-r10,
   cellIdentification-r10               SEQUENCE {
      physCellId-r10                       PhysCellId,
      dl-CarrierFreq-r10                   ARFCN-ValueEUTRA
   }                                       OPTIONAL,-- Cond
SCellAdd
   radioResourceConfigCommonSCell-r10   RadioResourceConfigCommonSCell-r10 OPTIONAL,
   -- Cond SCellAdd
   radioResourceConfigDedicatedSCell-r10   RadioResourceConfigDedicatedSCell-r10
   OPTIONAL, -- Cond SCellAdd2
   ...,
   [ [ dl-CarrierFreq-v1090             ARFCN-ValueEUTRA-v9e0 OPTIONAL -- Cond
EARFCN-max
   ] ],
   [ [ antennaInfoDedicatedSCell-v10i0  AntennaInfoDedicated-v10i0 OPTIONAL --
Need ON
   ] ],
   [ [ srs-SwitchFromServCellIndex-r14  INTEGER (0.. 31) OPTIONAL -- Need ON
   ] ],
   [ [ sCellState-r15                   ENUMERATED (activated, dormant) OPTIONAL -
- Need ON
   ] ]
}
```

Once the network understands the need to configure and/or activate CA, the question is which cells to initially configure and/or activate, if they are configured, and/or whether a cell/carrier is good enough in terms of radio quality/coverage. Radio quality can be measured by the Reference Signal Received Power (RSRP) or Reference Signal Received Quality (RSRQ). To understand the conditions on SCell(s) or potential SCell(s) in a given available carrier, the network may configure the UE 50 to perform Radio Resource Management (RRM) measurements.

Figure 5:
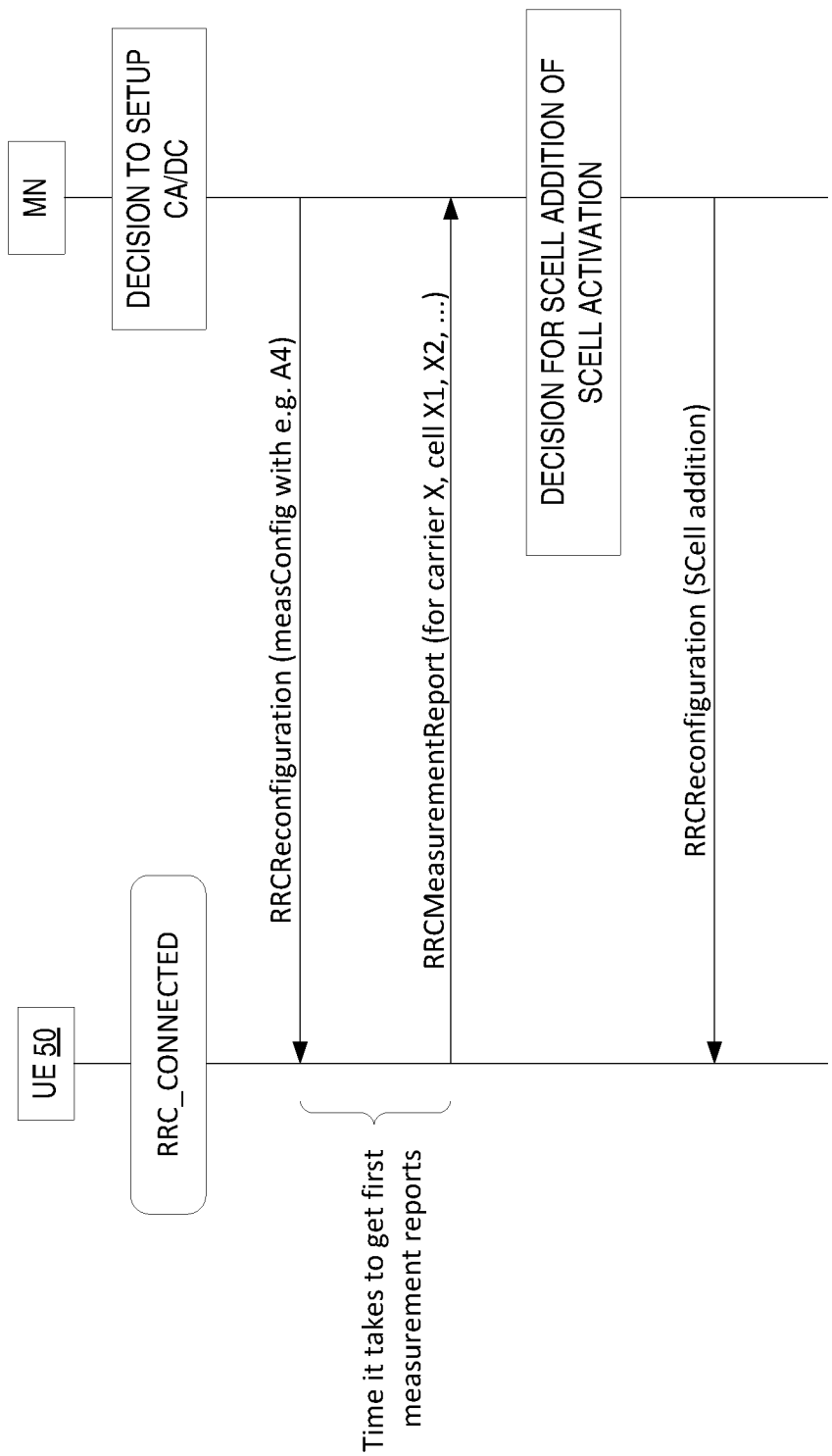
FIG. 5 illustrate Radio Resource management (RRM) reporting.

Typically, the network may be assisted by RRM measurements to be reported by a UE 50. As shown in FIG. 5, the network may configure the UE 50 with measurement IDs associated to reportConfig with event A1 (serving cell becomes better than threshold) in case this is a configured SCell, or A4 (neighbor cell becomes better than threshold) for carriers without a configured SCell. The measurement objects are associated with the carrier the network wants to be measured and reported. If the network knows the identity of the exact cells it wants the UE 50 to measure, a so-called white cell list can be configured in the measurement object so that the UE 50 is only required to measure the specified cells in that carrier.

With the later introduction of dual connectivity (DC) in LTE Release 12 (Rel-12), it is possible to add a Secondary Connection Establishment Procedures In order to establish a connection with the 5G network 10, the UE 50 100 needs to find and acquire synchronization with a cell within the network 10, read system information (SI) from a Physical Broadcast Channel (PBCH) in the cell, and performs a random access (RA) procedure to establish a connection with the cell. The first of these steps is commonly referred to as cell search. To assist the UE 50 100 in the cell search procedure, the base station 25 200 transmits two synchronization signals on the downlink: the Primary Synchronization Signal (PSS) and the Secondary Synchronization Signal (SSS). The synchronization signals enable the UE 50 100 to identify the cell and acquire the timing for the cell.

Figure 6A:
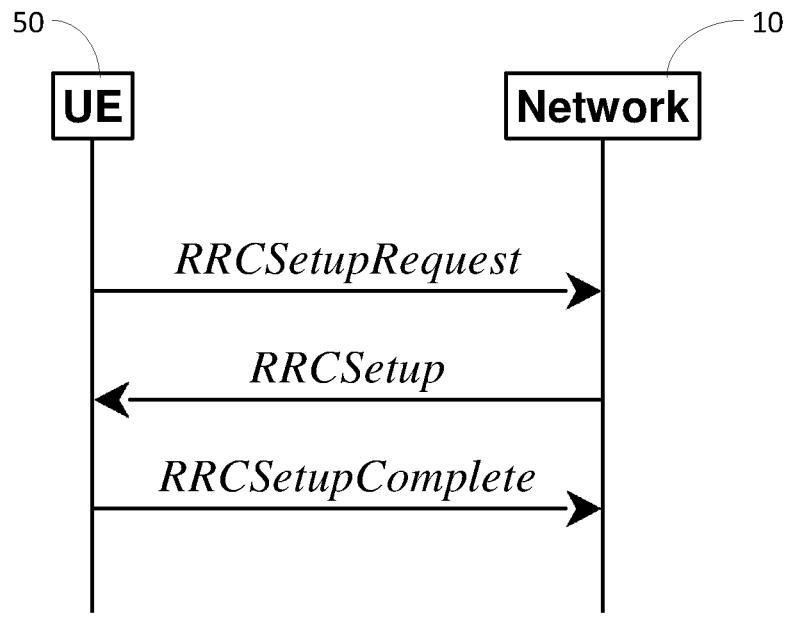
FIG. 6A illustrates a connection establishment procedure for NR where the request is successful.
Figure 6B:
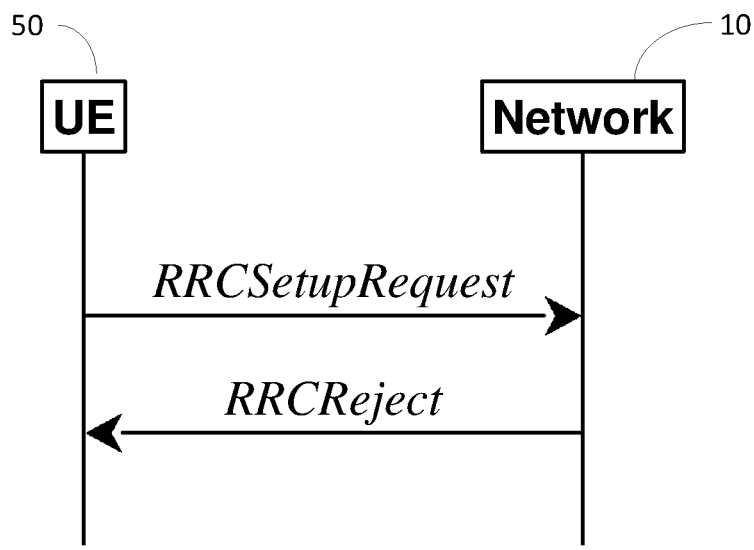
FIG. 6B illustrates a connection establishment procedure for NR where the request is rejected.

FIGS. 6A and 6B illustrate RRC connection establishment procedures for NR.

Figure 7A:
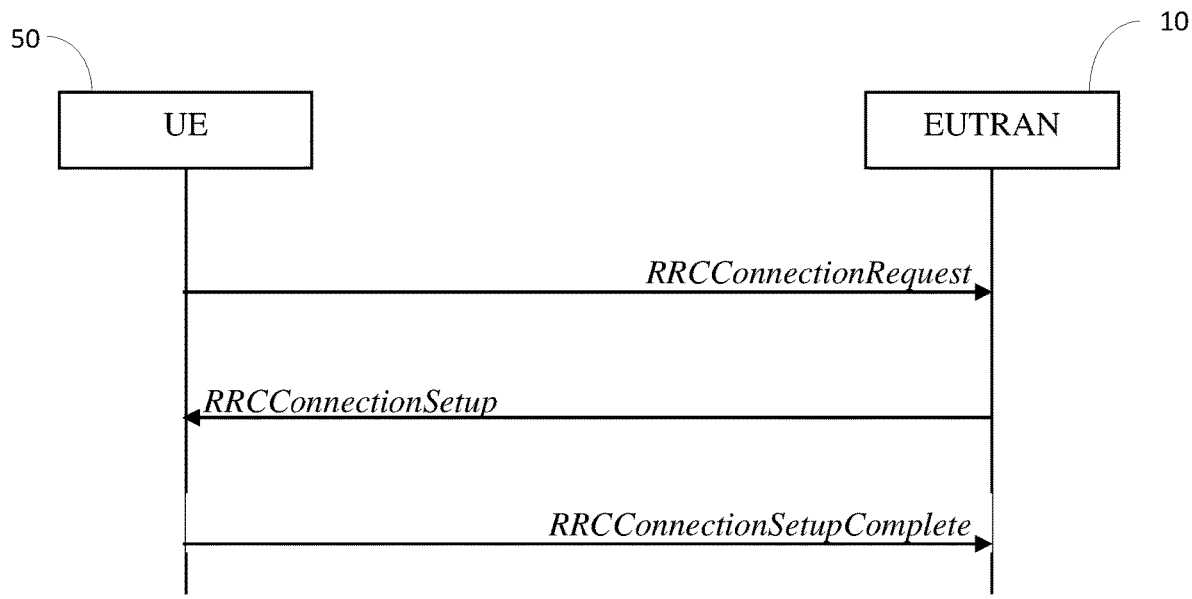
FIG. 7A illustrates a connection establishment procedure for LTE where the request is successful.
Figure 7B:
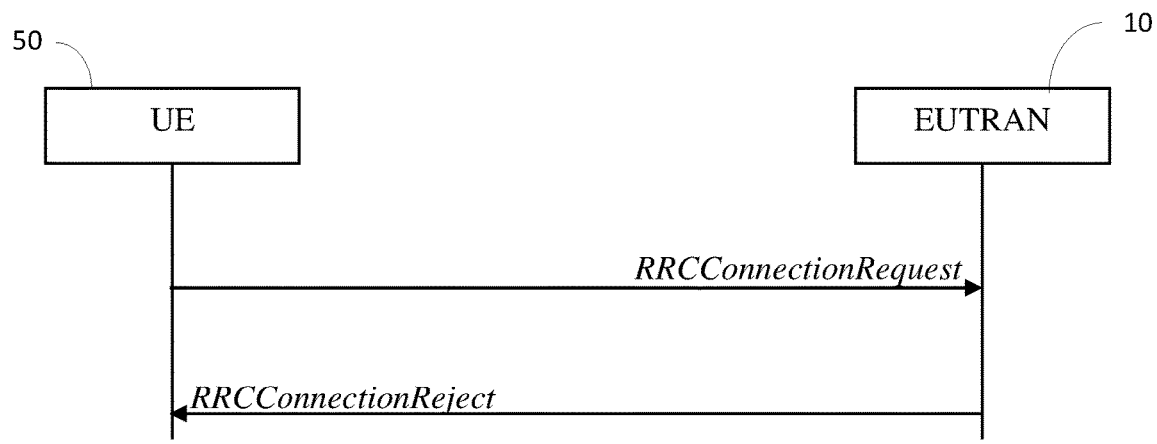
FIG. 7B illustrates a connection establishment procedure for LTE where the request is rejected.

FIGS. 7A and 7B show equivalent RRC connection establishment procedures for LTE. The purpose of this connection establishment procedure is to establish an RRC connection. RRC connection establishment involves Signaling Radio Bearer 1 (SRB1) establishment. The procedure is also used to transfer the initial non-access stratum (NAS) dedicated information/message from the UE 50 to the network. The connection establishment procedures are used when initially establishing an RRC connection or when UE 50 is resuming or re-establishing an RRC connection and the network is not able to retrieve or verify the UE 50 context. The UE 50 starts timer T300 upon the sending of the connection establishment request (i.e., RRCSetupRequest in NR or RRCConnectionRequest in LTE). If the connection establishment procedure is successful, the UE 50 receives RRCSetup (FIG. 6A) for NR or RRCConnectionSetup (FIG. 7A) for LTE and responds with RRCSetupComplete for NR or RRCConnectionSetupComplete for LTE. If the T300 timer expires before receiving the RRCSetup/RRCConnectionSetup message from the network, the UE 50 will stop the connection establishment procedure and remain in RRC_IDLE mode. The UE 50 may also receive an RRCReject for NR (FIG. 6B) or RRCConnectionReject for LTE FIG. 7B) in response to the RRCSetupRequest (NR) or RRCConnectionRequest (LTE) message. This will also make the UE 50 remain in the IDLE state. If a wait timer (T302) is included, the UE 50 will start the timer. When the T302 timer expires, it informs higher layers, which may trigger the establishment procedure again.

Connection Resume Procedures

A very typical scenario/use case is a UE 50 with intermittent, bursty traffic. For example, when streaming video, the UE 50 may receive video packets in bursts separated by idle periods. To save UE 50 power, the network can transition the UE 50 from a Connected mode to and Idle mode during these idle periods. The UE 50 may transition back to the Connected mode via paging or at the request of the UE 50 request to access the network.

In LTE Release 13 (Rel-13), a mechanism was introduced to allow the network to suspend a connection for a UE 50. The suspended state is similar to RRC_IDLE but differing in that the UE 50 stores the access stratum (AS) context or RRC context. The suspended state makes it possible to reduce the signaling when the UE 50 become active again and resumes the RRC connection, instead of having to perform a connection establishment procedure. Reducing the signaling provides several benefits, such as reducing latency (e.g., for smart phones accessing Internet), and/or reduced signaling which leads to a reduction in battery consumption (e.g., for machine type communication (MTC) devices that send very little data).

Figure 8A:
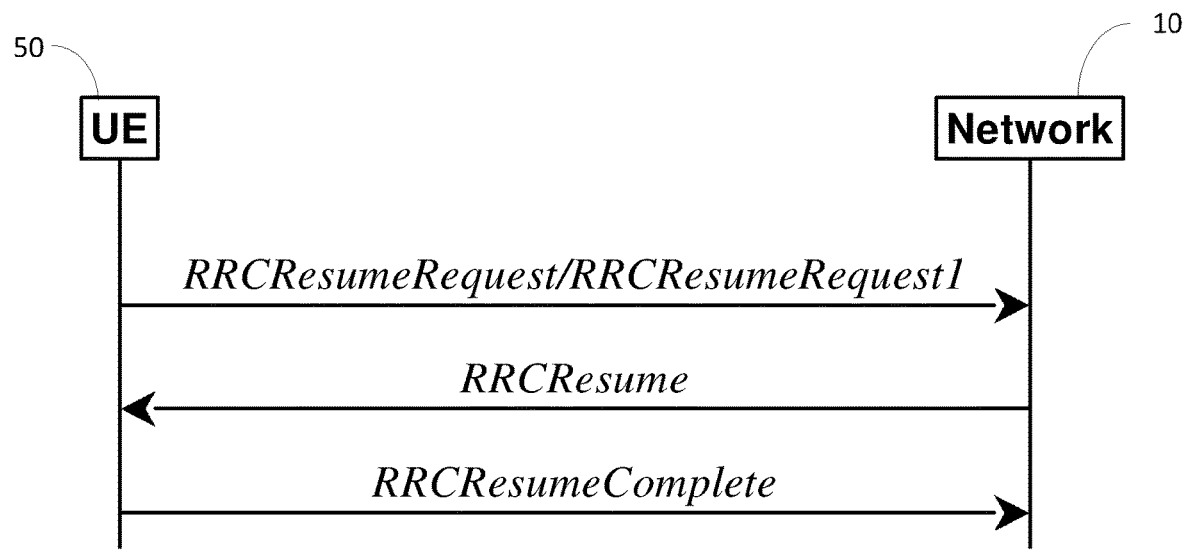
FIG. 8A illustrates a connection resume procedure for NR where the request is successful.
Figure 8B:
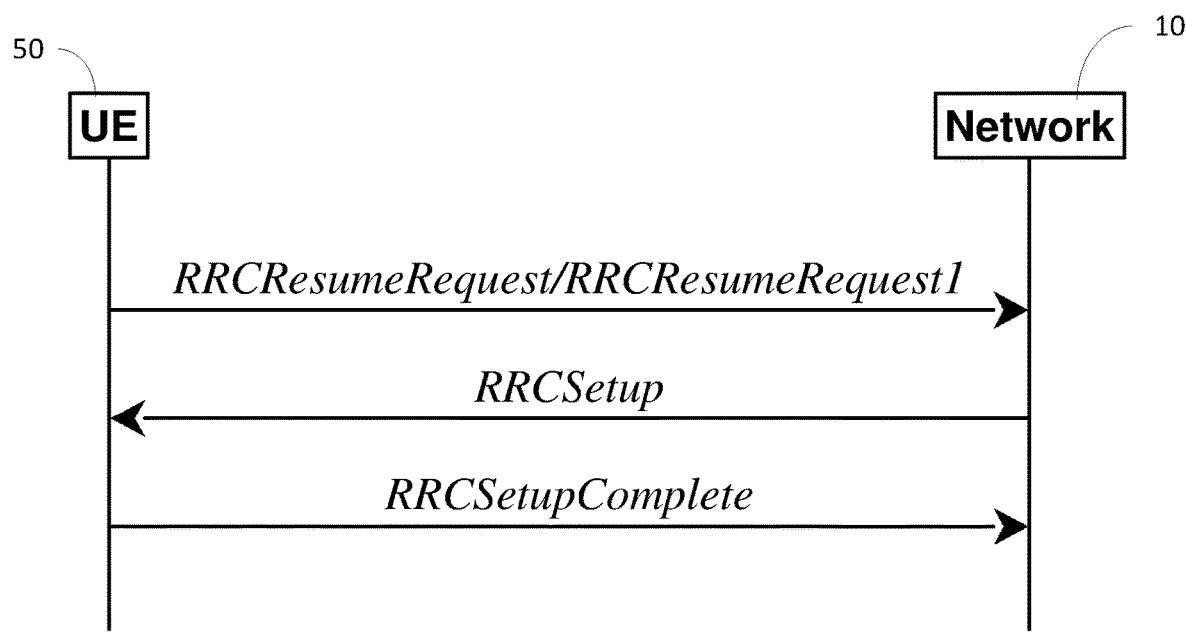
FIG. 8B illustrates a connection resume procedure for NR resulting in fallback to connection establishment.
Figure 9A:
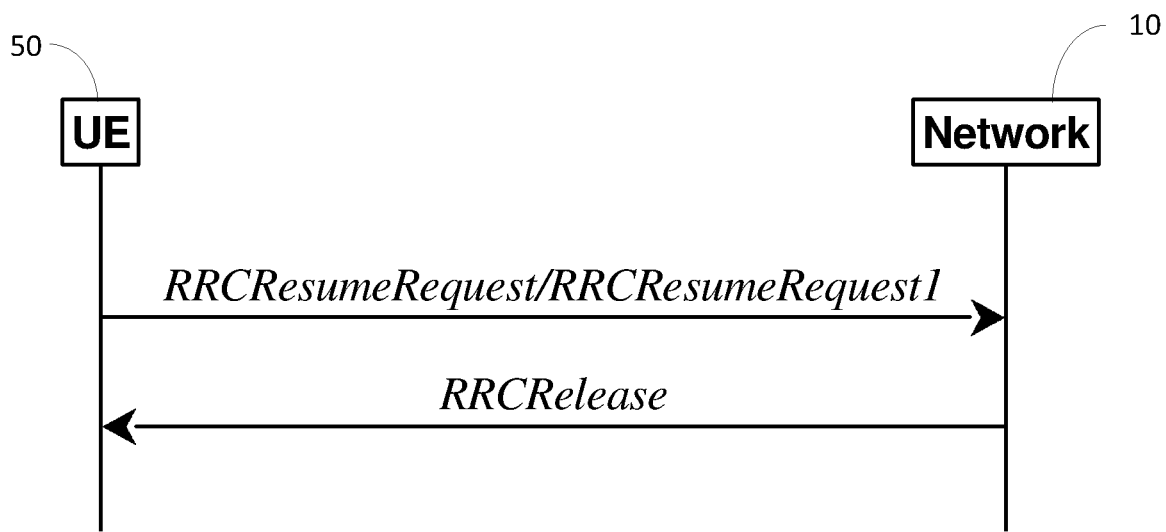
FIG. 9A illustrates a connection resume procedure for NR followed by a network release.
Figure 9B:
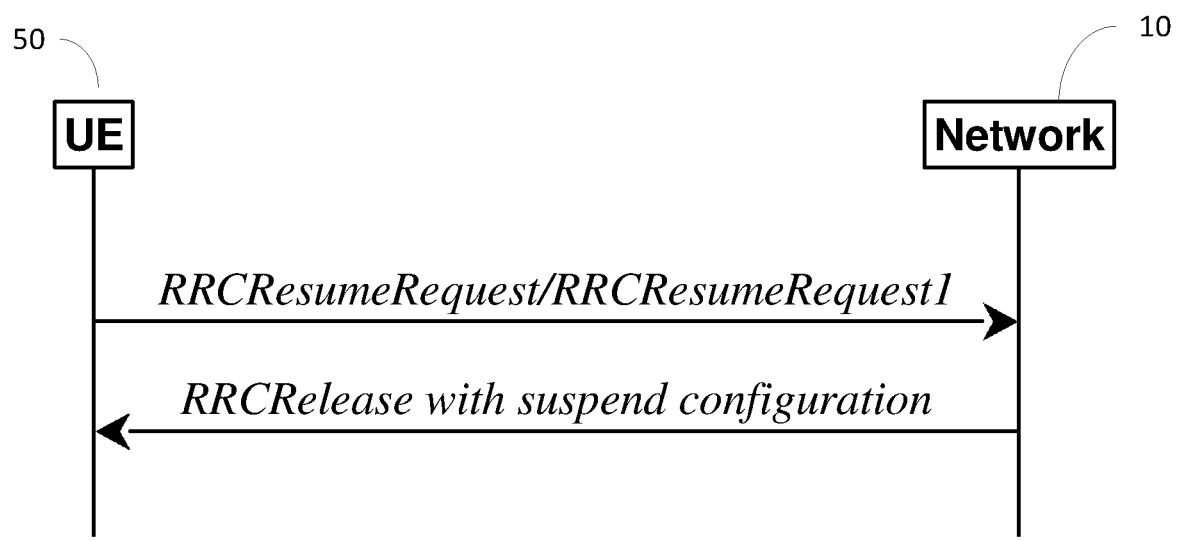
FIG. 9B illustrates a connection resume procedure for NR followed by a network suspend.
Figure 10A:
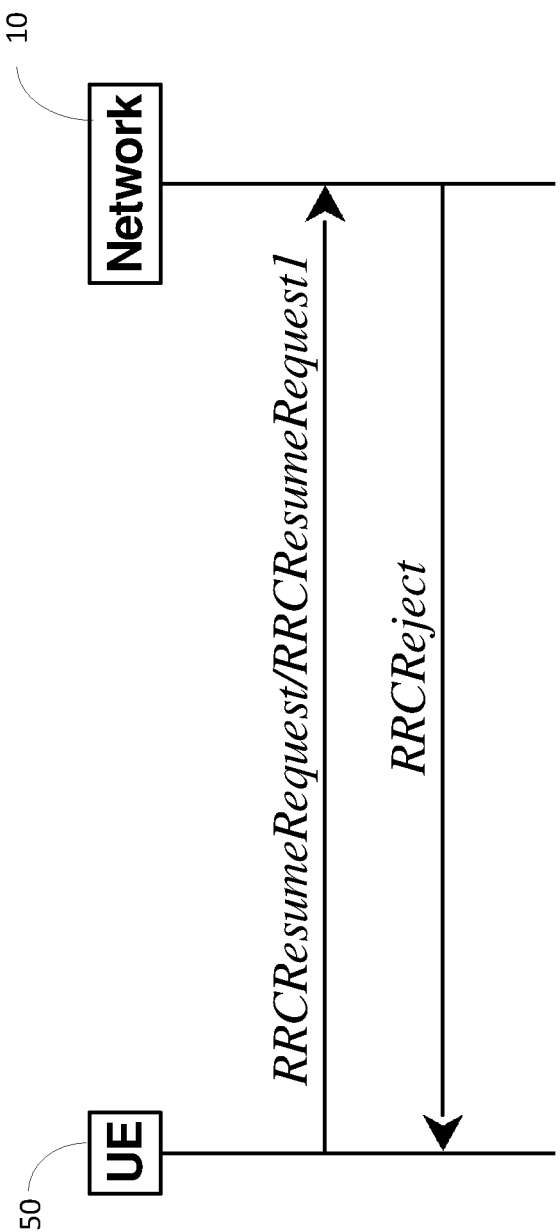
FIG. 10A illustrates a connection resume procedure for NR where the request is rejected.

Figures BA, BB, 9A, 9B, and 10A illustrate connection resume procedures for NR. In NR, the UE 50 sends a RRCResumeRequest or RRCResumeRequest1 to the network to resume suspended connection. If the connection establishment procedure is successful, the UE 50 receives RRCResume from the network and responds with a RRCResumeComplete (Figure BA). In some cases, the network may respond with a RRCSetup from the network to initiate fallback to a connection establishment procedure (FIG. 8B). After reestablishing the connection, the UE 50 sends a RRCSetupComplete to the network. The network can also respond with an RRCRelease to release the connection (FIG. 9A), a RRCRelease with a suspend configuration to suspend the connection (FIG. 9B), or a RRCReject to reject the RRCResumeRequest (FIG. 10A).

FIGS. 11A, 11B, 12A and 12B illustrate connection resume procedures for LTE. The UE 50 initiates the resume procedure when 1) upper layers request resume of an RRC connection while the UE 50 is in RRC_IDLE, 2) upper layers request resume of an RRC connection or 3) RRC layer requests resume of an RRC connection for, e.g. RNAU or reception of RAN paging while the UE 50 is in RRC_INACTIVE state. To resume a suspended or inactive connection, the UE 50 sends a RRCConnectionResumeRequest message to the network. If the procedure is successful (FIG. 11A) the UE 50 receives a RRCConnectionResume from the network. The RRCConnectionResume is not encrypted but is integrity protected. The UE 50 responds with a RRCConnectionResumeComplete. The resume procedure in LTE can be found in the RRC specifications (TS 36.331). Because a UE 50 resuming a connection transitions from RRC_IDLE to RRC_CONNECTED, the connection resume procedure is specified in subclause 5.3.3, which also captures the RRC connection establishment procedures.

Figure 11A:
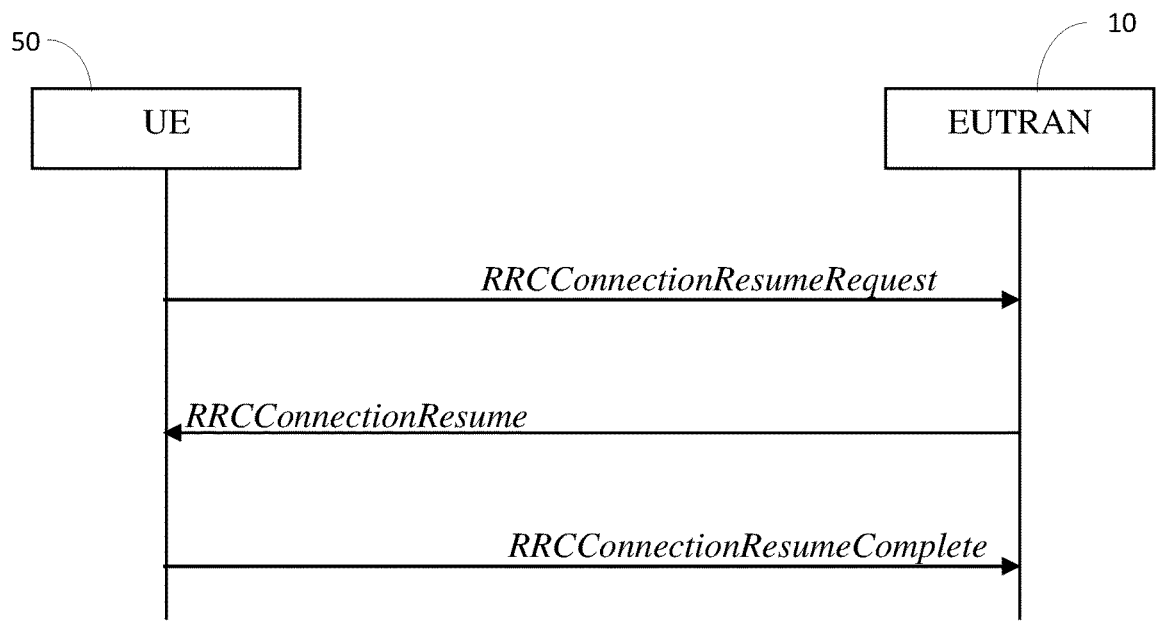
FIG. 11A illustrates a connection resume procedure for LTE for a suspended or inactive RRC connection where the request is successful.
Figure 11B:
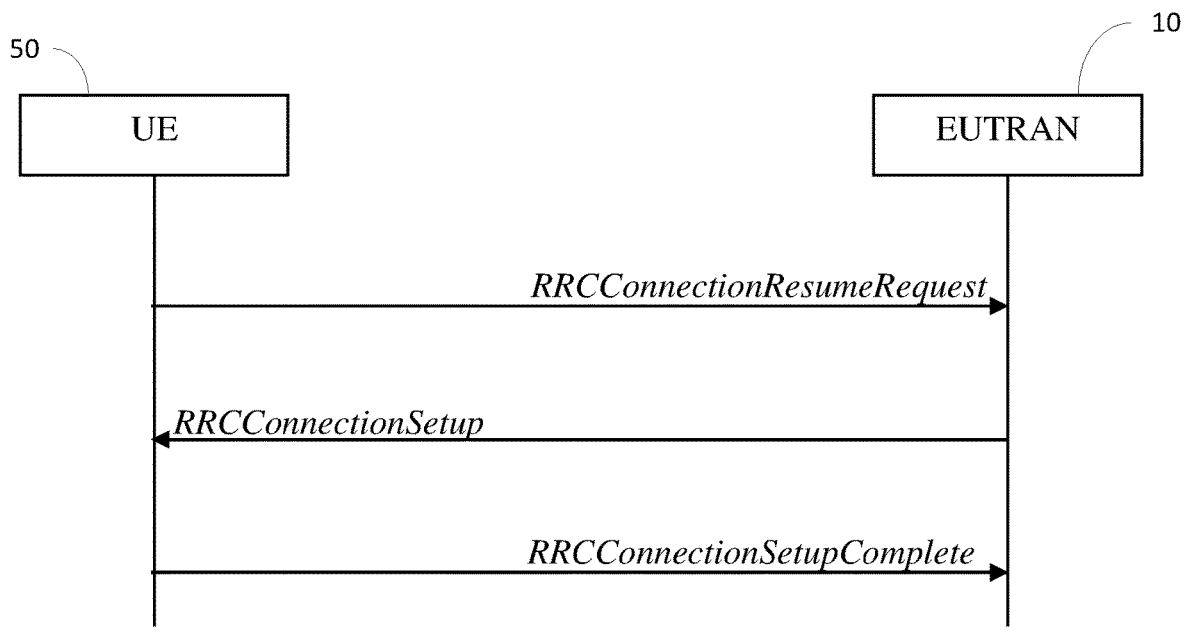
FIG. 11B illustrates a connection resume procedure for LTE for a suspended or inactive RRC connection resulting in fallback to connection establishment.
Figure 12A:
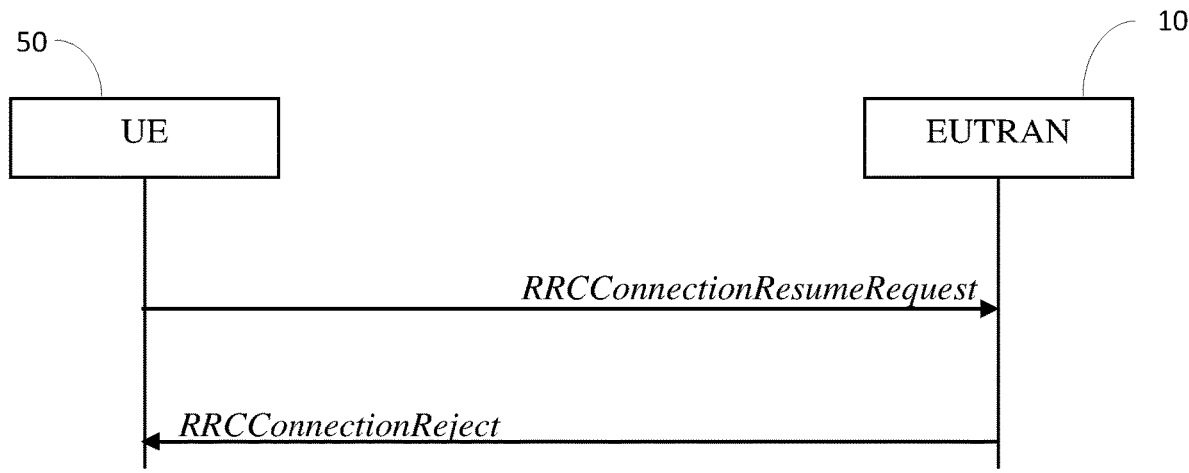
FIG. 12A illustrates a connection resume procedure for LTE for a suspended or inactive RRC connection where the request is rejected.
Figure 12B:
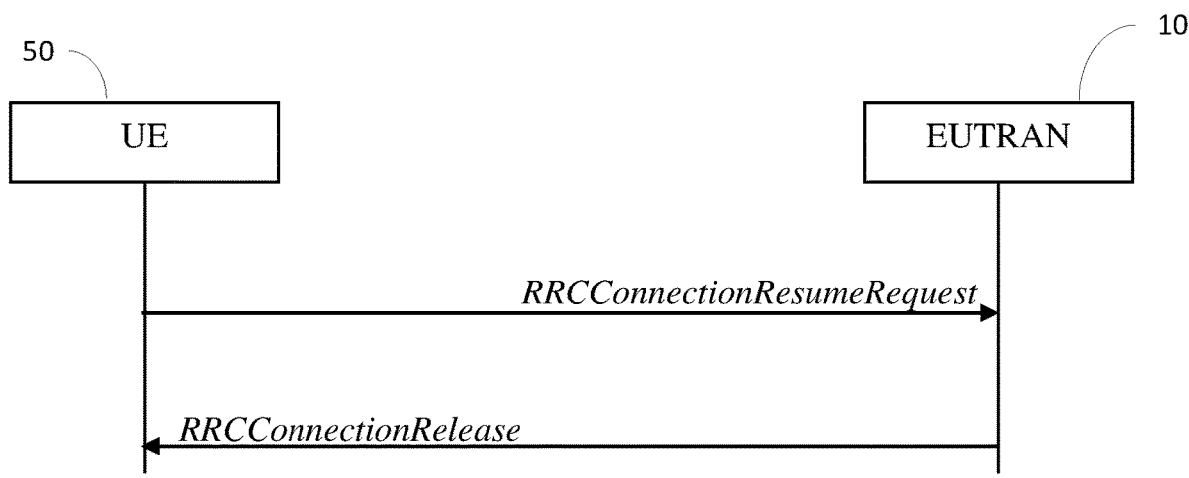
FIG. 12B illustrates a connection resume procedure for LTE for a suspended or inactive RRC connection followed by a network release.

In some cases, the network may respond with a RRCConnectionSetup from the network to initiate fallback to a connection establishment procedure (FIG. 11B). After reestablishing the connection, the UE 50 sends a RRCConnectionSetupComplete to the network. The network can also respond with a RRCConnectionReject to reject the request (FIG. 12A) or a RRCConnectionRelease to release the connection (FIG. 12B).

There are few things relevant to highlight in the SCG configurations and SCell configurations for master cell groups (MCGs) in relation to suspend/resume procedures. Upon suspension, it is specified that the UE 50 stores its used RRC configuration. In other words, if the UE 50 is operating in any DC mode (and has an SCG configuration) or just having configured SCells in the MCG, it shall store these configurations. However, at least until Rel-15, it was specified that the UE 50 shall release the SCG configurations and SCell configurations upon resume. In particular, subclause 5.3.3.2 of TS 36.331 specifies that, except for IoT, upon initiating the resume procedure, a UE 50 that is connected to EPC or 5GC and is resuming an RRC connection from a suspended RRC connection or from RRC_INACTIVE, shall perform certain steps. If the UE 50 was configured with EN-DC and is resuming an RRC connection from a suspended RRC connection, the UE 50 performs EN-DC release (e.g., as specified in TS 38.331, clause 5.3.5.10).), Also, the UE 50 will also release the MCG SCell(s), if configured, in accordance with 5.3.10.3a. The UE 50 will also release the entire SCG, if configured, except for the ORB configuration (as configured by drb-ToAddModList-SCG).

Hence, according to known techniques, when the UE 50 returns from RRC_IDLE with a stored context and the network wants to add SCell(s) to the MCG or add an SCG, it needs to do that from scratch, even if the UE 50 is suspending and resuming in the same cell/area where all the previous PCell and SCell configurations are still valid from a radio conditions perspective.

Early Measurements

It is common for UEs with bursty traffic to frequently suspend and resume in the same cell. Accordingly, 3GPP has standardized a solution in LTE to enable the UE 50 to assist the network with measurements performed while the UE 50 is in RRC_IDLE so that the network can speed up the setup of CA or DC.

In LTE Rel-15, it is possible to configure the UE 50 to report "early measurements" upon the transition from Idle state to Connected state. These "early measurements" are performed by the UE 50 in the Idle state according to a configuration provided by the source cell. The UE 50 reports the "early measurements" immediately after the UE 50 returns to a Connected state. These "early measurements" enable quick setup of CA and/or other forms of DC (e.g., EN-DC, MR-DC, etc.) without the need to first provide a measurement configuration (measConfig) in RRC_CONNECTED, which would result in a delay of hundreds of milliseconds until first samples are collected, monitored, and then the first reports are triggered and transmitted to the network.

One aspect of the present disclosure relates to early measurements made while the UE 50 is in Idle mode. Idle mode measurements is described in TS 36.331, subclause 5.6.20, Idle Mode Measurements. The UE 50 receives Idle mode measurement configurations in the system information block (SIB5) in the field Meas/dleConfigSIB-r15, indicating up to 8 cells or ranges of cell IDs on which to perform measurements in Idle state. In addition, the UE 50 can be configured upon the transition from RRC_CONNECTED to RRC_IDLE with a dedicated measurement configuration in the RRCConnectionRelease message with the meas/dleOedicated-r15 which overrides the broadcasted configurations in SIB5. The broadcasted and dedicated signaling is shown below.

| RRCConnectionRelease message |
|---|
| ```
-- ASN1START
RRCConnectionRelease ::=            SEQUENCE {
    rrc-TransactionIdentifier       RRC-TransactionIdentifier,
    criticalExtensions              CHOICE {
        c1                              CHOICE {
            rrcConnectionRelease-r8         RRCConnectionRelease-r8-IEs,
            spare3 NULL, spare2 NULL, spare1 NULL
        },
        criticalExtensionsFuture        SEQUENCE { }
    }
}
-- other info has been omitted
RRCConnectionRelease-v1530-IEs ::= SEQUENCE {
    drb-ContinueROHC-r15            ENUMERATED {true} OPTIONAL, -- Cond UP-EDT
    nextHopChainingCount-r15        NextHopChainingCount OPTIONAL, -- Cond UP-EDT
    measIdleConfig-r15              MeasIdleConfigDedicated-r15 OPTIONAL, -- Need ON
    rrc-InactiveConfig-r15          RRC-InactiveConfig-r15 OPTIONAL, -- Need OR
    cn-Type-r15                     ENUMERATED {epc, fivegc} OPTIONAL, -- Need OR
    nonCriticalExtension            SEQUENCE { } OPTIONAL
}
-- ASN1STOP
``` |

| MeasIdleConfig information element |
|---|
| ```
-- ASN1START
MeasIdleConfigSIB-r15        ::= SEQUENCE {
    measIdleCarrierListEUTRA-r15    EUTRA-CarrierList-r15,
    ...
}
MeasIdleConfigDedicated-r15 ::= SEQUENCE {
    measIdleCarrierList EUTRA-r15   EUTRA-CarrierList-r15       OPTIONAL,    -- Need OR
    measIdleDuration-r15    ENUMERATED { sec10, sec30, sec60, sec120,
                                         sec180, sec240, sec300, spare},
    ...
}
EUTRA-CarrierList-r15 ::= SEQUENCE (SIZE (1 .. maxFreqIdle-r15) ) OF MeasIdleCarrierEUTRA-r15
MeasIdleCarrierEUTRA-r15 ::=        SEQUENCE {
    carrierFreq-r15                 ARFCN-ValueEUTRA-r9,
    allowedMeasBandwidth-r15        AllowedMeasBandwidth,
    validityArea-r15                CellList-r15                OPTIONAL,    -- Need OR
    measCellList-r15                CellList-r15                OPTIONAL,    -- Need OR
    reportQuantities                ENUMERATED {rsrp, rsrq, both },
    qualityThreshold-r15            SEQUENCE {                  OPTIONAL,    -- Need OR
        idleRSRP-Threshold-r15          RSRP-Range              OPTIONAL,    -- Need OR
        idleRSRQ-Threshold-r15          RSRQ-Range-r13          OPTIONAL,    -- Need OR
    }
    ...
}
CellList-r15 ::=    SEQUENCE (SIZE (1 .. maxCellMeasIdle-r15) ) OF PhysCellIdRange
-- ASN1STOP
``` |

| MeasIdleConfig field descriptions |
| --- |
| allowedMeasBandwidth<br>  If absent, the value corresponding to the downlink indicated by the dl-Bandwidth included in MasterInformationBlock of serving cell applies.<br>  carrierFreq<br>  Indicates the E-UTRA carrier frequency to be used for measurements during IDLE mode.<br>  measIdleCarrierListEUTRA<br>  Indicates the E-UTRA carriers to be measured during IDLE mode.<br>  measIdleDuration<br>  Indicates the duration for performing measurements during IDLE mode for measurements assigned via RRCConnectionRelease. Value sec10 correspond to 10 seconds, value sec30 to 30 seconds and so on.<br>  qualityThreshold<br>  Indicates the quality thresholds for reporting the measured cells for IDLE mode measurements.<br>  reportQuantities<br>  Indicates which measurement quantities UE 50 is requested to report in the IDLE mode measurement report.<br>  measCellList<br>  Indicates the list of cells which the UE 50 is requested to measure and report for IDLE mode measurements.<br>  validityArea<br>  Indicates the list of cells within which UE 50 is requested to do IDLE mode measurements. If the UE 50 reselects to a cell outside this list, the measurements are no longer required. |

The UE 50 is provided with a list of carriers and optionally with a list of cells on which the UE 50 performs measurements. The fields s-NonIntraSearch in SystemInformationBlockType3 do not affect the UE 50 measurement procedures in IDLE mode.

Upon the reception of the measurement configuration, the UE 50 starts a timer T331 with the value provided in measIdleDuration, which can range from 0to 300 seconds. The timer stops upon receiving RRCConnectionSetup or RRCConnectionResume, which indicates a transition to RRC_CONNECTED. The timer limits the amount of time the UE 50 perform measurements for the purpose of early measurements.

Another concept introduced in the LTE rel-15 is a validity area, which comprises a list of PCIs. The intention is to limit the area where CA or DC may be setup later when the UE 50 resumes or establishes a connection, so the early measurements are somewhat useful for that purpose. If a validityArea is configured, and UE 50 reselects to a serving cell whose PCI does not match any entry in validityArea for the corresponding carrier frequency, the timer T331 is stopped. Then, the UE 50 stops performing IDLE measurements and releases the configuration (i.e., VarMeasIdleConfig). Stopping measurements does not necessarily imply that the UE 50 releases the idle measurements that were configured in the release message and that were performed. These measurements may still be stored and possibly requested by the network. In addition, the UE 50 may continue with IDLE mode measurements according to the broadcasted SIB5 configuration after the timer T331 has expired or stopped.

Only measurements above a certain threshold are stored as the cell candidates, as CA setup needs to be within a minimum acceptable threshold. How the UE 50 performs measurements in IDLE mode is up to UE 50 implementation as long as RAN4 requirements for measurement reporting defined in 36.133 are met.

Idle Mode Measurement Procedures

Subclause 5.6.20 specifies the measurements done by a UE 50 in RRC_IDLE when it has an IDLE mode measurement configuration and the storage of the available measurements by a UE 50 in both RRC_IDLE and RRC_CONNECTED. Upon initiation and while timer T331 is running, the UE 50 performs measurements for each entry in measIdleCarrierListEUTRA within VarMeasIdleConfig. If UE 50 supports carrier aggregation between serving carrier and the carrier frequency and bandwidth indicated by carrierFreq and allowedMeasBandwidth within the corresponding entry, the UE 50 will perform the measurements in the carrier frequency and bandwidth indicated by carrierFreq and allowedMeasBandwidth within the corresponding entry. Note that the fields s-NonIntraSearch in SystemInformationBlockType3 does not affect the UE 50 measurement procedures in IDLE mode. How the UE 50 performs measurements in IDLE mode is up to UE 50 implementation as long as the requirements in TS 36.133 are met for measurement reporting. The UE 50 is not required to perform idle measurements if SIB2 idle measurement indication is not configured.

If UE 50 supports CA between serving carrier and the carrier frequency and bandwidth indicated by carrierFreq and allowedMeasBandwidth within the corresponding entry, and the measCellList is included, the UE 50 will consider PCell and cells identified by each entry within the measCellList to be applicable for Idle mode measurement reporting. If the measCellList is not included, the UE 50 will consider PCell and up to maxCellMeasIdle strongest identified cells whose RSRP/RSRQ measurement results are above the value(s) provided in qualityThreshold (if any) to be applicable for Idle mode measurement reporting.

If UE 50 supports carrier aggregation between the serving carrier and the carrier frequency and bandwidth indicated by carrierFreq and allowedMeasBandwidth within the corresponding entry, the UE 50 will store measurement results for cells applicable for Idle mode measurement reporting within the VarMeasIdleReport.

If UE 50 does not support carrier aggregation between the serving carrier and the carrier frequency and bandwidth indicated by carrierFreq and allowedMeasBandwidth within the corresponding entry, the UE 50 will not consider the carrier frequency to be applicable for Idle mode measurement reporting.

Regardless of whether the UE 50 does or does not support carrier aggregation between serving carrier and the carrier frequency and bandwidth indicated by carrierFreq and allowedMeasBandwidth within the corresponding entry, if validityArea is configured in VarMeasIdleConfig and UE 50 reselects to a serving cell whose physical cell identity does not match any entry in validityArea for the corresponding carrier frequency, the UE 50 will stop the T331 timer. If the T331 expires or is stopped, the UE 50 will release the VarMeasIdleConfig.

Note that it is up to UE 50 implementation as to whether to continue IDLE mode measurements according to SIB5 configuration after T331 has expired or stopped.

If the UE 50 is configured to store idle measurements, the network may request from the UE 50, after a connection is established or resumed and after security is activated, whether the UE 50 has idle measurements available. When the UE 50 is setting up a connection coming from RRC_IDLE without the AS context, the network is not aware that the UE 50 has available measurements stored. To allow the network to know that, and possibly request the UE 50 to report early measurements, the UE 50 may indicate the availability of stored idle measurements in RRCConnection-SetupComplete. As not all cells would support this feature, the UE 50 only includes availability information if the cell broadcasts in SIB2 the idleModeMeasurements indication. The flag in RRCReconnectionSetupComplete and procedure text are shown below.

```
RRCConnectionSetupComplete-v1530-IEs ::= SEQUENCE {
    logMeasAvailableBT-r15      ENUMERATED {true}    OPTIONAL,
    logMeasAvailableWLAN-r15    ENUMERATED {true}    OPTIONAL,
    IdleMeasAvailable-r15       ENUMERATED {true}    OPTIONAL,
    flightPathInfoAvailable-r15 ENUMERATED {true}    OPTIONAL,
    connectTo5GC-r15            ENUMERATED {true}    OPTIONAL,
    registeredAMF-r15           RegisteredAMF-r15    OPTIONAL,
    S-NSSAI-list-r15            SEQUENCE(SIZE (1..maxNrofs-NASSAI-r15) ) of S-
NSSAI-r15 OPTIONAL,
    ng-5G-S-TMSI-Bits-r15       Choice {
        ng-5G-S-TMSI-r15            NG-5G-S-TMSI-r15,
        ng-5G-S-TMSI-Part2-r15      BIT STRING (SIZE (8) )
}                                                    OPTIONAL,
nonCriticalExtension            RRCConnectionSetupComplete-v1540-IEs OPTIONAL
}
```

Subclause 5.3.3.4 of TS 36.331 in LTE Rel-15 specifies procedures for reporting early measurements when the UE 50 receives a RRCConnectionSetup from the network. Prior to the UE 50 receiving the RRCConnectionSetup message, lower layer signaling is used to allocate a C-RNTI (see TS 36.321). Having received the RRCConnectionSetup message, the UE 50 sets the content of the RRCConnectionSetupComplete message differently when the UE 50 is connected to EPC, depending on whether an NB-IoT scenario is involved. Except for NB-IoT, if the SIB2 contains idleModeMeasurements, and the UE 50 has IDLE mode measurement information available in VarMeasIdleReport, the UE 50 includes the idleMeasAvailable and stops the T331 timer (if running). In NB-IoT however, if the UE 50 supports serving cell Idle mode measurements reporting and serving-CellMeasInfo is present in SystemInformationBlockType2-NB, the UE 50 sets the measResultServCell to include the measurements of the serving cell. Note that the UE 50 includes the latest results of the serving cell measurements as used for cell selection/reselection evaluation, which are performed in accordance with the performance requirements as specified in TS 36.133. In either scenario, the UE 50 includes den-ID if a DCN-ID value (see TS 23.401) is received from upper layers.

If the UE 50 is setting up a connection coming from RRC_IDLE but with a stored AS context (i.e., resume from suspended), the network may be aware that the UE 50 has available idle measurements stored after checking the fetched context from the source node where the UE 50 was suspended. However, it is still not certain that the UE 50 has measurements available since the UE 50 is only required to perform the measurements if the cells are above the configured RSRP/RSRQ thresholds and while it performs cell selection/cell reselection within the configured validity area. To enable the network to know about early measurements, and possibly request the UE 50 to report early measurements, the UE 50 may also indicate the availability of stored idle measurements in RRCConnectionResumeComplete. As not all cells would support the feature, the UE 50 only includes that availability information if the cell broadcasts in SIB2 the idleModeMeasurements indication. The flag in RRCReconnectionResumeComplete and procedure text are shown below, using the idleMeasAvailable-r15 field.

```
RRCConnectionResumeComplete-v1530-IEs ::= SEQUENCE {
    logMeasAvailableBT-r15      ENUMERATED {true} OPTIONAL,
    logMeasAvailableWLAN-r15    ENUMERATED {true} OPTIONAL,
    idleMeasAvailable-r15       ENUMERATED {true} OPTIONAL,
```

-continued

```
    flightPathInfoAvailable-r15 ENUMERATED {true} OPTIONAL,
    nonCriticalExtension        SEQUENCE { }      OPTIONAL
}
```

Subclause 5.3.3.4a of TS 36.331 in LTE Rel-15 specifies procedures for reporting early measurements when the UE 50 receives a RRCConnectionResume from the network. The UE 50 sets the content of the RRCConnectionResumeComplete message differently, depending on whether an NB-IoT scenario is involved. Except in NB-IoT scenarios, if the SIB2 contains idleModeMeasurements, and the UE 50 has IDLE mode measurement information available in VarMeasIdleReport, the UE 50 includes the idleMeasAvailable, and stops the T331 timer (if running). In NB-IoT, if the UE 50 supports serving cell Idle mode measurements reporting and servingCellMeasInfo is present in SystemInformationBlockType2-NB, the UE 50 sets the measResultServCell to include the measurements of the serving cell. Note that the UE 50 includes the latest results of the serving cell measurements as used for cell selection/reselection evaluation, which are performed in accordance with the performance requirements as specified in TS 36.133.

Regardless of whether or not an NB-IoT scenario is involved, the UE 50 submits the RRCConnectionResumeComplete message to lower layers for transmission, and the procedure ends.

Figure 13:
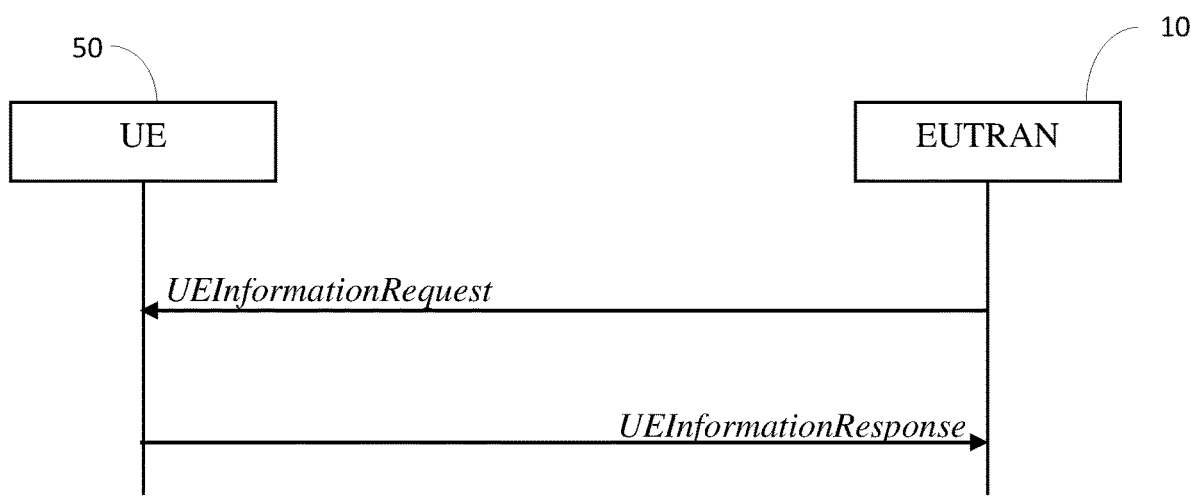
FIG. 13 illustrates a procedure for requesting early measurements.

As shown in FIG. 13, once the UE 50 indicates to the target cell upon resume or setup that idle measurements are available, the network may finally request the UE 50 to report these available measurements by including the field idleModeMeasurementReq in the UEInformationRequest message transmitted to the UE 50. Then, the UE 50 responds with a UEInformationResponse containing these measurements.

Subclause 5.6.5.3 of TS 36.331 in LTE Rel-15 specifies a procedure for requesting early measurements. Upon receiving the UEInformationRequest message (and only after successful security activation), if the idleModeMeasurementReq is included in the UEInformationRequest and UE 50 has stored VarMeasIdleReport, the UE 50 shall set the measResultListIdle in the UEInformationResponse message to the value of idleMeasReport in the VarMeasIdleReport, and discard the VarMeasIdleReport upon successful delivery of the UEInformationResponse message (shown below) confirmed by lower layers.

| UEInformationResponse message |
| --- |
| ```
-- ASN1START
UEInformationResponse-r9 ::=    SEQUENCE {
    rrc-TransactionIdentifier      RRC-TransactionIdentifier,
    criticalExtensions             CHOICE {
        c1                             CHOICE {
            ueInformationResponse-r9       UEInformationResponse-r9-IEs,
            spare3 NULL, spare2 NULL, spare1 NULL
        },
        criticalExtensionFuture        SEQUENCE { }
    }
}
UEInformationResponse-v1530-IEs ::= SEQUENCE {
    measResultListIdle-r15         MeasResultListIdle-r15 OPTIONAL,
    flightPathInfoReport-r15       FlightPathInfoReport-r15 OPTIONAL,
    nonCriticalExtension           SEQUENCE { } OPTIONAL
}
``` |

A work item has been approved in Rel-16 to enhance the setup of CA/DC in NR. One of the objectives for early measurement reporting is for early and fast reporting of measurement information availability for neighbor and serving cells to reduce delay in setting up MR-DC and/or CA. This objective applies to MR-DC, NR-NR DC and CA. The objective considers measurements in IDLE, INACTIVE mode and CONNECTED mode while minimizing the impacts on UE 50 power consumption and using the LTE Rel-15 euCA work when applicable. As a result of this work item, 3GPP is investigating solutions to enable early measurements performed when the UE 50 is in RRC_INACTIVE or RRC_IDLE state and, reporting mechanisms for when the UE 50 enters RRC CONNECTED.

Three different kinds of solutions are being considered. In one solution, the UE 50 reports early measurements in UEInformationResponse after request from network in UEInformationRequest transmitted after the UE 50 sends an RRCResumeComplete or, after security is activated when UE 50 returns from Idle state without stored context (as in LTE Rel-15). In a second solution, the UE 50 reports early measurements multiplexed with or as part of the RRCResumeComplete message. In a third solution, the UE 50 reports early measurements multiplexed with or as part of the RRCResumeRequest message.

There are some differences in details of each of these solutions, and not all of them may be applicable for RRC_IDLE in the same way they are for RRC_INACTIVE. However, in any of these solutions for the reporting, the UE 50 relies on a measurement configuration, which may be provided with dedicated signaling when the UE 50 is suspended to RRC_INACTIVE or when the UE 50 is released to RRC_IDLE. That measurement configuration indicates how the UE 50 shall perform these measurements to be reported when the UE 50 resumes (in the case of coming from RRC_INACTIVE or setups up a connection, in the case of coming from RRC_IDLE).

Agreement has also been reached concerning early measurement reporting for fast EN-DC and CA in NR (and LTE for EN-DC). For NR IDLE mode, the LTE Rel-15 euCA early measurement reporting solution via UEInformationRequest and UEInformationResponse like messages after connection is setup will be supported. In addition, for both LTE and NR, sending full Idle mode measurements before security activation shall not be allowed. Whether some measurement information related to Idle mode measurements can be sent before security activation require further study. Notwithstanding, The Security Mode Command (SMC) and Security Mode Complete messages will not be modified to enable the signaling of early measurements. For both LTE and NR, current specifications allow the UEInformationRequest (or equivalent message to be specified in NR) to be sent by the network immediate after the SMC without network having to wait for Security Mode Complete (similar to sending of Reconfiguration after SMC). For NR INACTIVE mode, the LTE rel-15 euCA early measurement reporting solution via UEInformationRequest and UEInformationResponse like messages after connection is resumed will be supported. Sending early measurement report is network controlled. For NR INACTIVE, the network can request early measurement report in RRCResume, whereas for NR INACTIVE, early measurement reporting can be sent in RRCResumeComplete (though it will require further study as to whether these cases should similarly be applied to LTE RRCConnectionResume and RRCConnectionResumeComplete message).

Moreover, it has been agreed that NR early measurements can be configured in both NR RRCRelease message and NR system information (SI), though it will require further study to determine whether there are differences in the configuration that can be provided by RRCRelease and SI. It has also been agreed to introduce some indication about the cell's early measurement support in NR system information. To control the duration of UE 50 performing both IDLE and INACTIVE measurements, a single validity timer (similar to measIdleDuration in LTE euCA) is mandatory indicated only in NR RRCRelease message, i.e. not included in NR SIB. For both IDLE and INACTIVE early measurements, IEs can be optionally configured per NR frequency in both NR RRCRelease message and NR SIB that indicate: 1) a list of frequencies and optionally cells (similar to measCelllist in LTE euCA) the UE 50 is required to perform early measurements; and 2) a cell quality threshold (similar to qualityThreshold in LTE euCA) the UE 50 is required to report the measurement results only for the cells which met the configured thresholds. Notwithstanding, it will require further study as to whether adopt a validity area (similar to validityArea in LTE euCA) to indicate the list of cells within which UE 50 is required to perform early measurements, and if the UE 50 reselects to a cell outside this list, the early measurements are no longer required (same as timer expiry). If such is absent, the UE 50 will not have area limitation of early measurements.

For Synchronization Signaling Block (SSB) based measurements, and for both IDLE and INACTIVE early measurements: 1) SSB frequencies to be measured can be located out of sync faster; 2) RSRP and RSRQ can be configured as cell and beam measurement quantity; and 3) the configuration parameters provided per SSB frequency follow the same principles as those provided in SIB2/4 for the purposes of Idle/Inactive mobility. As LTE euCA, cell/beam signal-to-interference plus noise ratio (SINR) is not introduced as measurement quantity in NR early measurement configuration in Rel-16.

For SSB based beam level measurement configurations, the UE 50 is required to report the beam with the highest measurement quantity, and it will require further study to determine whether additional beams can be reported. For both IDLE and INACTIVE early measurements, the UE 50 can be configured with one of the 3 beam reporting types: 1) no beam reporting; 2) only beam identifier; and 3) both beam identifier and quantity. It will require further study to determine whether to support CSI-RS based NR early measurements. Finally, LTE UE 50 in IDLE mode, IDLE with suspended, and INACTIVE can be configured with NR early measurements to support fast setup of (NG)EN-DC (i.e. euCA is extended to support NR measurements).

Figure 14:
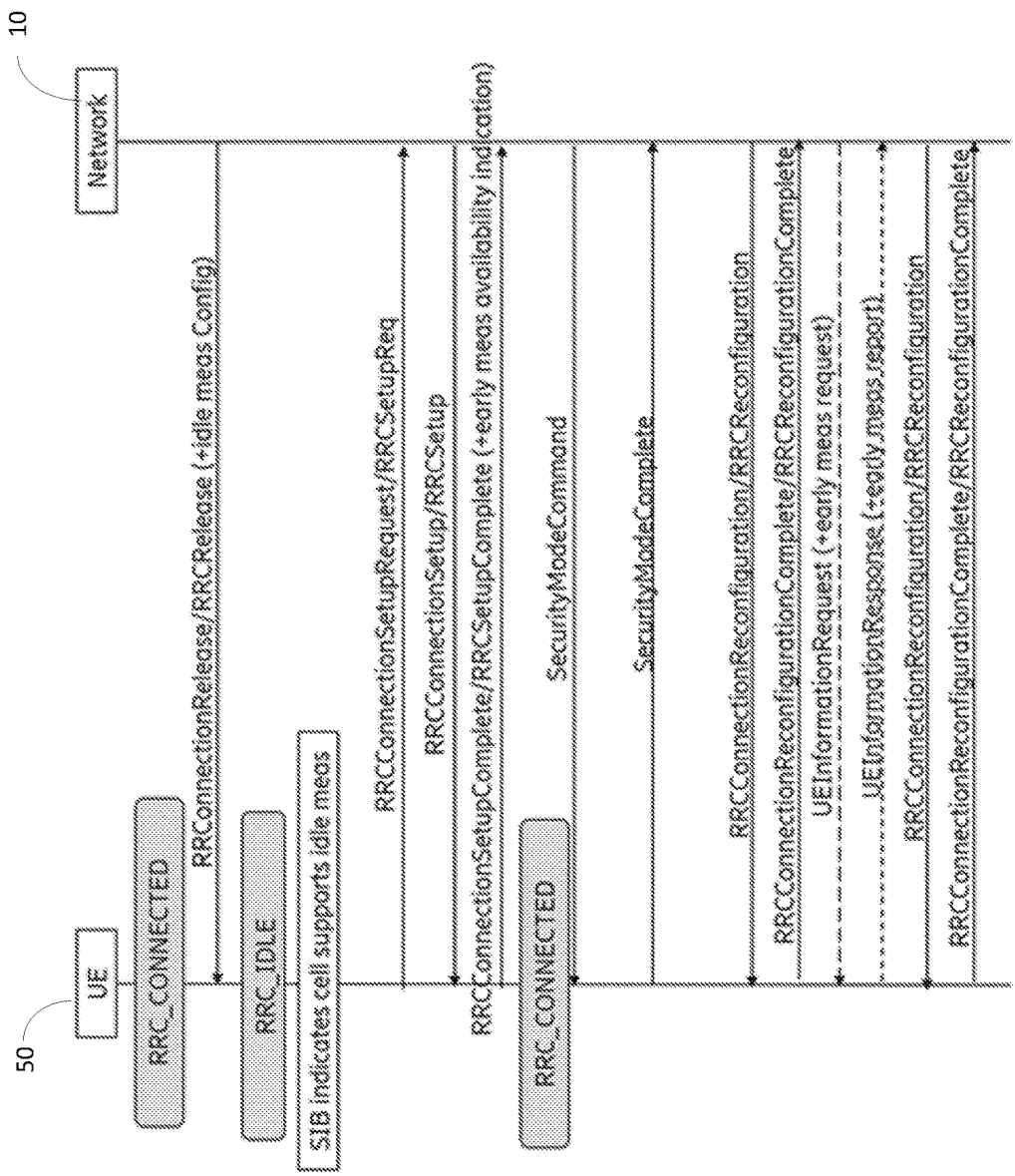
FIG. 14 illustrates an early measurement reporting procedure for NR/LTE during connection setup.
Figure 15:
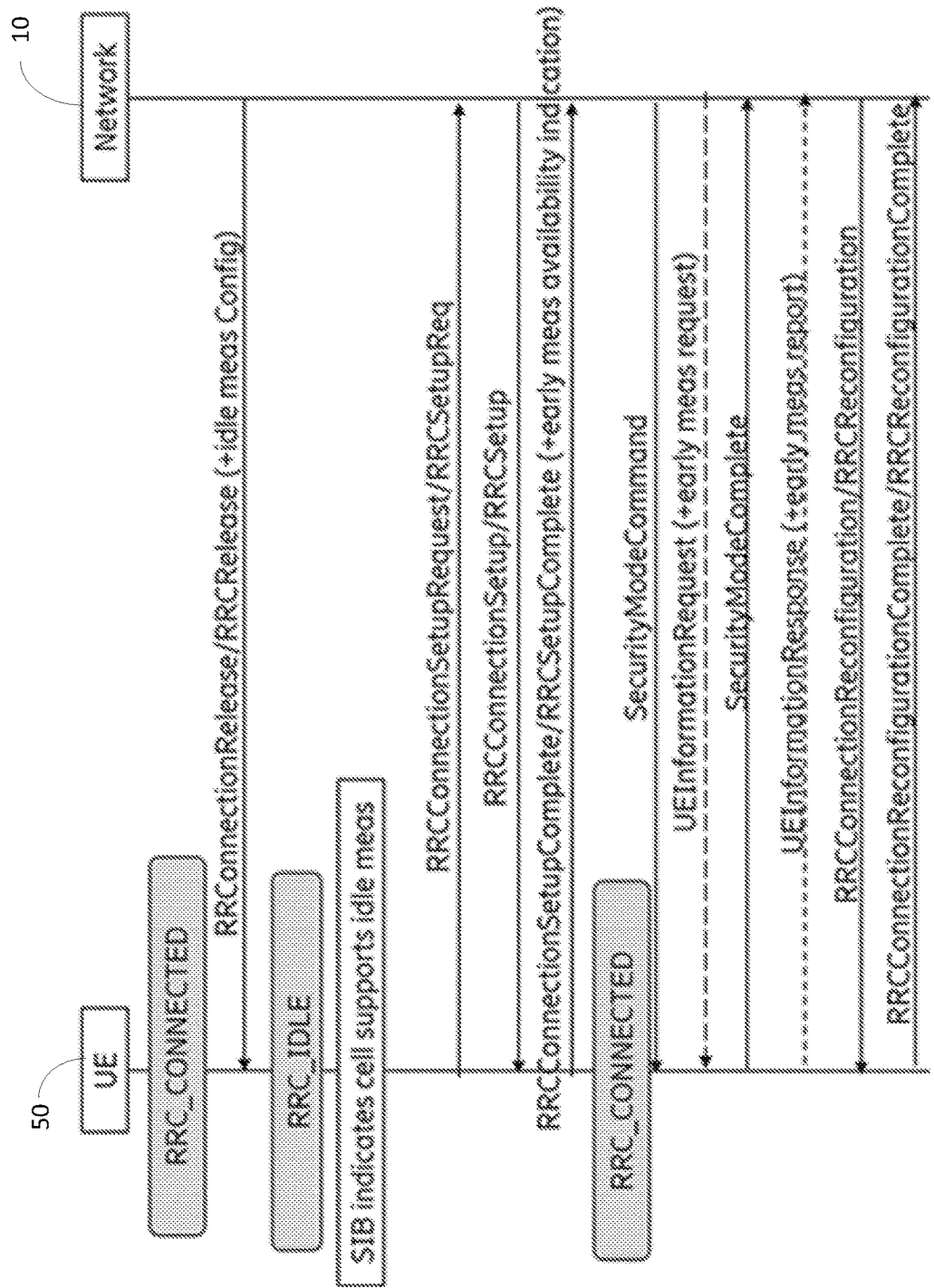
FIG. 15 illustrates another early measurement reporting procedure for NR/LTE Idle mode during connection setup.
Figure 16:
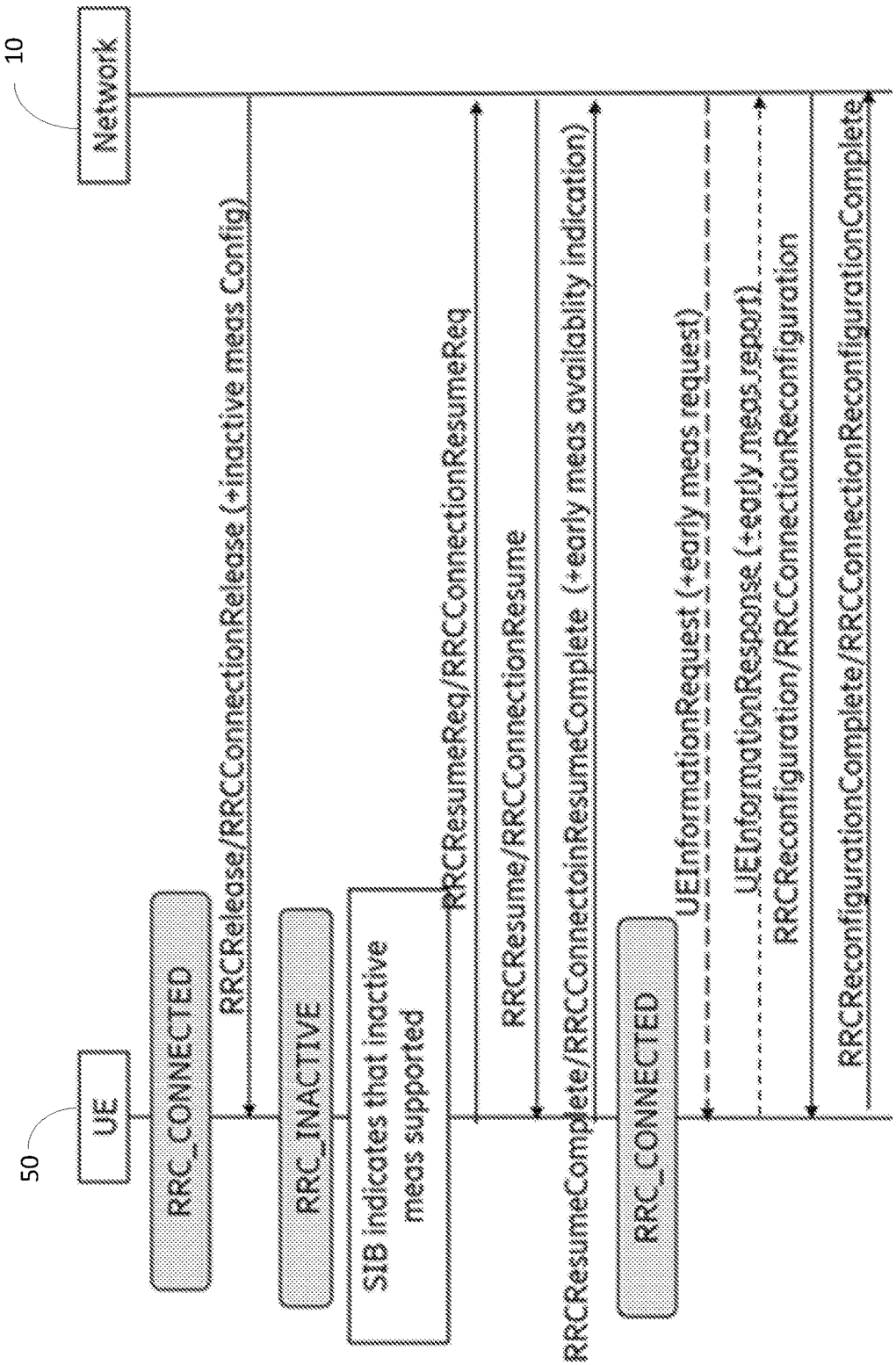
FIG. 16 illustrates early measurement reporting procedures for power saving modes including LTE Idle with suspended, LTE Inactive, or NR Inactive modes.
Figure 17:
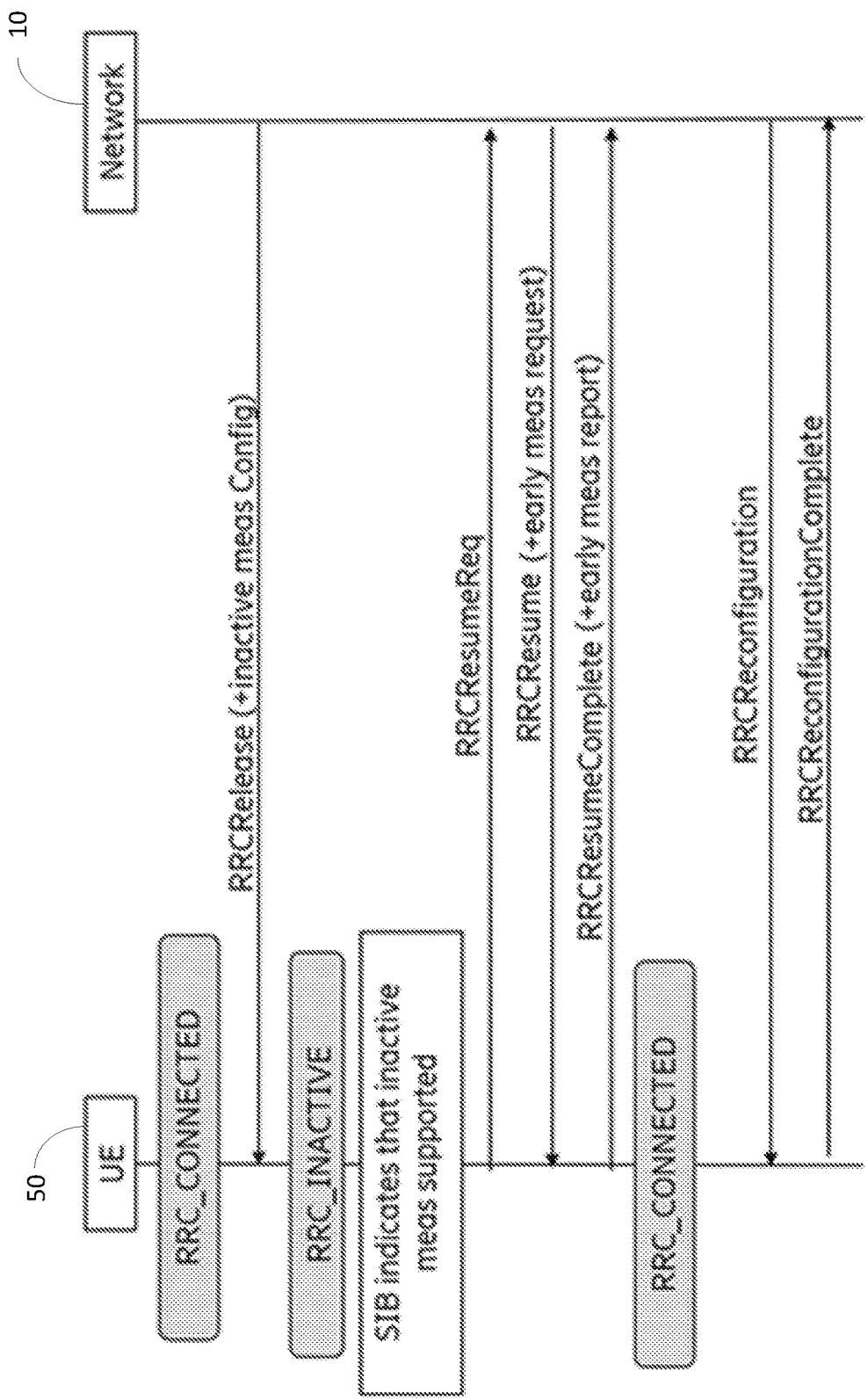
FIG. 17 illustrates another early measurement reporting procedures for power saving modes including LTE Idle with suspended, LTE Inactive, or NR Inactive modes.

FIGS. 14-17 illustrate early measurement reporting procedure based on the current agreements. FIG. 14 illustrates an early measurement reporting procedure for NR/LTE during connection setup. FIG. 15 illustrates another early measurement reporting procedure for NR/LTE Idle mode during connection setup. FIG. 16 illustrates early measurement reporting procedures for power saving modes including LTE Idle with suspended, LTE Inactive, or NR Inactive modes. FIG. 17 illustrates another early measurement reporting procedure for power saving modes including LTE Idle with suspended, LTE Inactive, or NR Inactive modes.

Cell Search and Random Access for Early Measurements

Cell search is the procedure by which a UE 50 acquires time and frequency synchronization with a cell and detects the Physical Cell ID (PCI) of that cell. NR cell search is based on the primary and secondary synchronization signals (PSS/SSS), and Physical Broadcast Channel (PBCH), DeModulation Reference Signal (DMRS) (where the Master Information Block (MIB) is transmitted), located on the synchronization raster. By detecting the PSS, a cell sector ID, a symbol timing and a frequency location can be acquired. Then, using the obtained information, a full PCI can be obtained by detecting the SSS. The signals and channels in NR are sometimes referred to as PSS, SSS, DMRS for PBCH and PBCH, and other times referred to as NR-PSS, NR-SSS, DMRS for NR-PBCH and NR-PBCH in NR. These elements are combined in an entity/structure denoted as Synchronization Signal (SS) Block (SSB) or, with other terminology, SS/PBCH block. The term SS Block is typically used in 3GPP TSG-RAN WG2 (RAN2) while 3GPP TSG-RAN WG1 (RAN1) usually uses the term SS/PBCH block. Hence, SS Block, SSB and SS/PBCH block are synonymous (although SSB is really an abbreviation of SS Block).

The PSS+SSS enables a UE 50 to synchronize with the cell and also carries information from which the Physical Cell Identity (PCI) can be derived. The PBCH part (including DMRS) of the SSB carries a part of the system information denoted MIB (Master Information Block) or NR-MIB, 8 layer-one generated bits and the SSB index within the SS Burst Set. In high frequencies, SS Blocks will be transmitted periodically using beam sweeping. Multiple such beamformed SS Block transmissions are grouped into an SS Burst Set which constitutes a full beam sweep of SS Block transmissions. When many beams are used, longer gaps, e.g., 2 or 4 slots (where each slot contains 14 OFDM symbols) are inserted into the beam sweep. This effectively creates groups of SS Block transmissions within the SS Burst Set, which, using an obsolete term, could be referred to as SS Bursts.

Figure 18:
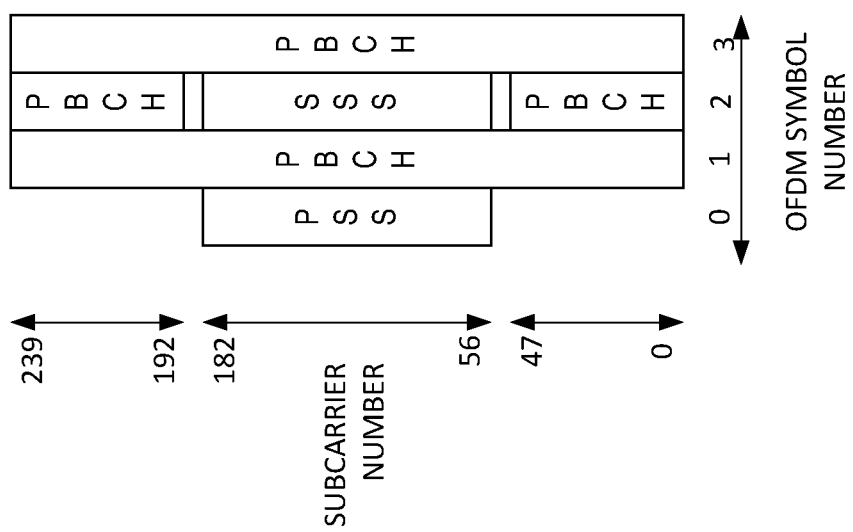
FIG. 18 illustrates a Synchronization Signal Block (SSB) for NR for cell search.

The SS block (SSB) consists of primary and secondary synchronization signals (PSS, SSS), each occupying 1 symbol and 127 subcarriers, and PBCH spanning across 3 OFDM symbols and 240 subcarriers, but leaving one symbol in an unused part on some subcarriers in the middle for SSS as shown in FIG. 18. The possible time locations of SSBs within a half-frame are determined by sub-carrier spacing and the periodicity of the half-frames where SSBs are transmitted as configured by the network. During a half-frame, different SSBs may be transmitted in different spatial directions (i.e. using different beams, spanning the coverage area of a cell). Within the frequency span of a carrier, multiple SSBs can be transmitted. The PCIs of SSBs transmitted in different frequency locations do not have to be unique, i.e. different SSBs in the frequency domain can have different PCIs. However, when an SSB is associated with a Remaining Minimum System Information (RMSI), the SSB corresponds to an individual cell, which has a unique NCGI (see subclause 8.2). Such an SSB is referred to as a Cell-Defining SSB (CD-SSB). A PCell is always associated with a CD-SSB located on the synchronization raster.

For PBCH, polar coding is used. Further, the UE 50 may assume a band-specific sub-carrier spacing for the SSB unless a network has configured the UE 50 to assume a different sub-carrier spacing. PBCH symbols carry their own frequency-multiplexed DMRS. Quadrature Phase Shift Keying (QPSK) modulation is used for PBCH.

Figure 19:
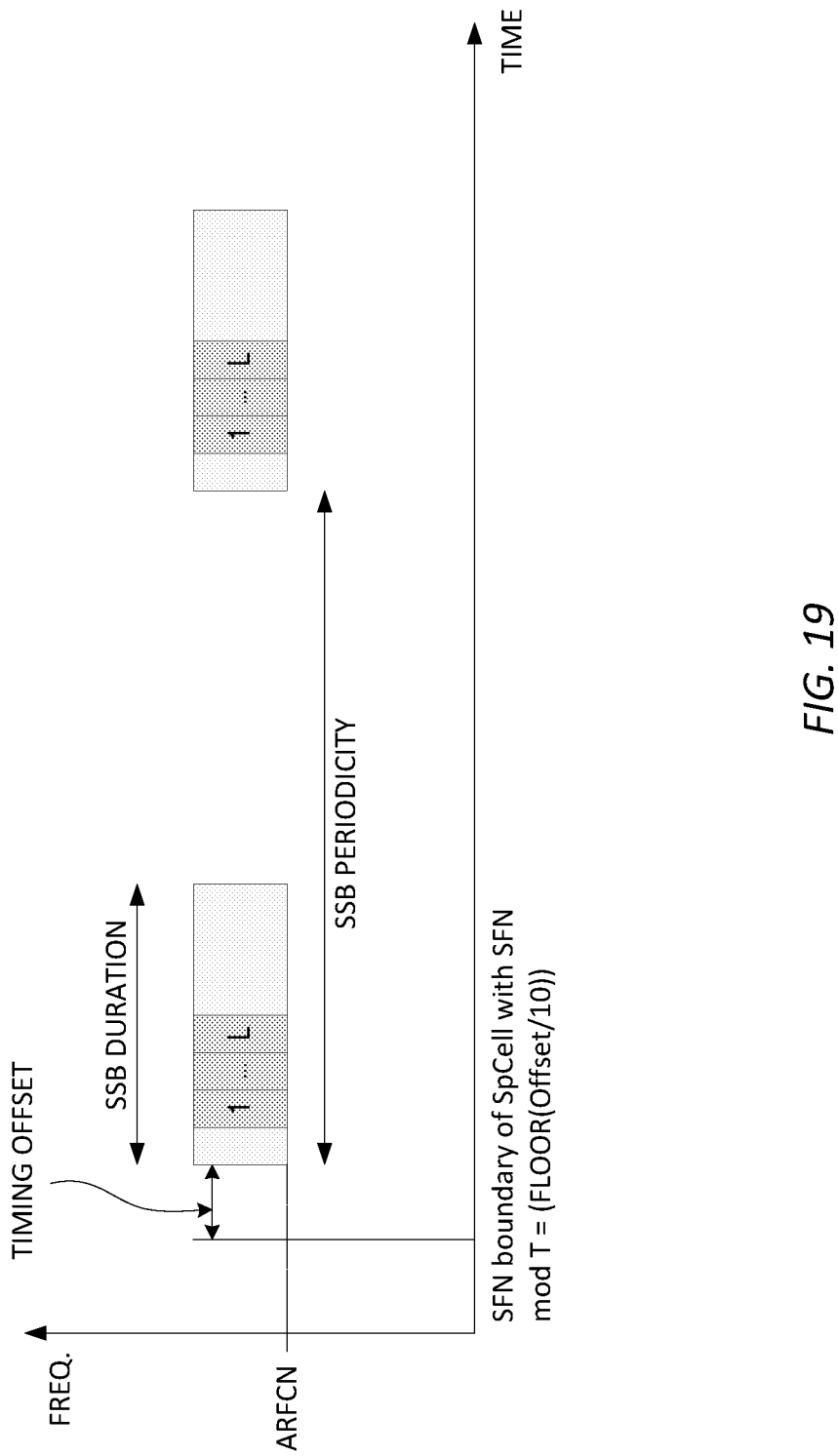
FIG. 19 illustrates variable periodicity and length of SSBs in NR.

In NR, the SS/PBCH Blocks (SSB)s may have a variable periodicity and length as shown in FIG. 19. In order to assist the UEs to find these, the UE 50 is configured with an SS/PBCH block measurement timing configuration (SMTC). The UE 50 sets up the SMTC in accordance with the received periodicityAndOffset parameter (providing Periodicity and Offset value for the following condition). The first subframe of each SMTC occasion IN nr occurs at a System Frame Number (SFN) and subframe of the primary cell of a master or secondary cell group (SpCell) meeting the following condition:

SFN mod $T$=(FLOOR(Offset/10));

if the Periodicity is larger than sf5, subframe=Offset mod 10;

else, subframe=Offset or (Offset+5), with $T$=CEIL(Periodicity/10).

Another relevant aspect is cell/beam selection. After the UE 50 detects a cell/beam with a given PCI and its SSBs, the UE 50 needs to select an SSB (or, in more general terms, a beam) in order to initiate random access. In NR, random access resource selection needs to be performed within a cell depending on measurements performed on SSBs or channel state information (CSI) reference signals (RSs). A cell in NR is basically defined by a set (one or more) of these SSBs that may be transmitted in one or multiple downlink beams (where a single or a few SSB(s)/beam(s) are more suitable for lower carrier frequencies, e.g. below 6 GHz, while implementations with many SSBs/beams are more suitable for higher carrier frequencies). For the same cell, these SSBs carry the same physical cell identifier (PCI) and a MIB. For standalone operation, i.e., to support UEs camping on an NR cell, they also carry in SIB1 the Random Access Channel (RACH) configuration, which comprises a mapping between the detected SSB covering the UE 50 at a given point in time and the Physical Random Access Channel (PRACH) configuration (e.g. time, frequency, preamble, etc.) to be used.

Figure 20:
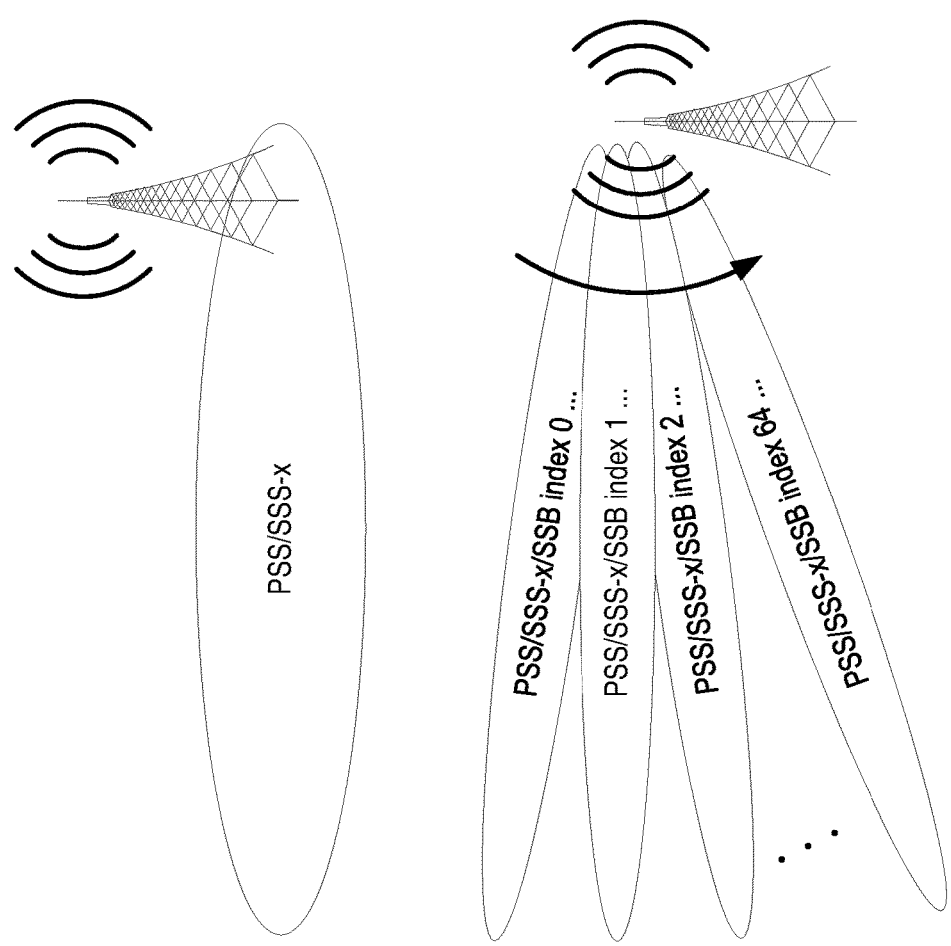
FIG. 20 illustrates transmission of SSBs in a cell a single beam and a cell with multiple beams.

For that, each of these beams may transmit its own SSB which may be distinguished by an SSB index as shown in FIG. 20.

The mapping between RACH resources and SSBs (or CSI-RS) is also provided as part of the RACH configuration (in RACH-ConfigCommon, as shown in FIG. 20). Two settings are particularly relevant here, namely:

SSBs-per-PRACH-occasion: ⅛, ¼, ½, 1, 2, 8 or 16, which represents the number of SSBs per RACH occasion; and

CB-preambles-per-SSB preambles to each SS-block: within a RACH occasion, how many preambles are allocated.

As an example, if the number of SSBs per RACH occasion is 1, and if the UE 50 is under the coverage of a specific SSB, e.g., with SSB index 2, there will be a RACH occasion for SSB index 2. If the UE 50 moves and is now under the coverage of another specific SSB, e.g., with SSB index 5, there will be another RACH occasion for SSB index 5. That is, each SSB detected by a given UE 50 would have its own RACH occasion. Hence, on the network side, upon detecting a preamble in a particular RACH occasion, the network knows which SSB the UE 50 has selected, and consequently, which downlink beam is covering the UE 50 so that the network can continue the downlink transmission (e.g., Random Access Response (RAR), etc.) using that beam. That first factor is an indication that each SSB has its own RACH resource, i.e., a preamble detected in that RACH resource/occasion indicates to the network which SSB the UE 50 has selected (i.e., which DL beam the network should use to communicate with the UE 50, such as the DL beam on which to send the RAR).

Figure 21:
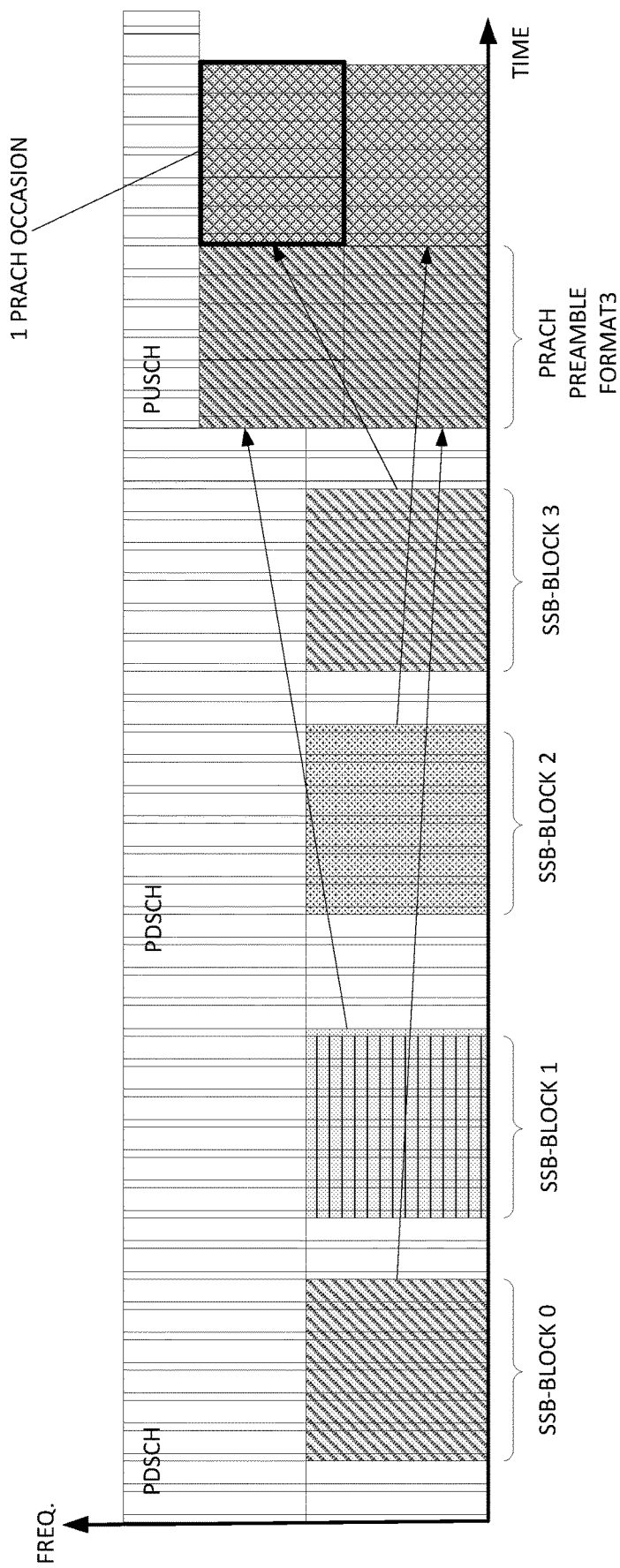
FIG. 21 shows an exemplary mapping between SSBs and Physical Random Access Channel (PRACH) occasions.

In a first example shown in FIG. 21, if #SSBs-per-PRACH-occasion has a CHOICE equal to ⅛, there will be 8 RACH occasions for each SSB and, if n12 is set, there will be 12 preambles that may be chosen by the UE 50 for that selected SSB. Accordingly, up to 12 UEs could be multiplexed in the same RACH occasion. Note that each SS-block typically maps to multiple preambles (different cyclic shifts and Zadoff-Chu roots) within a PRACH occasion, so that it is possible to multiplex different UEs in the same RACH occasions since they may be under the coverage of the same SSB.

Figure 22:
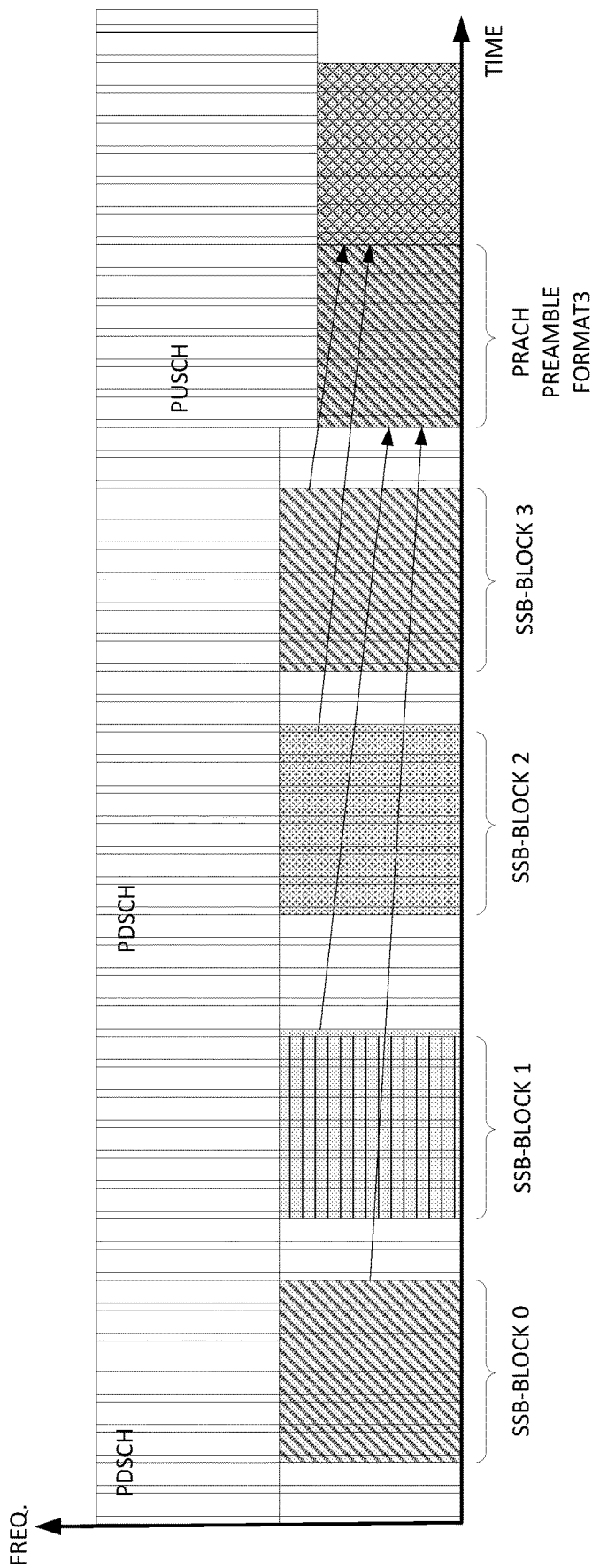
FIG. 22 shows another exemplary mapping between SSBs and PRACH occasions.

In another example shown in FIG. 22, the number of SSBs per RACH occasion is 2. Hence, a preamble received in that RACH occasion indicates to the network that one of the two beams are being selected by the UE 50. Therefore, the network has means to distinguish these two beams and/or the network should perform a beam sweeping in the downlink by transmitting the RAR in both beams, either simultaneously or, transmitting in one, waiting for a response from the UE 50, and if absent, transmit in the other. Within a RACH occasion the network can also configure different preambles (or sets thereof) for the different SSBs that map to the RACH occasion, so that the preamble indicates to the network which of the SSB beams that map to the RACH occasion the UE 50 has chosen (and hence in which DL beam the response should be transmitted in).

According to TS 38.211 (see section 6.3.3), random access preambles can only be transmitted in the time resources given by the higher-layer parameter prach-ConfigurationIndex according to Tables 6.3.3.2-2 to 6.3.3.2-4 and depends on Frequency Range (FR) 1 or FR2 and the spectrum type. Random access preambles can only be transmitted in the frequency resources given by the higher-layer parameter msg1-FrequencyStart.

Beam selection and the mapping to a particular RACH resource for preamble transmission is defined as part of the random access procedure as part of the MAC specifications (TS 38.321) and is sometimes called RACH resource selection.

One aspect of the present disclosure comprises methods to quickly activate SCells or add an SCG (i.e., setup/resume CA or DC) upon the transition from a power saving state (e.g., RRC_INACTIVE) to a Connected state. Part of that activation is configuring the UE 50 with an RRCReconfiguration message (or similar message) indicating target cell(s) in a target frequency or frequencies to be added and/or activated.

The delay from the time the UE 50 receives that configuration until the time the UE 50 is capable of transmitting and/or receiving data (or the moment the UE 50 is able to decode L1 channels) depends, among other aspects, on whether or not the UE 50 is synchronized with the target cell (i.e., the cell to be added or activated). As discussed throughout this disclosure, the term "synchronized" means that the UE 50 is ready to perform random access.

Figure 23:
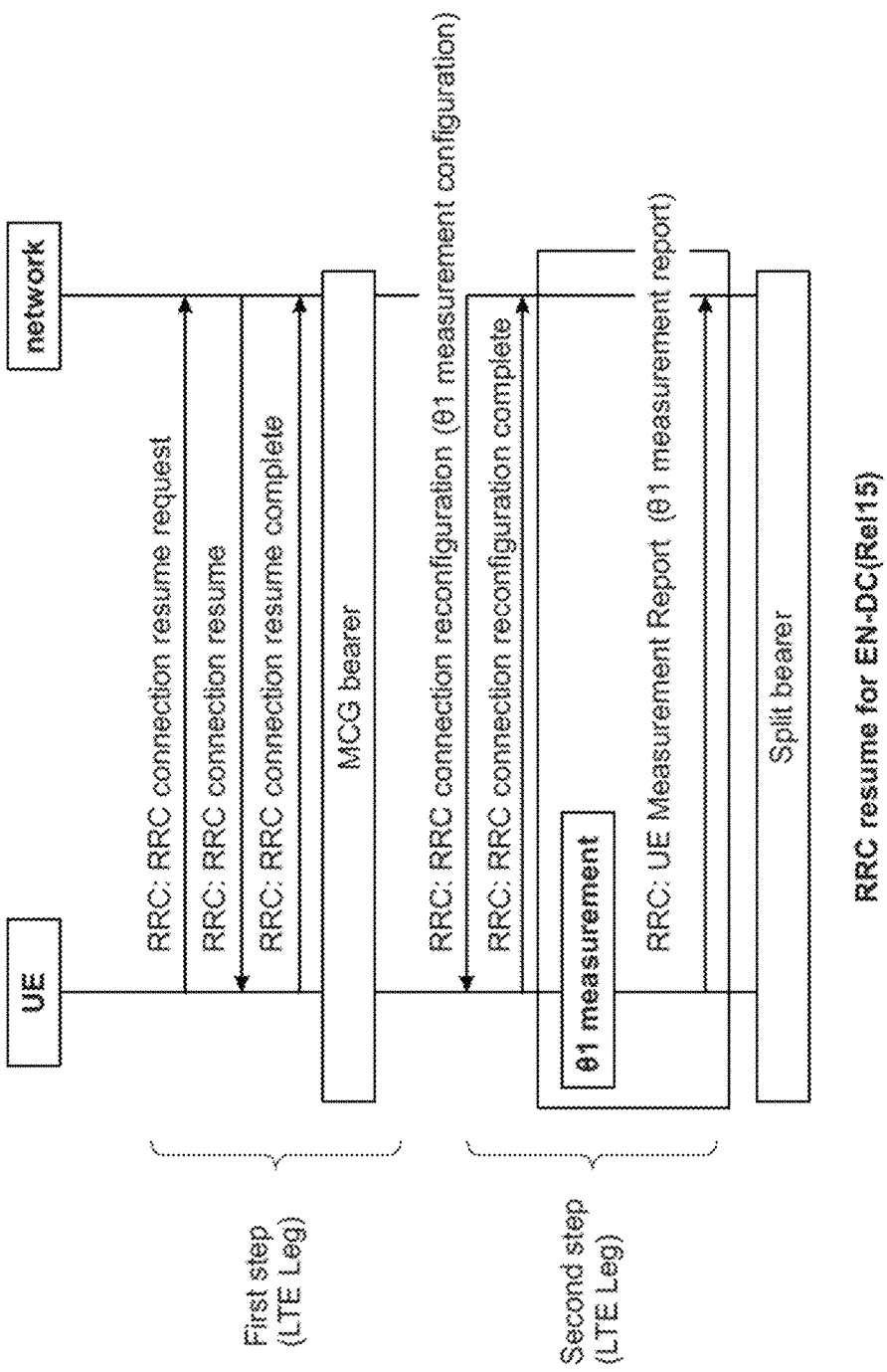
FIG. 23 illustrates a resume procedure for LTE-NR dual connectivity (EN-DC) with early measurement reporting.

If the UE 50 is ready to perform random access, the procedure will be faster, since the UE 50 may transmit a preamble based on a selected beam upon the reception and processing of the message (e.g., a message indicating that the UE 50 should activate an SCell (like a MAC CE, RRCResume or RRCReconfiguration), a message indicating that the UE 50 should add an NR SCG (like an RRCResume or RRCReconfiguration)). The UE 50 may be fortuitously ready to perform random access in a variety of different scenarios. For example, if the network has configured the UE 50 to send measurement reports in response to a B1-like event for an NR carrier (e.g., an event in which an NR neighbor becomes better than a threshold), and after the UE 50 sends those measurement reports the network decides to setup EN-DC, the UE 50 may already be synchronized with the target NR cell (since it has recently sent measurement reports to the network). This scenario is shown in FIG. 23.

Another fortuitous case may occur when the UE 50 has been configured to perform idle measurement for early reporting (as discussed above) and while the T331 timer is running the UE 50 initiates a connection resume, setup, or establishment procedure. Upon reception of RRCSetup or RRCResume, the T331 timer stops, and from that point onwards the UE 50 is not required to perform early measurements. However, when the UE 50 receives the indication from the network to add an NR SCG or activate an SCell out of the cells the UE 50 has been measuring, it is likely the UE 50 would be synchronized with the target cell being added or activated because if the T331 timer were still running when resume/setup/establishment was initiated, the time elapsed between the latest idle measurement for early reporting and the time the UE 50 gets the configuration to add/activate a target cell is likely not long enough for the UE 50 to lose synchronization with the cell(s)/frequency or frequencies for which the UE 50 made measurements.

The extent to which these fortuitous scenarios occur typically depend on UE 50 implementation and its capability to maintain synchronization, such as the type of UE 50 clock being implemented. As shown in the table below, the longer the time between samples (shown in the table as the DRX Cycle), the lower is the accuracy for a given clock type (indicated by the PPM clock accuracy in the table below). So, for a UE 50 implementation with clock accuracy 20, if the UE 50 takes a sample at t0, and it tries to resume/establish after 10 minutes, there may be an inaccuracy of 12 ms, which may require the UE 50 to regain sync before performing random access (as the UE 50 may also need to perform beam selection).

| DRX | Clock accuracy (PPM) | | | |
|---|---|---|---|---|
| | 1 | 5 | 10 | 20 |
| 1.28 | 1.28 us | 6.4 us | 12.8 us | 25.6 us |
| 10 s | 10 us | 50 us | 100 us | 200 us |
| 10 minutes | 0.6 ms | 3 ms | 6 ms | 12 ms |
| 1 hour | 3.6 ms | 18 ms | 36 ms | 72 ms |
| 24 hours | 86 ms | 432 ms | 864 ms | 1.73 s |

If the UE 50 is not in sync with the target cell, the UE 50 will not be ready to perform random access immediately, as additional delays may be incurred since the UE 50 would first need to acquire or regain sync with the target cell(s) to be added and/or activated, perform beam selection (in the case of multi-beam operation), transmit the preamble in the RACH occasion mapped to the selected beam, etc.

There could be different reasons for the UE 50 to not be synchronized with the target cell(s) upon the moment it receives the indication to add or activate a cell as an SCell or PSCell. For example, upon transition to a Connected state, the network may decide to blindly add an NR PSCell or activate an NR SCell (even without the early measurements feature).

Figure 24:
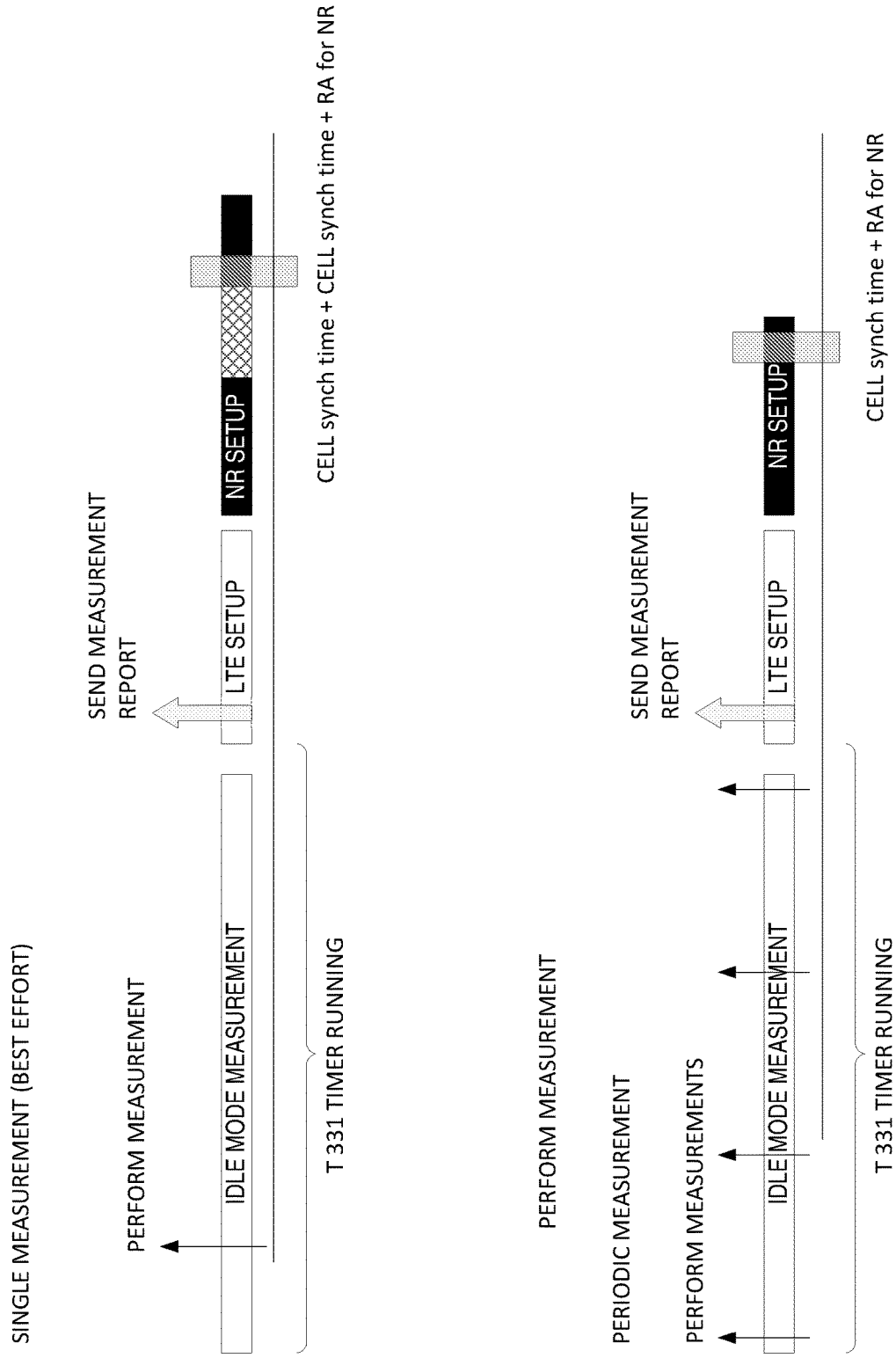
FIG. 24 is a comparison of single best effort measurement with periodic measurement.

Another example is when the UE 50 has been configured with idle measurements for early reporting but the T331 timer has expired or stopped before the UE 50 initiates a connection resume/establishment/setup procedure. If the time elapsed between expiration or stoppage of the T331 timer and the connection setup/resume initiation is long enough, or if the UE 50 is performing only one shot/single idle measurements, the UE 50 may lose sync and would probably have to regain sync when it receives a command to add an SCG or activate an SCell, even after reporting early measurements upon resume/setup/establishment procedure. This example is shown in FIG. 24.

Figure 25:
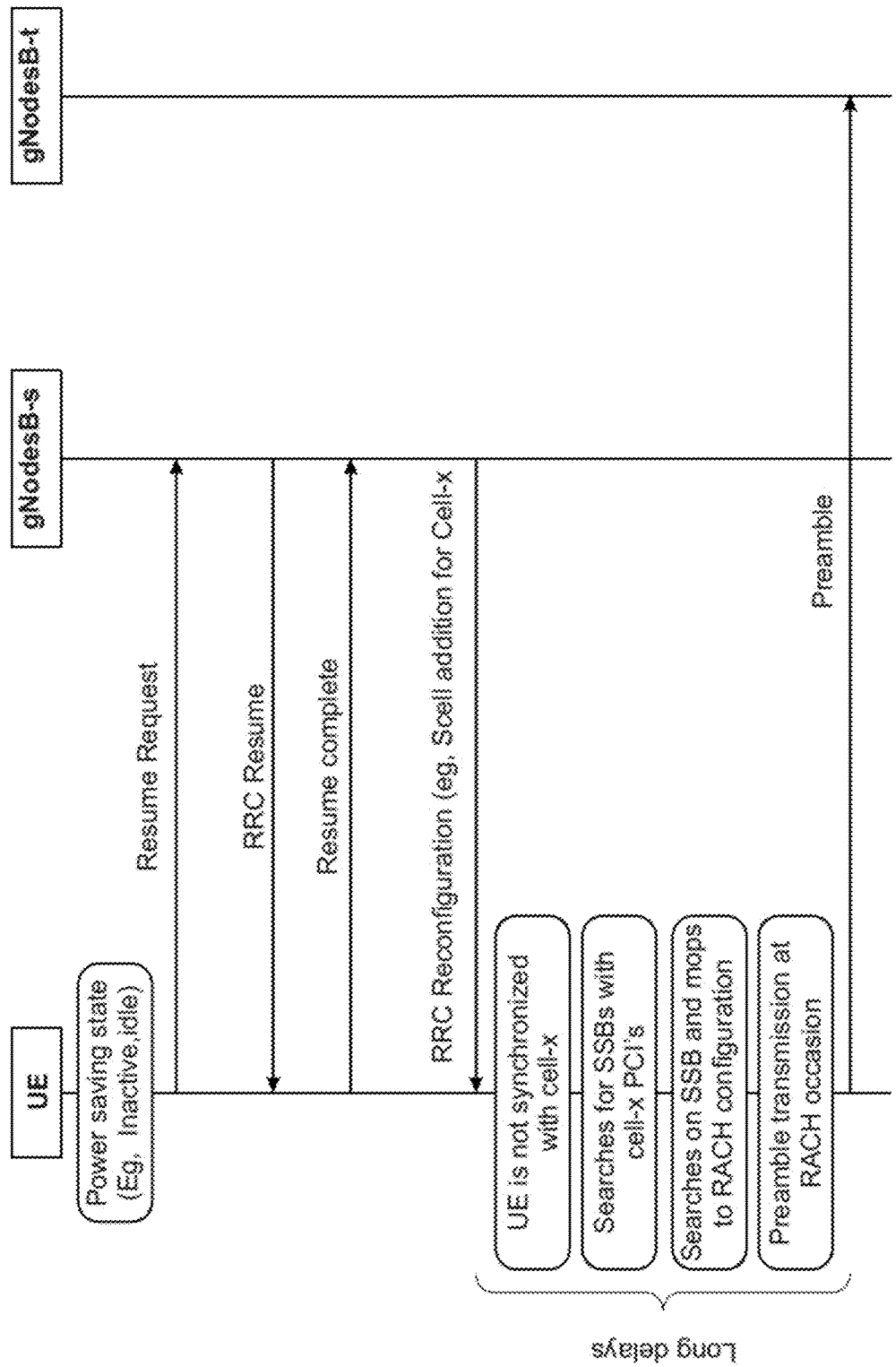
FIG. 25 illustrates blind addition of an SCell without early measurements for synchronization.
Figure 26:
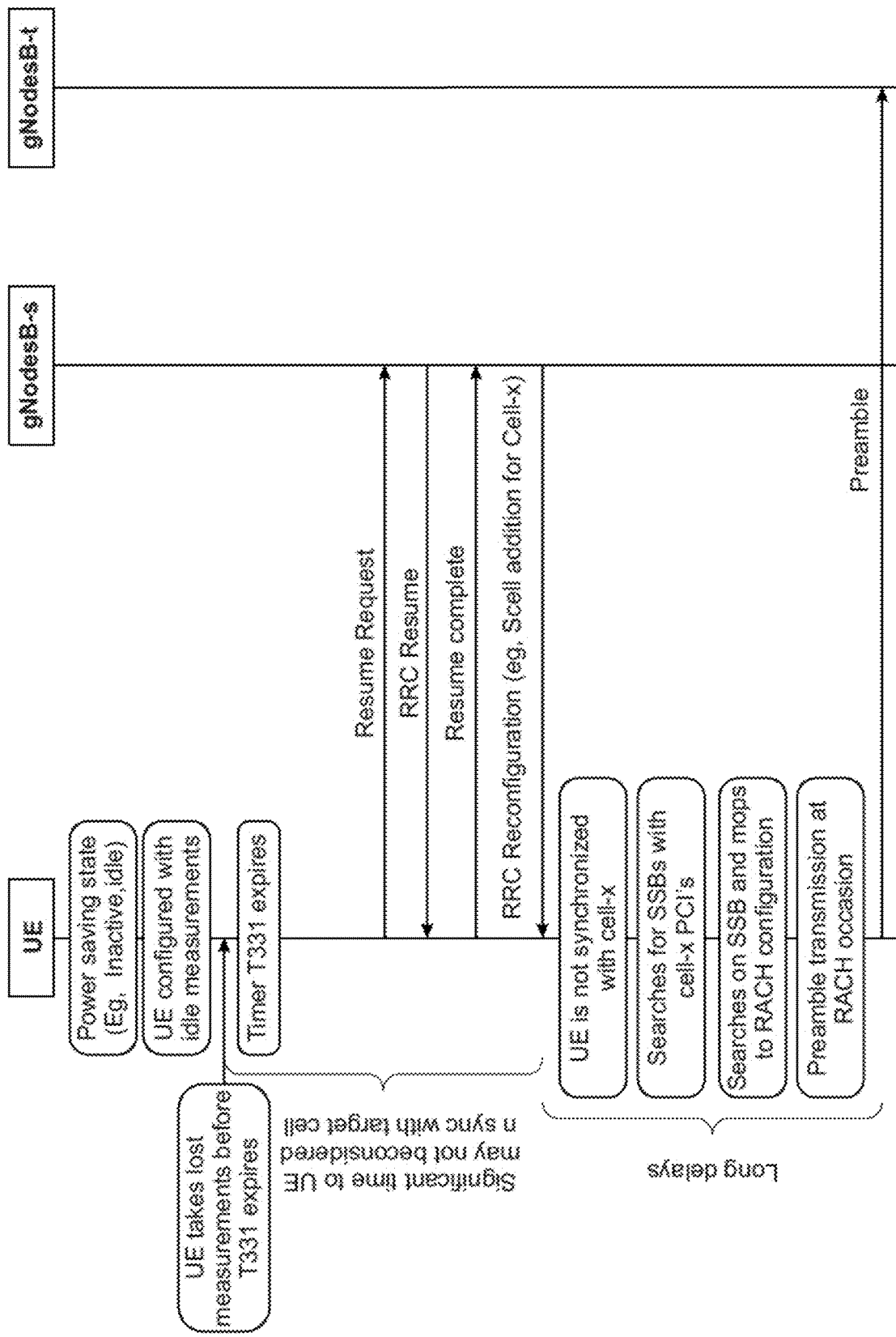
FIG. 26 illustrates loss of synchronization are performance of early measurements.

In view of the forgoing, one aspect of the present disclosure is to reduce the delays for SCell(s) addition and/or SCell activation and/or SCG addition and/or handover (or any other procedure requiring the UE 50 to synchronize with another target) during transitions from a power saving state to a Connected state (e.g., from Inactive to Connected or from Idle to Connected). These delays could be mainly caused by the UE 50 not being synchronized with the target cell that is being added/activated upon the transition. That is, the UE 50 may not be ready to perform random access. Such may occur if a blind addition is performed without any measurement being reported from the UE 50. FIG. 25 illustrates the blind addition of an SCell without any early measurements. Clock drift may result in a loss of synchronization after early measurements are made. If the latest measurements for a target cell/frequency was taken long time before the UE 50 is configured to add/activate that target cell), the UE 50 may lose synchronization. Loss of synchronization due to clock drift is illustrated in FIG. 26.

One aspect of the disclosure comprises a method executed by a UE 50 (e.g., a wireless terminal) for fast setup/activation of a candidate target cell during a transition from a power saving state to Connected state. The method comprises determining that a connection needs to be resumed or established/setup while the UE 50 is in a power saving state (e.g. Idle or Inactive), initiating a connection establishment/resumption procedure, and selecting one or more cells/frequencies for which to start (or re-start) synchronization procedure(s) in addition to the target cell configured/activated by the network. The method may further comprises receiving a message from the network requiring the UE 50 to synchronize with a target cell in a target frequency, determining if the message from the network indicates that the UE 50 shall configure or add a target cell (that is not the PCell) for which the UE 50 has synchronized (according in the previous step) and, if so, using the synchronization information to initiate a random access procedure towards the target cell(s) configured/activated by the network. The method further comprises starting to communicate with the configured SCell(s) that the UE 50 has synchronized (re-synchronized) as describe in the previous steps (e.g. receive downlink (DL) data, send uplink (UL) data, etc.).

Embodiments of the present disclosure enable the UE 50 to start (or re-start) synchronizing with a potential candidate cell (in a potential target frequency/RAT) for cell addition/activation upon the triggering of the connection establishment or resume procedure, without the need to wait for a message like an RRC Reconfiguration/RRC Resume message that configures/resumes SCell(s). This may lead, for example, to faster activation/utilization of CA or/and DC as compared to the legacy solution, as this will reduce the likelihood that the UE 50 will not be synchronized with the candidate SCell(s) when the UE 50 receives the message from the network to configure/resume SCell(s). For other use cases, like a handover after a transition to connected, this leads to a faster handover. In the case of a release with redirect after the establishment or resume procedure, this leads to a faster re-connection in the target frequency/cell/RAT.

Most of the embodiments discussed herein focus on NR for the sake of brevity. However, the embodiments described herein may also be applied to LTE (e.g., by replacing reference to RRCSetup with reference to RRCConnectionSetup, and replacing reference to RRCResume with reference to RRCConnectionResume, and so on).

Further, throughout this disclosure, the term "power saving state" refers to any of those states whose procedures are optimized for power savings, such as Idle state with stored context, Idle state without stored context or Inactive state.

Embodiments are also applicable for inter-RAT use cases, e.g., when the UE 50 is suspend/release in a first RAT (e.g. LTE), performs cell selection/re-selection to a cell in a second RAT (e.g. NR) and, determines that it needs to resume or establish a connection in that second RAT.

According to particular embodiments of the present disclosure, a synchronization procedure considered is the UE 50 performing beam measurements for performing beam selection and then mapping to a random access configuration (containing RACH occasions, frequency resources, preambles, etc.). In the case of an SSB, that consists of a primary and secondary synchronization signals (PSS, SSS), each occupying 1 symbol and 127 subcarriers, and PBCH spanning across 3 OFDM symbols and 240 subcarriers, but on one symbol leaving an unused part in the middle for SSS as shown in FIG. 18.

The possible time locations of SSBs within a half-frame are determined by sub-carrier spacing and the periodicity of the half-frames where SSBs are transmitted is configured by the network. During a half-frame, different SSBs may be transmitted in different spatial directions (i.e. using different beams, spanning the coverage area of a cell). Within the frequency span of a carrier, multiple SSBs can be transmitted. The PCIs of SSBs transmitted in different frequency locations do not have to be unique, i.e., different SSBs in the frequency domain can have different PCIs. However, when an SSB is associated with an RMSI, the SSB corresponds to an individual cell, which has a unique NR Cell Global identifier (NCGI). Such an SSB is referred to as a Cell-Defining SSB (CD-SSB). A PCell is always associated to a CD-SSB located on the synchronization raster.

Throughout this disclosure, the term "beam measurement" for beam selection is described, which refers to determining the radio conditions of the measured beam/beams (e.g. RSRP, RSRQ, and/or SINR).

For radio conditions/beam measurements, in accordance with embodiments of the present disclosure), Layer 1 may receive from higher layers a set of SS/PBCH block indexes (or CSI-RS) and provides to higher layers a corresponding set of RSRP, RSRQ and/or SINR measurements. These may be called L1 measurement per SSB, L1 measurement per CSI-RS or L1 measurement per beam.

These measurements may be performed, according to what the invention describes may be the ones described in the L1 specifications, as reproduced below (for simplicity, only RRSP definitions were provided for CSI-RS and SSB).

SS reference signal received power (SS-RSRP) is defined as the linear average over the power contributions (in [VV]) of the resource elements that carry secondary synchronization signals. The measurement time resource(s) for SS-RSRP are confined within SS/PBCH Block Measurement Time Configuration (SMTC) window duration. If SS-RSRP is used for L1-RSRP as configured by reporting configurations as defined in 3GPP TS 38.214, the measurement time resources(s) restriction by SMTC window duration is not applicable.

For SS-RSRP determination demodulation reference signals for physical broadcast channel (PBCH) and, if indicated by higher layers, CSI reference signals in addition to secondary synchronization signals may be used. SS-RSRP using demodulation reference signal for PBCH or CSI reference signal shall be measured by linear averaging over the power contributions of the resource elements that carry corresponding reference signals taking into account power scaling for the reference signals as defined in 3GPP TS 38.213. If SS-RSRP is not used for L1-RSRP, the additional use of CSI reference signals for SS-RSRP determination is not applicable.

SS-RSRP shall be measured only among the reference signals corresponding to SS/PBCH blocks with the same SS/PBCH block index and the same physical-layer cell identity.

If SS-RSRP is not used for L1-RSRP and higher-layers indicate certain SS/PBCH blocks for performing SS-RSRP measurements, then SS-RSRP is measured only from the indicated set of SS/PBCH block(s).

For frequency range 1, the reference point for the SS-RSRP shall be the antenna connector of the UE 50. For frequency range 2, SS-RSRP shall be measured based on the combined signal from antenna elements corresponding to a given receiver branch.

For frequency range 1 and 2, if receiver diversity is in use by the UE 50, the reported SS-RSRP value shall not be lower than the corresponding SS-RSRP of any of the individual receiver branches.

Note that the number of resource elements within the measurement period that are used by the UE 50 to determine SS-RSRP is left up to the UE 50 implementation with the limitation that corresponding measurement accuracy requirements have to be fulfilled.

Further, the power per resource element is determined from the energy received during the useful part of the symbol, excluding the CP.

CSI reference signal received power (CSI-RSRP), is defined as the linear average over the power contributions (in [W]) of the resource elements of the antenna port(s) that carry CSI reference signals configured for RSRP measurements within the considered measurement frequency bandwidth in the configured CSI-RS occasions.

For CSI-RSRP determination CSI reference signals transmitted on antenna port 3000 according to 3GPP TS 38.211 shall be used. If CSI-RSRP is used for L1-RSRP, CSI reference signals transmitted on antenna ports 3000, 3001 can be used for CSI-RSRP determination.

For intra-frequency CSI-RSRP measurements, if the measurement gap is not configured, UE 50 is not expected to measure the CSI-RS resource(s) outside of the active downlink bandwidth part.

For frequency range 1, the reference point for the CSI-RSRP shall be the antenna connector of the UE 50. For frequency range 2, CSI-RSRP shall be measured based on the combined signal from antenna elements corresponding to a given receiver branch. For frequency range 1 and 2, if receiver diversity is in use by the UE 50, the reported CSI-RSRP value shall not be lower than the corresponding CSI-RSRP of any of the individual receiver branches.

Note that the number of resource elements within the considered measurement frequency bandwidth and within the measurement period that are used by the UE 50 to determine CSI-RSRP is left up to the UE 50 implementation with the limitation that corresponding measurement accuracy requirements have to be fulfilled.

In view of the above, some particularly detailed embodiments will now be discussed. Such embodiments include a method performed by a user equipment (e.g., a wireless terminal) for fast setup/activation of a candidate target cell during a transition from a power saving state to Connected. The method comprises determining that a connection needs to be resumed or established/setup while the UE 50 is in a power saving state. The method further comprises initiating a connection establishment/resumption procedure. The method further comprises selecting one or more cells/frequencies in addition to the cell for which the UE 50 is performing the transition to Connected and starting (or re-starting) synchronization procedure(s) with the selection cell(s)/frequency(ies). The method further comprises receiving a message from the network requiring the UE 50 to synchronize with a target cell in a target frequency. The method further comprises determining if the message from the network indicates that the UE 50 shall configure or add a target cell (that is not the PCell) for which the UE 50 has synchronized (according in the previous step). If yes, using the synchronization information in the previous step and initiating random Access procedure towards the target cell(s) configured/activated in the previous step. The method further comprises starting to communicate with the configured SCell(s) that the UE 50 has synchronized (re-synchronized) as describe in the previous steps (e.g. receive DL data, send UL data, etc.).

In some embodiments, determining that the connection needs to be resumed or established may be triggered by one or more factors. For example, determining that the connection needs to be resumed or established may be triggered by receiving a paging message addressed to it with a RAN identifier (e.g. 1-RNTI). In such embodiments, the connection needs to be resumed and UE 50 comes from Inactive.

As another example, determining that the connection needs to be resumed or established may be triggered by receiving a paging message addressed to it with a CN identifier (e.g. 1-RNTI). In such embodiments, the connection needs to be setup and UE 50 comes from Idle (if it is in Inactive upon receiving the message).

In another example, determining that the connection needs to be resumed or established may be triggered by identifying a UE 50 internal request from NAS layer to AS layer that UL data needs to be transmitted. If the UE 50 is in Inactive, that leads to the UE 50 initiating a resume procedure. Otherwise, if the UE 50 is in Idle, the UE 50 initiates a setup procedure.

In another example, determining that the connection needs to be resumed or established may be triggered by identifying a UE 50 internal request from NAS layer to AS layer to transmit a NAS signaling message (e.g. Registration Area Update). If the UE 50 is in Inactive, that leads to the UE 50 initiating a resume procedure. Otherwise, if the UE 50 is in Idle, that leads to the UE 50 initiating a setup procedure.

In another example, determining that the connection needs to be resumed or established may be triggered by identifying a UE 50 internal request from AS layer to perform a RAN Area Update. In such embodiments, the UE 50 is in Inactive, that leads to the UE 50 initiating a resume procedure.

Additionally or alternatively, initiating a connection establishment/resumption procedure may comprise, for example, transmitting an RRC Resume Request like message or an RRC Setup Request like message, among other things. According to embodiments in which the connection is resumed, embodiments include performing some other preparation or initiation actions, such as the ones defined in TS 38.331, sub-clause 5.3.13.2, described below.

In particular, upon initiation of the procedure, the UE 50 shall, if the resumption of the RRC connection is triggered by response to NG-RAN paging, select '0' as the Access Category and perform the unified access control procedure as specified in 5.3.14 using the selected Access Category and one or more Access Identities provided by upper layers. If the access attempt is barred, the procedure ends.

If the resumption of the RRC connection is not triggered by response to NG-RAN paging, but is instead triggered by upper layers, then if the upper layers provide an Access Category and one or more Access Identities upon requesting the resumption of an RRC connection, the UE 50 performs the unified access control procedure as specified in 5.3.14 using the Access Category and Access Identities provided by upper layers. If the access attempt is barred, the procedure ends. Otherwise, the resumeCause is set in accordance with the information received from upper layers.

If the resumption of the RRC connection is not triggered by response to NG-RAN paging, and is not triggered by upper layers, but instead is triggered due to an RNA update as specified in 5.3.13.8, the UE 50 selects '2' as the Access Category if an emergency service is ongoing, and selects '8' as the Access Category if an emergency service is not ongoing. If the emergency service is ongoing, the UE 50 also sets the resumeCause to emergency. Note that how the RRC layer in the UE 50 is aware of an ongoing emergency service is up to UE 50 implementation.

The UE 50 also performs the unified access control procedure as specified in 5.3.14 using the selected Access Category and one or more Access Identities to be applied as specified in TS 24.501. If the access attempt is barred, the UE 50 sets the variable pendingRnaUpdate to true and the procedure ends.

Note that if the UE 50 is in NE-DC or NR-DC, the UE 50 releases the MR-DC related configurations (i.e., as specified in 5.3.5.10) from the UE 50 Inactive AS context, if stored.

The UE 50 release the MCG SCell(s) from the UE 50 Inactive AS context, if stored, and applies the default L1 parameter values as specified in corresponding physical layer specifications, except for the parameters for which values are provided in SIB1. The UE 50 applies the default SRB1 configuration as specified in 9.2.1, and the default MAC Cell Group configuration as specified in 9.2.2. Further, the UE 50 releases delayBudgetReportingConfig from the UE 50 Inactive AS context, if stored, and stops the T342 timer, if running. Moreover, the UE 50 releases overheatingAssistanceConfig from the UE 50 Inactive AS context, if stored, and stops the T345 timer, if running.

Further still, the UE 50 applies the CCCH configuration as specified in 9.1.1.2, and the timeAlignmentTimerCommon included in SIB 1. The UE 50 starts the T319 timer and sets the variable pendingRnaUpdate to false. The UE 50 initiates transmission of the RRCResumeRequest message or RRCResumeRequest1 in accordance with 5.3.13.3.

Note that in the case of setup/establishment, the UE 50 may perform other preparations or initiation actions, such as the ones defined in TS 38.331, sub-clause 5.3.3.2. That is, upon initiation of the procedure, the UE 50 may, if the upper layers provide an Access Category and one or more Access Identities upon requesting establishment of an RRC connection, perform the unified access control procedure as specified in 5.3.14 using the Access Category and Access Identities provided by upper layers. If the access attempt is barred, the procedure ends.

The UE 50 may also apply the default L1 parameter values as specified in corresponding physical layer specifications except for the parameters for which values are provided in SIB 1. The UE 50 may also apply the default MAC Cell Group configuration as specified in 9.2.2, the CCCH configuration as specified in 9.1.1.2, and the timeAlignmentTimerCommon included in SIB 1. The UE 50 may start the T300 timer, and initiate transmission of the RRCSetupRequest message in accordance with 5.3.3.3.

In some embodiments, the cell/frequency selection step may also be performed before the previous steps, but not after the next step. That is, it is important to certain embodiments that the UE 50 synchronizes before receiving a message indicating to which cell the UE 50 shall synchronized with. This may be considered, for example, a type of pre-synchronization or prediction that a synchronization may be configured by the network.

As discussed above, embodiments relate to one or more cells/frequencies, i.e., at least one cell. In this regard, the cell may be any cell in any frequency the UE 50 is capable to synchronize with. The cell may belong to a first RAT that is the same RAT as the RAT of the cell the UE 50 is performing the transition to Connected. Alternatively, that cell may belong to a second RAT that is a different RAT as the RAT of the cell the UE 50 is performing the transition to Connected. For example, the first RAT may be LTE. Alternatively, the first RAT may be NR.

More particularly, the first RAT may be LTE and the second RAT may be NR, for example. Such may be the case when the UE 50 transitions to connected in LTE and, the network configures EN-DC by adding an NR SCG and/or activating an NR SCell from the secondary cell group).

Alternatively, the first RAT may be NR and second RAT may be LTE. This may occur when the UE 50 transitions to connected in NR and, the network adds an LTE SCG, or activated an LTE SCell from the secondary cell group.

Note that the term cell is used here, but fundamentally that may be the selection of an SSB in a given Absolute Radio Frequency Channel Number (ARFCN) (sync or channel raster), which may either be a cell defining SSB or another type of SSB.

Concerning the selection of a cell/frequency the UE 50 synchronizes with, according to embodiments, the UE 50 selects at least one cell (and one frequency) to synchronize, the cell being chosen among a set of cells/frequencies. Selection may be performed in different ways, according to various embodiments.

In one embodiment, the UE 50 selects all cells in all frequencies the UE 50 is capable to synchronize with.

In another embodiment, the UE 50 selects at least one cell in a neighbor frequency X for which the UE 50 supports a band combination with the frequency of the PCell, e.g. F0. For example, if the UE 50 is capable to measure frequencies F0, F1, F2, F3, F4, F5, F6, F7 and supports band combinations (F0,F1); (F0, F5) and (F0, F7) the UE 50 selects for the method the subset of neighbor frequencies F7, F1, F5 for selecting a cell to perform the method. The reasoning is that, in the case of CA/DC fast setup, these would be candidate frequencies for setting up CA/DC or CA activation.

In another embodiment, the UE 50 selects at least one cell in a neighbor frequency X for which the target PCell (i.e. the node associated with the target PCell) supports a band combination with the frequency of the PCell, e.g. F0. For example, if the network is capable to setup DC/CA for frequencies F0, F1, F2, F3, F4, F5, F6, F7 and supports band combinations (F0,F1); (F0, F5) and (F0, F7) the UE 50 selects for the method the subset of neighbor frequencies F7, F1, F5 for selecting a cell to perform the method. The reasoning is that, in the case of CA/DC fast setup, these would be candidate frequencies for setting up CA/DC or CA activation. The UE 50 may know these combinations by receiving an indication from the network e.g. via system information or dedicated signaling.

In another embodiment, the UE 50 selects at least one cell in a neighbor frequency X for which the UE 50 and the target PCell (i.e. the node associated with the target PCell) supports a band combination with the frequency of the PCell, e.g. F0.

For example, if the network and UE 50 are capable to setup DC/CA for frequencies F0, F1, F2, F3, F4, F5, F6, F7 and supports band combinations (F0,F1); (F0, F5) and (F0, F7) the UE 50 selects for the method the subset of neighbor frequencies F7, F1, F5 for selecting a cell to perform the method. The reasoning is that, in the case of CA/DC fast setup, these would be candidate frequencies for setting up CA/DC or CA activation. The UE 50 may know these combinations by receiving an indication from the network, e.g., via system information or dedicated signaling.

In one embodiment, the UE 50 has been configured with idle/Inactive mode measurements when transitioning to power saving state e.g. denoted here measConfigIdle (either in SIB or RRC Release). Then, the cell/frequency the UE 50 synchronizes with is at least one of the cell(s)/frequencies in measConfigIdle i.e. one of the cells/frequencies the UE 50 has been configured to perform measurements while it was in power saving state (e.g. Idle, Inactive). The reasoning here is that the network would like to add add/activate a SCell or SCG for which the network has requested early measurements (either via SIB or via RRC Release message).

The UE 50 may be configured to sync with all the indicated frequencies/Cells in the measIdleDuration upon the triggering of connection establishment/resume or additional criteria may be applicable. For example, the UE 50 performs the cell selection in this embodiment for the best cell in a given frequency according to measurements associated to at least one measurement quantity, such as the cell with the highest RSRP value, the highest RSRQ value, the highest SINR value, or combinations of measurements based on multiple quantities (e.g. the cell with the highest RSRP if the RSRQ is above a threshold, the cell with highest RSRQ if the RSRP is above a threshold, etc.).

In another embodiment, the UE 50 has been configured with a specific configuration related to the method when transitioned to power saving state. Then, the cell/frequency the UE 50 synchronizes with is configurable by the network for that particular purpose of early synchronization procedures for cells/frequencies that are candidates. The reasoning here is that the network would like to add add/activate a SCell or SCG for which the network has requested early measurements (either via SIB or via RRC Release message). This specific configuration may be provided in RRC Release and is valid for the UE 50 regardless of how the UE 50 moves in power saving state. Alternatively, this specific configuration may be provided in RRC Reconfiguration message while the UE 50 is in Connected state, and the UE 50 keeps this configuration even after going to a power saving state. Alternatively, this specific configuration may be provided in system information and is adjusted for each cell the UE 50 is camping on i.e. UE 50 selects the cell/frequency to sync with depending on the System Information content of the cell the UE 50 is camping on.

Note that the UE 50 may be configured to sync with all the indicated frequencies/Cells upon the triggering of connection establishment/resume or additional criteria may be applicable. For example, the UE 50 performs the cell selection in this embodiment for the best cell (or top n cells, where n is either a configurable parameter or specified in the 3GPP standards) in a given frequency according to measurements associated to at least one measurement quantity, such as the cell with the highest RSRP value, the highest RSRQ value, the highest SINR value, or combinations of measurements based on multiple quantities (e.g., the cell with highest RSRP if the RSRQ is above a threshold, cell with the highest RSRQ if the RSRP is above a threshold, etc.). For the case of NR cells, beam level measurements can also be considered in addition/instead of cell level measurements.

In another embodiment, the UE 50 has stored SCG(s) configuration when the UE 50 is transitioned to a power saving state. Then, the cell/frequency the UE 50 synchronizes with is at least one of the SCG cell(s)/frequencies in the stored context i.e. one of the cells/frequencies the UE 50 has configuration stored. The reasoning here is that the network would like to add add/activate an SCG with one or more cells that the UE 50 has suspended.

In some embodiments, an additional criterion is applicable. For example, the UE 50 may perform the selection only if the UE 50 tries to resume in the same cell as it has been suspended.

As another example, the UE 50 may perform the cell selection for the best cell (or top n cells, where n is either a configurable parameter or specified in the 3GPP standards) within the set of SCG Cells that were stored in the UE 50 context according to measurements associated to at least one measurement quantity, such as the cell with the highest RSRP value, the highest RSRQ value, the highest SINR value, or a combination of measurements based on multiple quantities (e.g. the cell with highest RSRP if the RSRQ is above a threshold, the cell with the highest RSRQ if the RSRP is above a threshold, etc.). For the case of NR cells, beam level measurements can also be considered in addition/instead of cell level measurements.

As another example, the UE 50 may perform the cell selection for the cell which was configured as PSCell in the SCG.

In another embodiment, the UE 50 has stored SCell(s) configuration when the UE 50 is transitioned to a power saving state Then, the cell/frequency the UE 50 synchronizes with is at least one of the SCell(s)/frequencies in the stored context i.e. one of the cells/frequencies the UE 50 has configuration stored. The reasoning here is that the network would like to add add/activate an SCell for MCG that the UE 50 has suspended. In some such embodiments, the at least one SCell is associated to the MCG. In other such embodiments, the at least one SCell is associated to the secondary cell group (SCG).

Note that in some embodiments, an additional criterion may be applicable. For example, in some embodiments, the UE 50 may perform the selection only if the UE 50 tries to resume in the same cell as it has been suspended.

In some embodiments, the UE 50 may be configured to sync with all the indicated frequencies/Cells in the stored context upon the triggering of connection establishment/resume or additional criteria may be applicable. For example, the UE 50 may perform cell selection for the best cell (or top n cells, where n is either a configurable parameter or specified in the 3GPP standards) among the stored frequencies/cells according to measurements associated to at least one measurement quantity, such as the cell with highest RSRP value, the highest RSRQ value, the highest SINR value, or a combination of measurements based on multiple quantities (e.g., the cell with highest RSRP that has RSRQ above a threshold, the cell with highest RSRQ that has RSRP above a threshold, etc.). For the case of NR cells, beam level measurements can also be considered in addition/instead of cell level measurements.

In some embodiments, there are further criteria associated to the selection of at least one cell to be selected. In one embodiment, the UE 50 only selects the cell(s)/frequencies for which it supports CA with the frequency band of the PCell (i.e. the cell where the UE 50 is initiating the connection resumption/establishment procedure). For example, assume the UE 50 is camping on frequency F0 and initiates resume/setup there. Then, the UE 50 only considers for the applying the method to the cells in other bands/frequencies for which the UE 50 supports CA with F0 e.g. Fx where Fx is one of the frequencies selected according to possibly other criteria described above, like the UE 50 having stored it in measConfigIdle. Similar considerations could be made regarding cell(s)/frequencies the UE 50 can support DC with, for selecting the possible SCG Cells to sync with upon connection establishment/resumption. Note that the UE 50 knows about the supported band combinations for CA and/or DC, based on UE 50 capability information.

Additionally, or alternatively, the UE 50 may (in some embodiments) perform certain actions only when the UE 50 initiates resume in the same cell (or area, possibly defined as a set of cells) it has been suspended.

The synchronization procedures include performing a cell search, which may comprise finding at least one SSB in a sync raster (i.e. in a specific frequency location) or in a channel raster (i.e. in a specific frequency location).

Performing beam selection comprises selecting an SSB associated to a cell. Selecting here comprises performing measurements for at least one SSB in the target cell and selecting an SSB that is suitable. A suitable SSB in this context means that the measurement for that SSB is above a pre-defined threshold.

With regard to the synchronization procedure(s) for at least one selected cell/frequency, the UE 50 may start (or re-start) one or more steps, depending on the embodiment.

In one embodiment, the UE 50 performs cell search for the selected frequency (or frequencies), and the UE 50 may use an ARFCN information associated to the selected frequency to tune a receiver and use an STMC configuration associated with that selected frequency (where the SMTC configuration may have been obtained in system information or in measConfigIdle).

In another embodiment, the UE 50 performs cell search for a selected cell in a selected frequency. The UE 50 may use an ARFCN information associated to the selected frequency to tune a receiver and use an STMC configuration associated with that selected frequency (where the SMTC configuration may have been obtained in system information or in measConfigIdle). They may also use the fact it knows the PCI and possible PSS/SSS(s) when performing the matching filtering procedure.

In another embodiment, the UE 50 performs beam measurements for the selected frequency (or frequencies) and selects at least one beam per cell in a selected frequency to be measured. Beam measurements may be at least one of SSB RSRP, SSB RSRQ, SSB SINR, CSI-RS RSRP, CSI-RS RSRQ, and/or CSI-RS SINR.

Upon performing these beam measurements, the UE 50 stores these measurements (and possibly updates these measurements). They may be used later on when/if the UE 50 receives a configuration from the network to add/activate a cell requiring the UE 50 to perform random access. That configuration may also contain a random access related configuration such as suitability thresholds for beam measurements and a mapping between beams and RACH occasions (in time), RACH frequency resource configurations in general). Then, upon receiving a configuration to add/activate a cell with these RACH related mapping, the UE 50 uses the stored beam measurements to select a beam and, map to at least one of the configurations. Then, since the UE 50 is synchronized and has selected a beam and has mapped to a RACH occasions and resources, the UE 50 can transmit a random-access preamble in the RACH occasion and resources in frequency.

Particular embodiments also include having at least one criterion to control the synchronization procedure, e.g., so the UE 50 knows at which points it is not required to maintain the sync with the cell/frequency the UE 50 has synchronized according to such embodiments.

In one embodiment, a timer is introduced. The timer starts when the UE 50 starts at least one of the synchronization procedures described above, the timer stops upon the reception of a message adding/activating at least one of the cells the UE 50 is maintaining sync according to the method e.g. a MAC CE activating an SCell (or MCG, or SCG, etc.), or an RRC message adding an SCell or SCG. Upon the expiry of the timer, the UE 50 is not required to maintain sync with the cell the UE 50 has started to sync according to the method.

In another embodiment, the timer T319 is used as reference e.g. when the UE 50 initiates a resume procedure. Upon the expiry of the timer, the UE 50 is not required to maintain sync with the cell the UE 50 has started to sync according to the method.

In another embodiment, the timer T300 is used as reference e.g. when the UE 50 initiates a resume procedure. Upon the expiry of the timer, the UE 50 is not required to maintain sync with the cell the UE 50 has started to sync according to the method.

In another embodiment, upon the reception of a first RRC Reconfiguration after the transition to Connected the UE 50 is not required to maintain sync and/or update measurements (e.g. beam measurements).

In another embodiment, upon the reception of a first measurement configuration upon the transition to Connected (e.g. in RRC Setup like message or RRC Resume) the UE 50 is not required to maintain sync and/or update measurements (e.g. beam measurements) according to the method.

In another embodiment, upon the transmission of early measurements e.g. upon transmission of UEInformationRequest or RRCResumeComplete upon the transition to Connected the UE 50 is not required to maintain sync and/or update measurements (e.g. beam measurements).

The message received from the network that requires the UE 50 to synchronize with the target cell in a target frequency may be provided during or after the procedure to establish/resume a connection.

For example, the UE 50 may receive an RRC Reconfiguration message after the setup/resumption procedure is finished, that configures SCells belonging to a master cell group and/or PSCell/SCells belonging to a secondary cell group.

Alternatively, the UE 50 may receive an RRC Resume message that configures or restores SCells belonging to a master cell group and/or PSCell/SCells belonging to the secondary cell group.

Alternatively, the UE 50 may receive a L1/L2 indication, such as a MAC Control Element (MAC CE) or DCI indicating that an SCell is to be activated or to be transition from deactivated state (e.g. to another state also requiring some level of synchronization).

Alternatively, the UE 50 may receive an RRC Reconfiguration with a reconfiguration with sync indication (or any other form of handover command) that configures the UE 50 with a PCell (and may contain further SCells associated to the master cell group and a secondary cell group with PSCell(s)/SCell(s).

Alternatively, the UE 50 may receive an RRC Release message e.g. with a redirect information with a target frequency indication and add at least one SCell associated to the MCG (master cell group).

The configuration may trigger the UE 50 to perform one or more actions. For example, the UE 50 may be triggered to resume an SCell associated to the MCG (master cell group), add an SCG (secondary cell group), resume an SCG (secondary cell group), add at least one SCell associated to the SCG (secondary cell group), activate an SCell associated to the SCG (secondary cell group), resume an SCell associated to the SCG (secondary cell group), handover/reconfiguration with sync to another cell, release with redirect to another frequency/cell, and/or configure measurements.

Note that if the UE 50 does not determine that the message from the network indicates that the UE 50 shall configure or add a target cell (that is not the PCell) for which the UE 50 has synchronized, the UE 50 may avoid taking certain steps described above.

For example, if the message from the network indicates that the UE 50 shall configure or add a target cell (that is not the PCell) for which the UE 50 is not synchronized, the UE 50 may perform synchronization steps for the target cell.

Alternatively, if the message from the network does not indicate that the UE 50 shall configure or add a target cell (that is not the PCell), the UE 50 may perform clean up actions for the sync information the UE 50 has obtained according to the method. For example, the UE 50 may discard the synchronization information. In some such embodiments, the UE 50 may discard the synchronization information after a timer expires. That timer may be started when the resume/setup/Establishment procedure has started, for example. Alternatively, that timer may be started when the resume/setup/Establishment procedure has ended.

Figure 27:
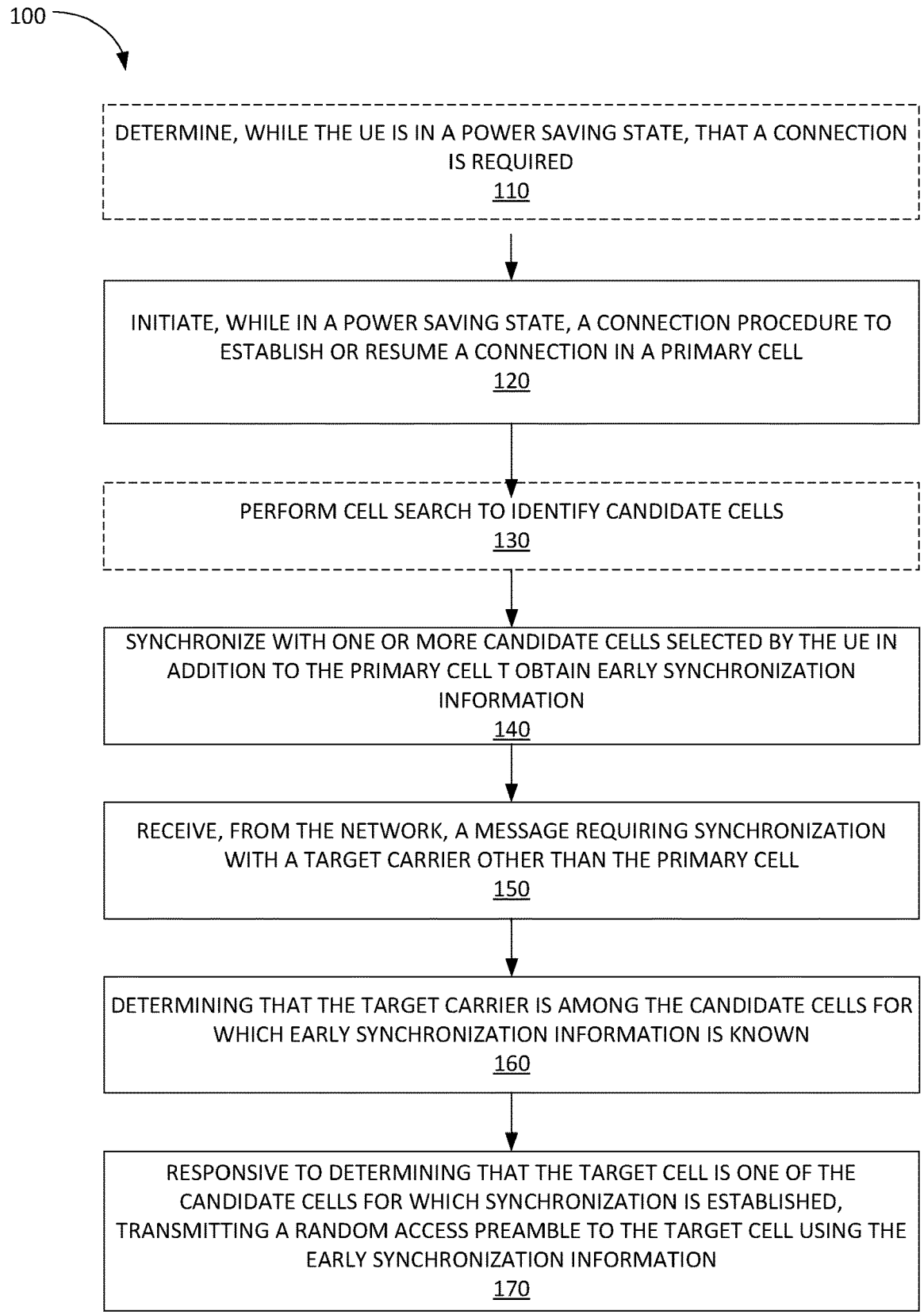
FIG. 27 is a method implemented by a UE to perform early synchronization in a power saving state.

FIG. 27 illustrates a method 100 implemented by a UE 50, as shown in FIG. 27 (attached hereto). Operations or actions shown in dashed lines are considered optional. In one embodiment, the UE 50 optionally determines, while the UE 50 is in the power saving state, that a connection is required (block 110). Responsive to determining that a connection is required, the UE 50 initiates, while in a power saving state, the connection procedure to establish or resume the connection in a primary cell (block 120). After initiating the establishment or resumption of the connection, the UE 50 optionally performs a cell search to identify one or more potential candidate cells that meet a selection criteria (block 130). The UE 50 synchronizes with one or more candidate cells selected by the UE 50 in addition to the primary cell to obtain early synchronization information (block 140). The UE 50 subsequently receives from the network, a message requiring synchronization with a target cell other than the primary cell (block 150). The UE 50 determines that the target cell is among the candidate cells for which early synchronization information is known (block 160). Responsive to determining that the target cell is one of the candidate cells for which synchronization is established, transmitting a random access preamble to the target cell using the early synchronization information (block 170).

Figure 28:
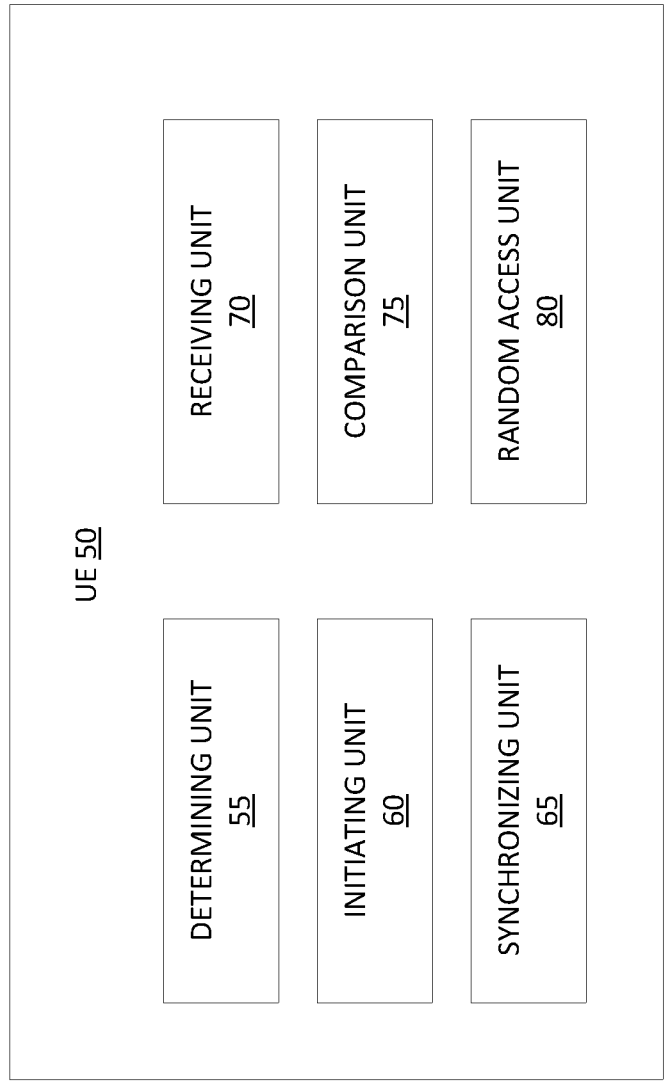
FIG. 28 illustrates a UE configured to perform early synchronization in a power saving state.

FIG. 28 illustrates a UE 50 configured to perform the early synchronization procedures as herein described. The UE 50 includes a determining unit 55, an initiating unit 60, a synchronizing unit 65, a receiving unit 70, a comparison unit 75 and a random access unit 80. the various units 55-80 may be implemented by hardware and/or by software code that is executed by one or more processors or processing circuits. The determining unit 55 is configured to determine, while the UE 50 is in the power saving state, that a connection is required. The initiating unit 60 is configured to, responsive to determining that a connection is required, the UE 50 initiate, while in a power saving state, the connection procedure to establish or resume the connection in a primary cell. The synchronizing unit 65 is configured to synchronize with one or more candidate cells selected by the UE 50 in addition to the primary cell. The receiving unit 70 is configured to receive from the network, a message requiring synchronization with a target cell other than the primary cell. The comparison unit 75 is configured to determine that the target cell is among the candidate cells for which synchronization information is known. The random access unit 80 is configured to, responsive to determining that the target cell is one of the candidate cells for which synchronization is established, transmitting a random access preamble to the target cell using the known synchronization information.

Figure 29:
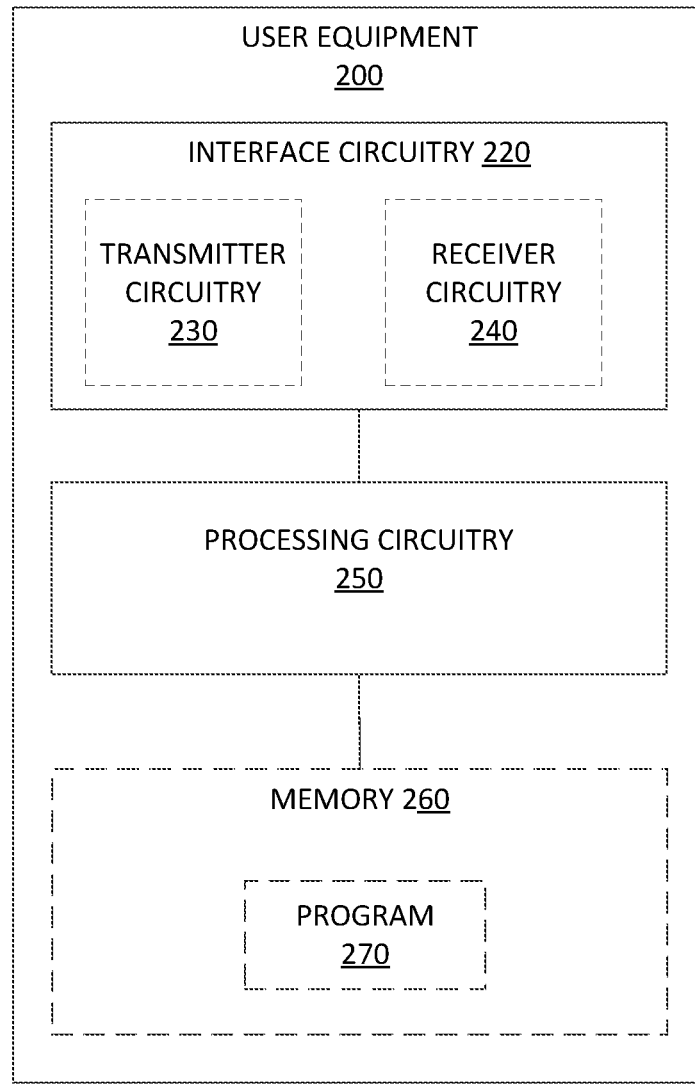
FIG. 29 illustrates another UE configured to perform early synchronization in a power saving state.

FIG. 29 illustrates a UE 200 according to particular embodiments of the present disclosure. The UE 200 comprises interface circuitry 220 for communicating with the network and processing circuitry 250. The processing circuitry 250 is communicatively coupled to the interface circuitry 220, e.g., via one or more buses. In some embodiments, the UE 200 further comprises memory 250 that is communicatively coupled to the processing circuitry 250, e.g., via one or more buses. According to particular embodiments, the processing circuitry 250 is configured to perform one or more of the methods described herein (e.g., the method 100 of FIG. 27).

The processing circuitry 250 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 250 may be programmable hardware capable of executing software instructions of a computer program 270 stored in the memory 260 whereby the processing circuitry 250 is configured. The memory 260 of the various embodiments may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination.

The interface circuitry 220 connects to one or more antennas (not shown) and contains the radio circuitry necessary for communication with the network 10. For example, the interface circuitry 220 may comprise a transceiver configured to send and receive communication signals over one or more of a cellular network, Ethernet network, or optical network. In one embodiment, the interface circuitry comprises transmitter circuitry 430 and receiver circuitry 440 operates according to the LTE and/or NR standards.

The interface circuitry 220 may further comprise a controller hub configured to control the input and output (I/O) data paths of the UE 200. Such I/O data paths may include data paths for exchanging signals over a communications network, data paths for exchanging signals with a user, and/or data paths for exchanging data internally among components of the UE 200. The interface circuitry 220 may also comprise one or more of a graphics adapter, display port, video bus, touchscreen, graphical processing unit (GPU), display port, Liquid Crystal Display (LCD), and Light Emitting Diode (LED) display, for presenting visual information to a user. The interface circuitry 220 may also comprise one or more of a pointing device (e.g., a mouse, stylus, touchpad, trackball, pointing stick, joystick), touchscreen, microphone for speech input, optical sensor for optical recognition of gestures, and keyboard for text entry.

The interface circuitry 220 may be implemented as a unitary physical component, or as a plurality of physical components that are contiguously or separately arranged, any of which may be communicatively coupled to any other or may communicate with any other via the processing circuitry 250.

Other embodiments may include other permutations and/or arrangements of the above and/or their equivalents.

According to embodiments of the UE 200 illustrated in FIG. 29, the processing circuitry 250 is configured to initiate, while in a power saving state, the connection procedure to establish or resume the connection in a primary cell. Initiating of the connection procedure may be performed by the processing circuitry 250 responsive to determining a need for the connection. The processing circuitry 250 is further configured to, after initiating the establishment or resumption of the connection, synchronize with one or more candidate cells selected by the UE 200 in addition to the primary cell. In some embodiments, the processing circuitry 250 may optionally perform a cell search to identify the candidate carriers that are selected for synchronization. The processing circuitry 250 id further configured to receive, from the network, a message requiring synchronization with a target cell other than the primary. The processing circuitry 250 is further configured to determine that the target cell is among the candidate cells for which synchronization information is known. The processing circuitry 250 is further configured to transmit, responsive to determining that the target cell is one of the candidate cells for which synchronization is established, a random access preamble to the target cell using the known synchronization information.

Other embodiments of the present disclosure include corresponding computer programs 270. The computer program 270 comprises instructions which, when executed on processing circuitry of a UE 200, cause the UE 200 to carry out any of the respective processing described above. A computer program in this regard may comprise one or more code modules corresponding to the means or units described above.

Embodiments further include a carrier containing such a computer program 270. This carrier may comprise one of an electronic signal, optical signal, radio signal, or computer readable storage medium. For example, embodiments herein include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Figure 30:
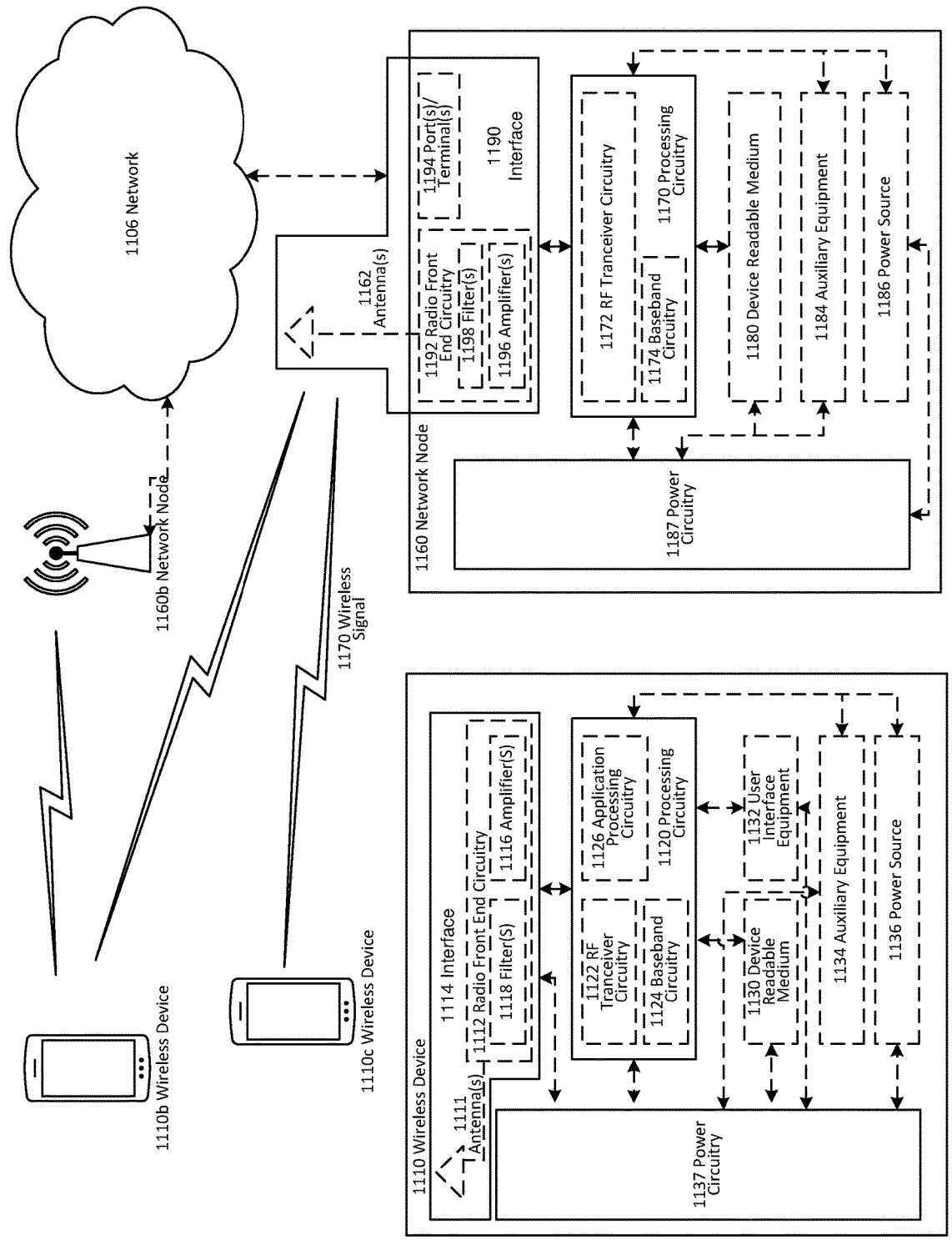
FIG. 30 is a schematic block diagram illustrating an example wireless network, according to particular embodiments of the present disclosure.

Although the subject matter described herein may be implemented in any appropriate type of system using any suitable components, the embodiments disclosed herein are described in relation to a wireless network, such as the example wireless network illustrated in FIG. 30. For simplicity, the wireless network of FIG. 30 only depicts network 1106, network nodes 1160 and 1160b, and WOs 1110, 1110b, and 1110c. In practice, a wireless network may further include any additional elements suitable to support communication between wireless devices or between a wireless device and another communication device, such as a landline telephone, a service provider, or any other network node or end device. Of the illustrated components, network node 1160 and wireless device (WO) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), and base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 30, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 30 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units.

In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signaling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196.

Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 30 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WO) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (POA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCOMA, LTE, NR, WiFi, WiMAX, NB-IoT, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WO. Any information, data and/or signals may be received from a network node and/or another WO. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WOs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WO. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 31:
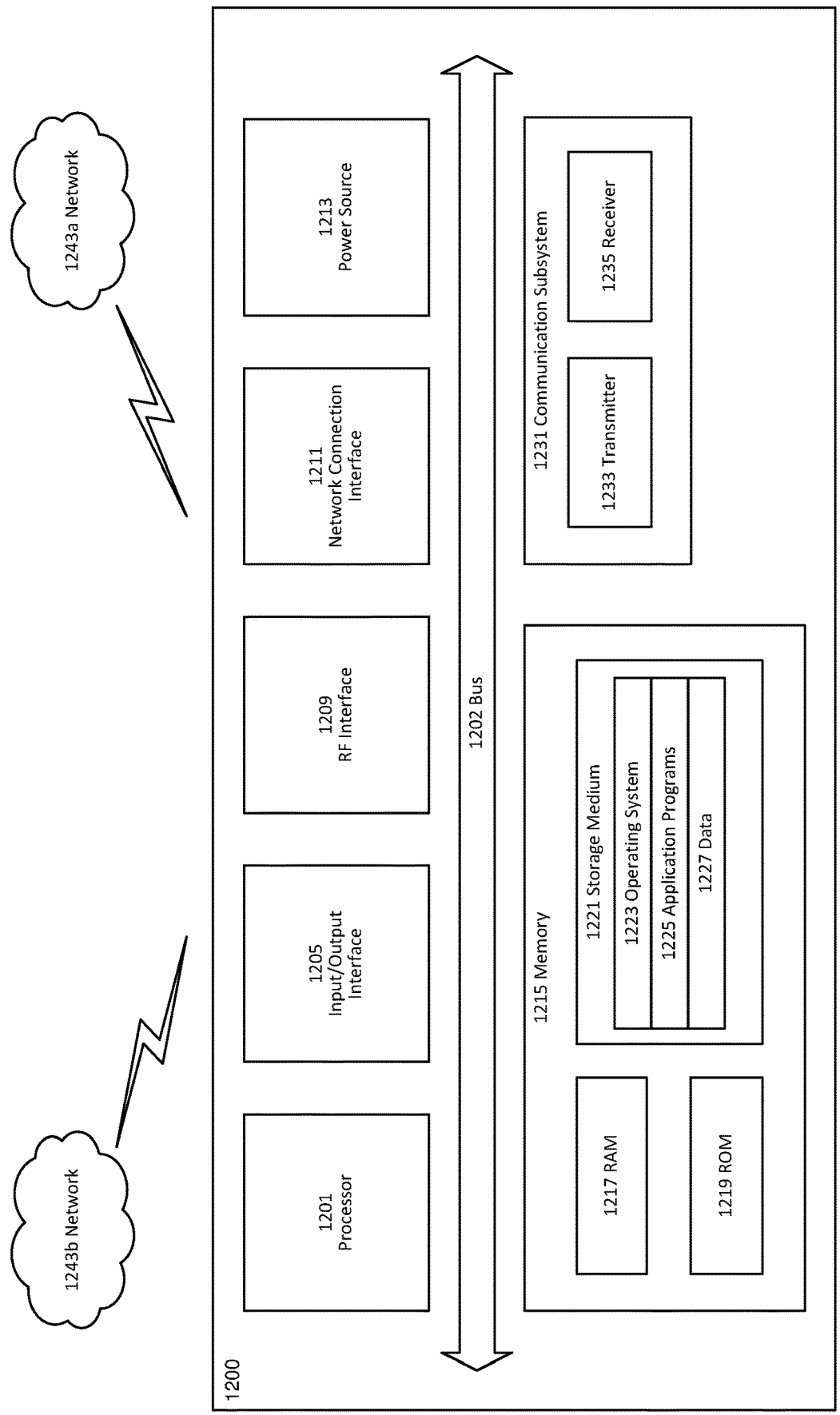
FIG. 31 is a schematic block diagram illustrating an example of a user equipment, according to particular embodiments of the present disclosure.

FIG. 31 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1200 may be any UE identified by the 3rd Generation Partnership Project (3GPP), including a NB-IoT UE, a machine type communication (MTC) UE, and/or an enhanced MTC (eMTC) UE. UE 1200, as illustrated in FIG. 31, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 31 is a UE, the components discussed herein are equally applicable to a WD, and vice-versa.

In FIG. 31, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 31, or only a subset of the components. The level of integration between the components may vary from one UE to another UE. Further, certain UEs may contain multiple instances of a component, such as multiple processors, memories, transceivers, transmitters, receivers, etc.

In FIG. 31, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via inpuUoutput interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 31, RF interface 1209 may be configured to provide a communication interface to RF components such as a transmitter, a receiver, and an antenna. Network connection interface 1211 may be configured to provide a communication interface to network 1243a. Network 1243a may encompass wired and/or wireless networks such as a local-area network (LAN), a wide-area network (WAN), a computer network, a wireless network, a telecommunications network, another like network or any combination thereof. For example, network 1243a may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HODS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 31, processing circuitry 1201 may be configured to communicate with network 1243*b* using communication subsystem 1231. Network 1243*a* and network 1243*b* may be the same network or networks or different network or networks. Communication subsystem 1231 may be configured to include one or more transceivers used to communicate with network 1243*b*. For example, communication subsystem 1231 may be configured to include one or more transceivers used to communicate with one or more remote transceivers of another device capable of wireless communication such as another WO, UE, or base station of a radio access network (RAN) according to one or more communication protocols, such as IEEE 802.12, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243*b* may encompass wired and/or wireless networks such as a local-area network (LAN), a wide-area network (WAN), a computer network, a wireless network, a telecommunications network, another like network or any combination thereof. For example, network 1243*b* may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 32:
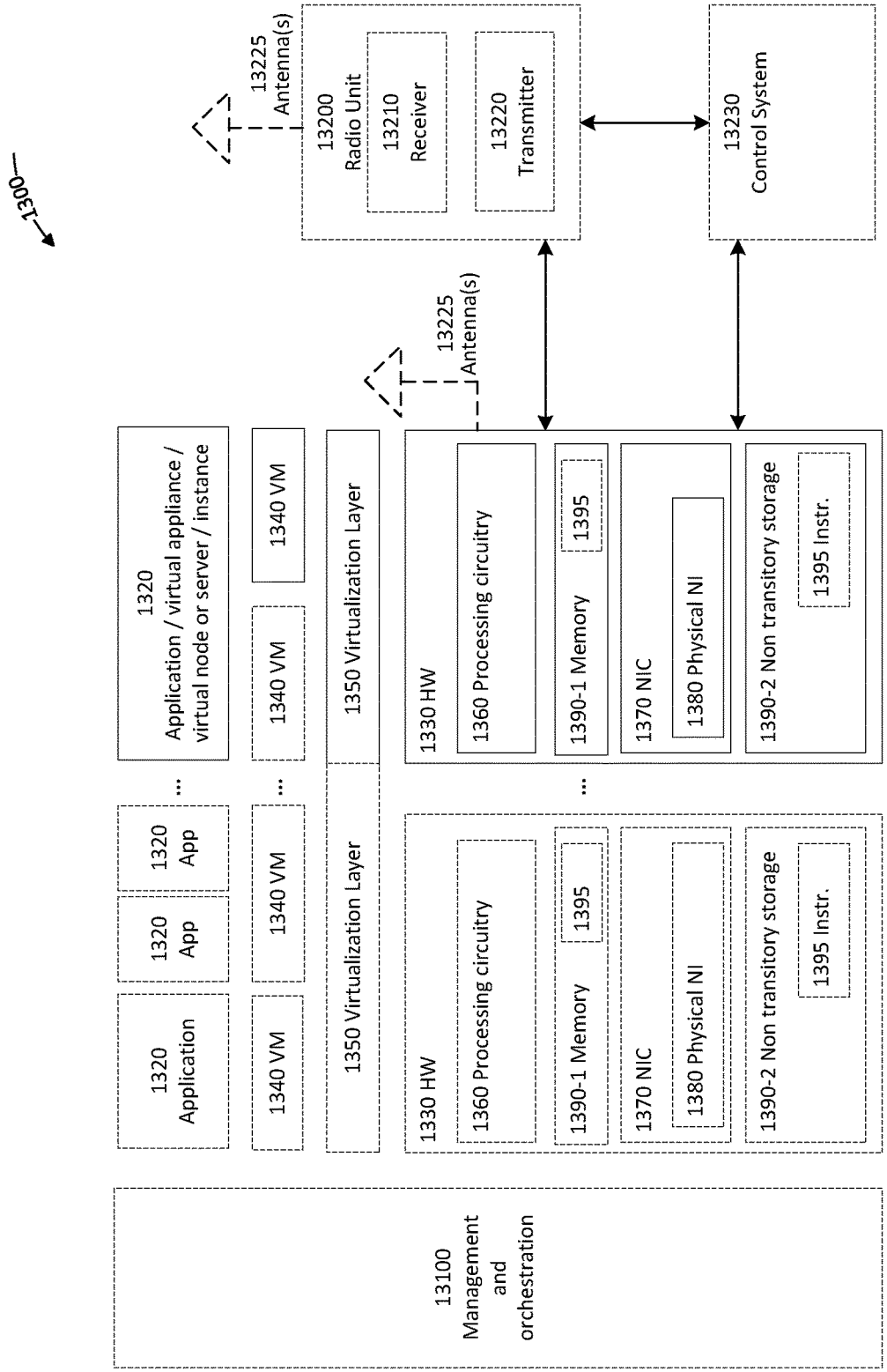
FIG. 32 is a schematic block diagram illustrating an example of a virtualization environment, according to particular embodiments of the present disclosure.

FIG. 32 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 32, hardware 1330 may be a standalone network node with generic or specific components. Hardware 1330 may comprise antenna 13225 and may implement some functions via virtualization. Alternatively, hardware 1330 may be part of a larger cluster of hardware (e.g., such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 32.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signaling can be affected with the use of control system 13230 which may alternatively be used for communication between the hardware nodes 1330 and radio units 13200.

Figure 33:
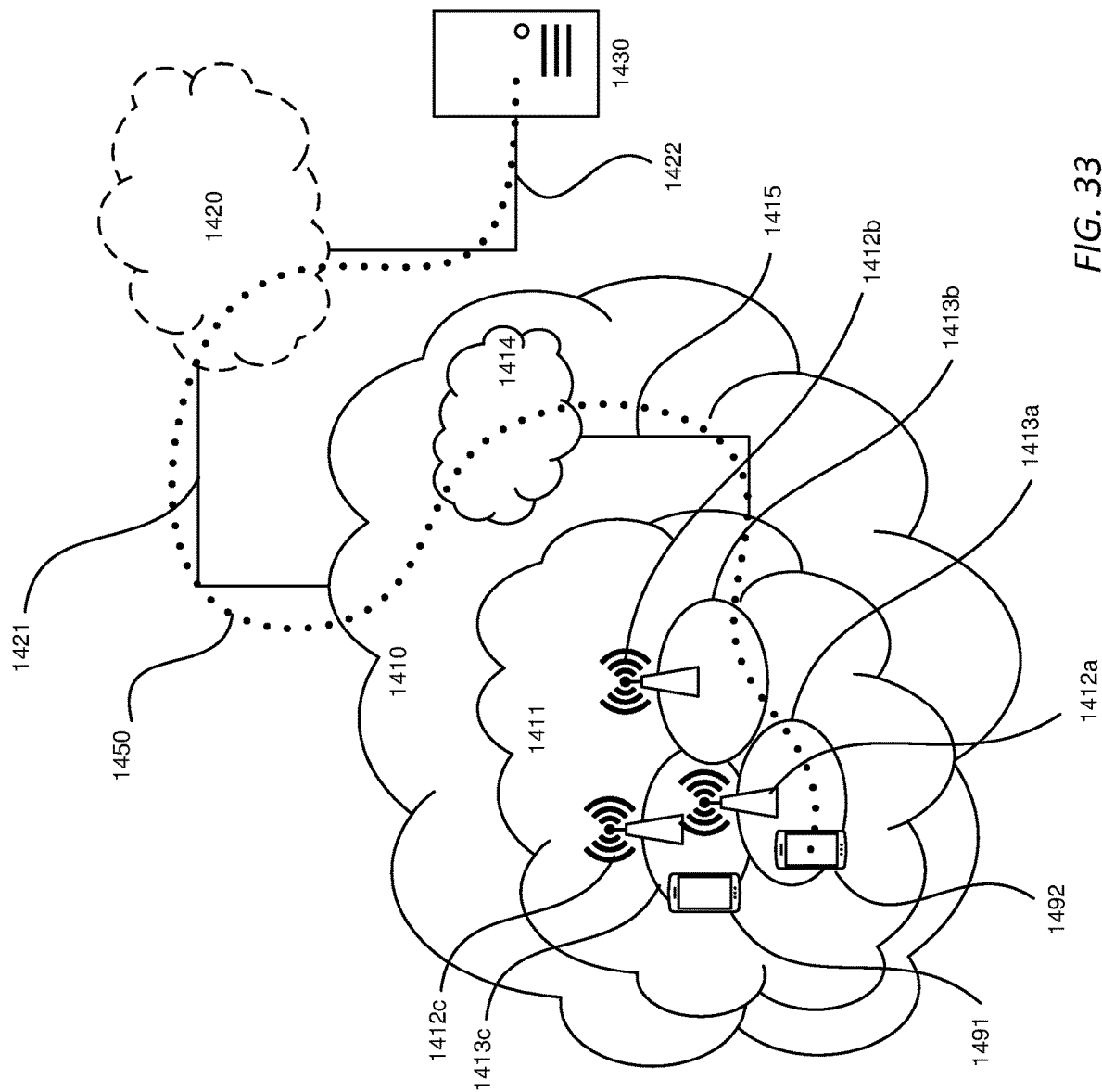
FIG. 33 is a schematic illustrating an example telecommunication network, according to particular embodiments of the present disclosure.

FIG. 33 illustrates a telecommunication network connected via an intermediate network to a host computer in accordance with some embodiments. In particular, with reference to FIG. 33, in accordance with an embodiment, a communication system includes telecommunication network 1410, such as a 3GPP-type cellular network, which comprises access network 1411, such as a radio access network, and core network 1414. Access network 1411 comprises a plurality of base stations 1412*a*, 1412*b*, 1412*c*, such as NBs, eNBs, gNBs or other types of wireless access points, each defining a corresponding coverage area 1413*a*, 1413*b*, 1413*c*. Each base station 1412*a*, 1412*b*, 1412*c* is connectable to core network 1414 over a wired or wireless connection 1415. A first UE 1491 located in coverage area 1413*c* is configured to wirelessly connect to, or be paged by, the corresponding base station 1412*c*. A second UE 1492 in coverage area 1413*a* is wirelessly connectable to the corresponding base station 1412*a*. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, and a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 33 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 34:
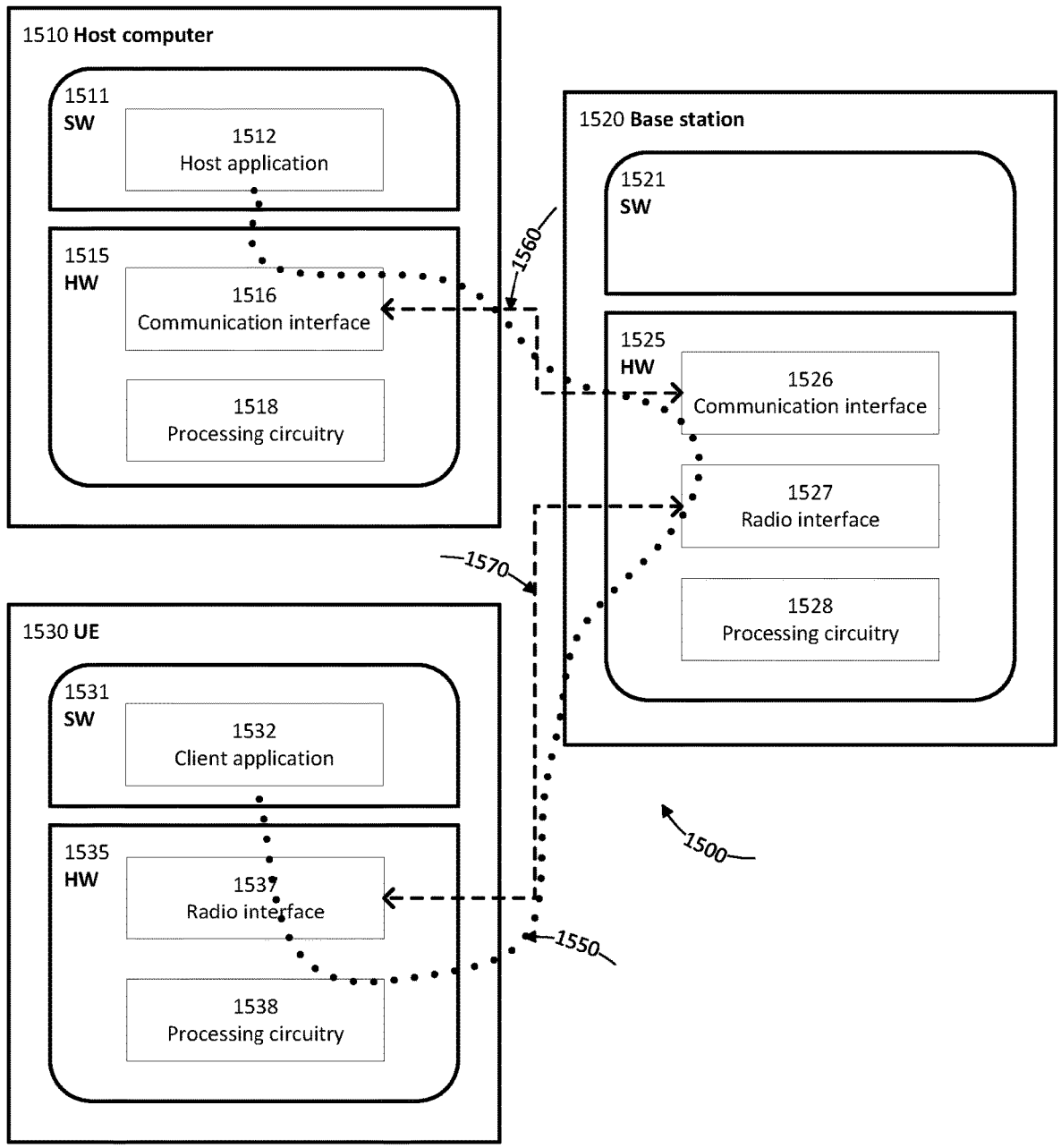
FIG. 34 is a schematic block diagram illustrating an example communication system, according to particular embodiments of the present disclosure.

Example implementations, in accordance with an embodiment, of the UE, base station and host computer discussed in the preceding paragraphs will now be described with reference to FIG. 34. FIG. 34 illustrates host computer communicating via a base station with a user equipment over a partially wireless connection in accordance with some embodiments In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 34) served by base station 1520. Communication interface 1526 may be configured to facilitate connection 1560 to host computer 1510. Connection 1560 may be direct or it may pass through a core network (not shown in FIG. 34) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 34 may be similar or identical to host computer 1430, one of base stations 1412*a*, 1412*b*, 1412*c* and one of UEs 1491, 1492 of FIG. 33, respectively. This is to say, the inner workings of these entities may be as shown in FIG. 34 and independently, the surrounding network topology may be that of FIG. 33.

In FIG. 34, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may fast synchronization with a target cell and thereby provide benefits such faster connection establishment or resumption when transitioning from a power saving state.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 35:
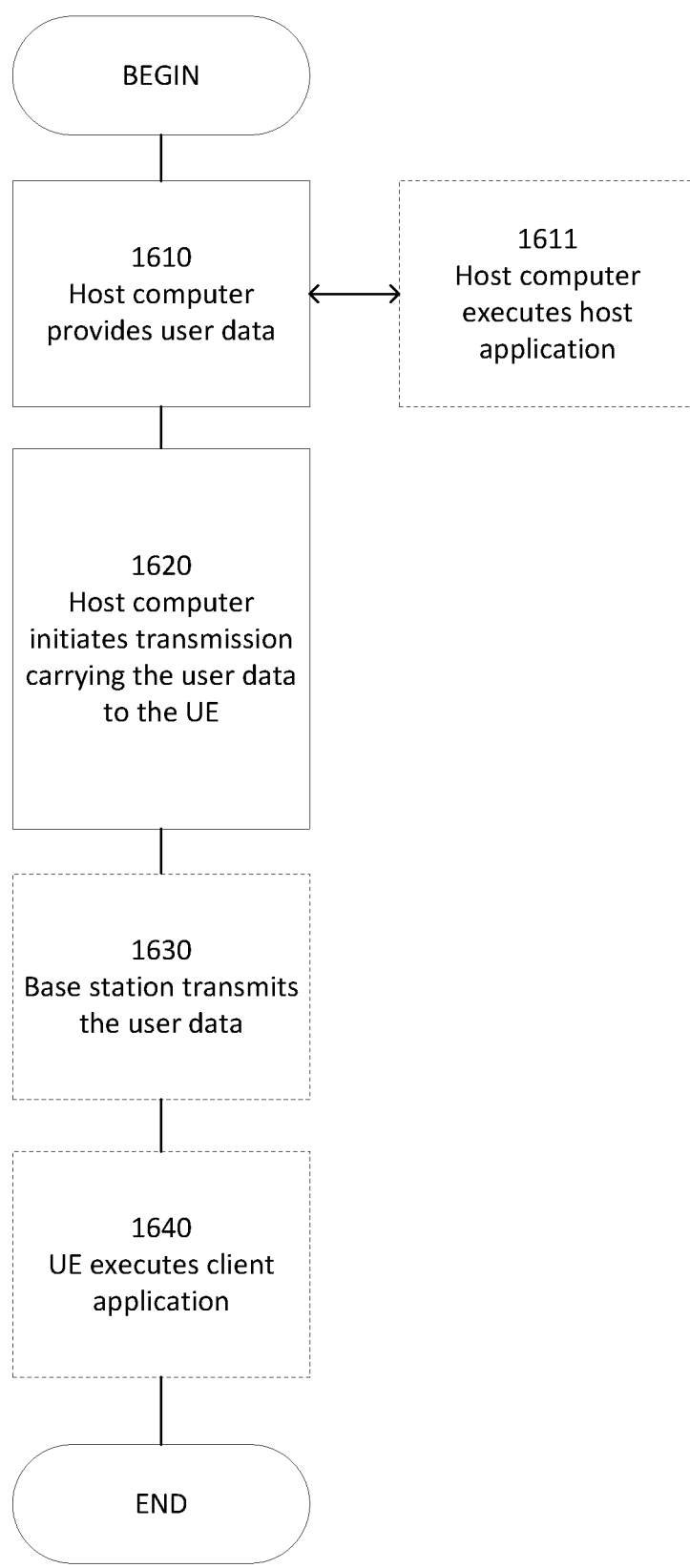
FIGS. 35-38 are flow diagrams, each of which illustrates an example method implemented in a communication system, according to particular embodiments of the present disclosure.

FIG. 35 is a flowchart illustrating a method implemented in a communication system, in accordance with one embodiment. The communication system includes a host computer, a base station and a UE which may be those described with reference to FIG. 33 and FIG. 34. For simplicity of the present disclosure, only drawing references to FIG. 35 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 36:
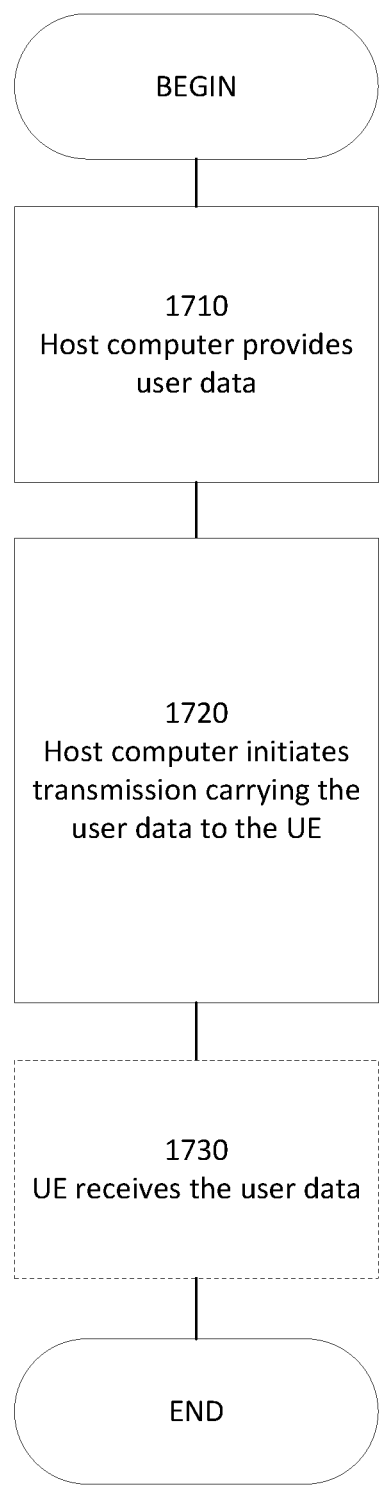

FIG. 36 is a flowchart illustrating a method implemented in a communication system, in accordance with one embodiment. The communication system includes a host computer, a base station and a UE which may be those described with reference to FIG. 33 and FIG. 34. For simplicity of the present disclosure, only drawing references to FIG. 36 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 37:
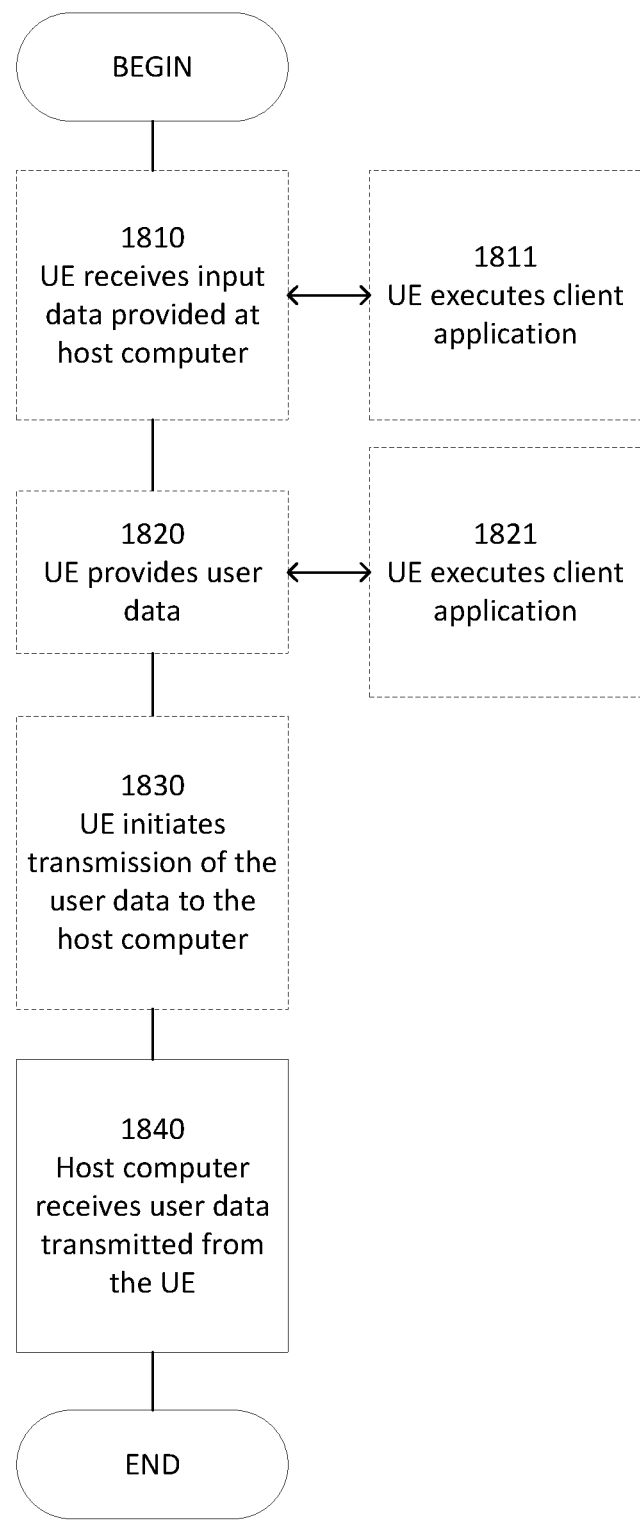

FIG. 37 is a flowchart illustrating a method implemented in a communication system, in accordance with one embodiment. The communication system includes a host computer, a base station and a UE which may be those described with reference to FIG. 33 and FIG. 34. For simplicity of the present disclosure, only drawing references to FIG. 37 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 38:
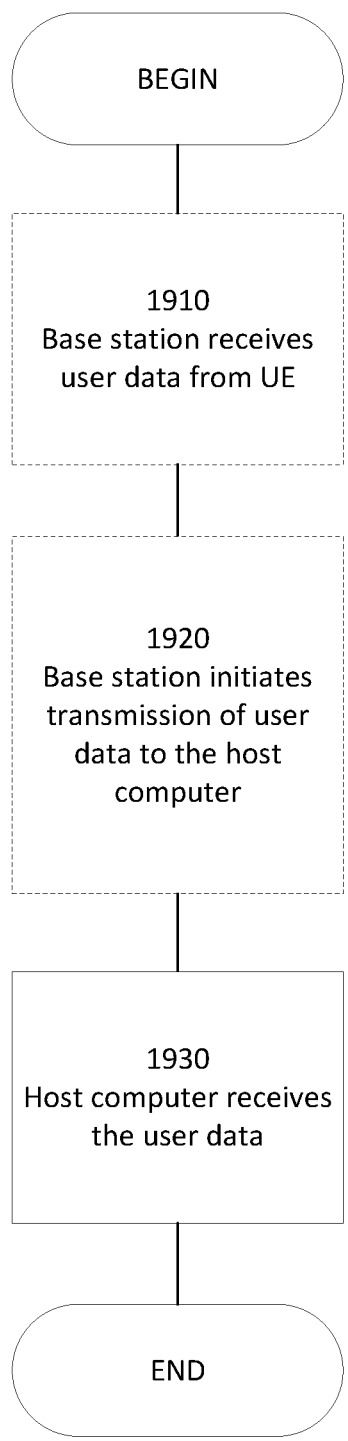

FIG. 38 is a flowchart illustrating a method implemented in a communication system, in accordance with one embodiment. The communication system includes a host computer, a base station and a UE which may be those described with reference to FIG. 33 and FIG. 34. For simplicity of the present disclosure, only drawing references to FIG. 38 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method of establishing or resuming a connection implemented by a user equipment (UE), the method comprising:
    initiating, while in a power saving state, a connection procedure to establish or resume the connection in a primary cell;
    synchronizing, prior to receiving a message requiring synchronization with a target cell other than the primary cell, with one or more candidate cells selected by the UE in addition to the primary cell to obtain early synchronization information;
    receiving, from the network, the message requiring synchronization with the target cell other than the primary cell;
    determining that the target cell is among the candidate cells for which early synchronization information is available;
    responsive to determining that the target cell is one of the candidate cells for which synchronization is established, transmitting a random access preamble to the target cell using the early synchronization information;
    configuring a timer to control the synchronization with one or more of the candidate cells;
    starting the timer when the UE initiates synchronization with one of the candidate cells;
    stopping the timer when the message requiring synchronization with a target cell is received; and
    maintaining synchronization with the cell associated with the timer while the timer is running.

2. The method of claim 1, further comprising:
   determining, while the UE is in the power saving state, that the connection is required; and
   initiating the connection procedure responsive to determining that the connection is required.

3. The method of claim 2, wherein determining that the connection is required comprises receiving a paging message addressed to the UE.

4. The method of claim 2, wherein determining that the connection is required comprises determining, from internal signaling between a non-access stratum (NAS) layer and access stratum (AS) layer, that uplink data needs to be transmitted.

5. The method of claim 2, wherein determining that the connection is required comprises determining, from internal signaling between a non-access stratum (NAS) layer and access stratum (AS) layer, that a NAS message needs to be transmitted.

6. The method of claim 1, wherein initiating the connection procedure to establish or resume the connection in the primary cell comprises transmitting a Radio Resource Control (RRC) message to establish or resume the connection in the primary cell.

7. The method of claim 1, wherein the primary cell and one or more of the candidate cells selected by the UE use a same first Radio Access Technology.

8. The method of claim 1, wherein the primary cell and one or more of the candidate cells selected by the UE use different Radio Access Technologies.

9. The method of claim 1, wherein selecting the candidate cells by the UE comprises selecting all qualifying cells in all frequencies in which the UE is capable of synchronizing.

10. The method of claim 1, wherein selecting the candidate cells by the UE comprises selecting at least one cell in a neighbor frequency in which both the UE and a target base station associated with supports band combination with the primary cell.

11. The method of claim 1, wherein:
    the UE is configured with a specific configuration when it transitioned to the power saving state; and
    at least one of the selected candidate cells is indicated by the specific configuration.

12. The method of claim 11, wherein the specific configuration is a secondary cell group (SCG) configuration.

13. The method of claim 11, wherein the specific configuration is a secondary cell (SCell) configuration.

14. The method of claim 13, wherein the UE selects one or more of the candidate cells from cells indicated by the SCell configuration supporting carrier aggregation (CA) in a frequency band of the primary cell.

15. The method of claim 13, wherein the UE selects one or more of the candidate cells from cells indicated by the SCell configuration for which dual connectivity (DC) is supported by the UE.

16. The method of claim 1, further comprising performing a cell search to identify the one or more candidate cells for synchronization.

17. The method of claim 1:
    wherein receiving the message requiring synchronization with the target cell comprises receiving an RRC Reconfiguration message after the UE initiates establishment or resumption of the connection;
    wherein the RRC Reconfiguration message configures a Primary Secondary cell (PScell) or secondary cell (SCell) belonging to a secondary cell group (SCG).

18. The method of claim 1, wherein receiving the message requiring synchronization with the target cell comprises receiving an Radio Resource Control (RRC) Resume message that configures a Primary Secondary cell (PScell) or secondary cell (SCell) belonging to a secondary cell group (SCG).

19. The method of claim 1, wherein receiving the message requiring synchronization with the target cell comprises receiving a reconfiguration message requiring the UE to:
    resume an secondary cell (SCell) associated to a Master Cell Group;
    add an Secondary Cell Group (SCG);
    resume the SCG;
    add at least one SCell associated to the SCG;
    activate an SCell associated to the SCG;
    resume an SCell associated to the SCG;
    handover/reconfiguration with sync to another cell;
    release with redirect to another frequency/cell; and/or
    configure measurements.

20. A user equipment (UE) in a wireless communication network, the UE comprising:
    a communication circuit configured for communication with one or more base stations the wireless communication network; and
    processing circuitry configured to cause the UE to:
       initiate, while in a power saving state, the connection procedure to establish or resume the connection in a primary cell/carrier in order to transition to a connected state;
       synchronize, prior to receiving a message requiring synchronization with a target cell other than the primary cell, with one or more candidate cells selected by the UE in addition to the primary cell to obtain early synchronization information;
       receive, from the network, the message requiring synchronization with the target cell other than the primary cell;
       determine that the target cell is among the candidate cells for which synchronization information is known; and
       responsive to determining that the target cell is one of the candidate cells for which synchronization is established, transmit a random access preamble to the target cell using the known synchronization information;
       configure a timer to control the synchronization with one or more of the candidate cells;
       start the timer when the UE initiates synchronization with one of the candidate cells;
       stop the timer when the message requiring synchronization with a target cell is received; and
       maintain synchronization with the cell associated with the timer while the timer is running.

21. A non-transitory computer readable recording medium storing a computer program product for controlling a User Equipment (UE), the computer program product comprising program instructions which, when run on processing circuitry of the UE, causes the UE to:
    initiate, while in a power saving state, a connection procedure to establish or resume the connection in a primary cell;
    synchronize, prior to receiving a message requiring synchronization with a target cell other than the primary cell, with one or more candidate cells selected by the UE in addition to the primary cell to obtain early synchronization information;
    receive, from the network, the message requiring synchronization with the target cell other than the primary cell;

determine that the target cell is among the candidate cells for which early synchronization information is available;
responsive to determining that the target cell is one of the candidate cells for which synchronization is established, transmit a random access preamble to the target cell using the early synchronization information;
configure a timer to control the synchronization with one or more of the candidate cells;
start the timer when the UE initiates synchronization with one of the candidate cells;
stop the timer when the message requiring synchronization with a target cell is received; and
maintain synchronization with the cell associated with the timer while the timer is running.

* * * * *